(12) United States Patent
Qadeer et al.

(10) Patent No.: US 12,307,252 B2
(45) Date of Patent: *May 20, 2025

(54) DEEP VISION PROCESSOR

(71) Applicant: Deep Vision, Inc., Los Altos, CA (US)

(72) Inventors: Wajahat Qadeer, Los Altos, CA (US); Rehan Hameed, Los Altos, CA (US)

(73) Assignee: Deep Vision Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,353

(22) Filed: Jun. 30, 2023

(65) Prior Publication Data

US 2023/0418610 A1 Dec. 28, 2023

Related U.S. Application Data

(63) Continuation of application No. 17/868,438, filed on Jul. 19, 2022, now Pat. No. 11,734,006, which is a continuation of application No. 17/356,372, filed on Jun. 23, 2021, now Pat. No. 11,436,014, which is a continuation of application No. 16/670,800, filed on Oct. 31, 2019, now Pat. No. 11,080,056, which is a continuation of application No. 16/026,480, filed on Jul. 3, 2018, now Pat. No. 10,474,464.

(60) Provisional application No. 62/528,796, filed on Jul. 5, 2017.

(51) Int. Cl.
*G06T 1/20* (2006.01)
*G06F 9/30* (2018.01)
*G06F 17/16* (2006.01)
*G06N 3/045* (2023.01)
*G06N 3/063* (2023.01)
*G06N 3/08* (2023.01)
*G06T 15/00* (2011.01)

(52) U.S. Cl.
CPC .......... *G06F 9/3013* (2013.01); *G06F 9/3001* (2013.01); *G06F 9/30036* (2013.01); *G06F 9/30112* (2013.01); *G06F 9/30134* (2013.01); *G06F 17/16* (2013.01); *G06N 3/045* (2023.01); *G06N 3/063* (2013.01); *G06N 3/08* (2013.01); *G06T 15/005* (2013.01); *G06T 1/20* (2013.01)

(58) Field of Classification Search
None
See application file for complete search history.

(56) References Cited

U.S. PATENT DOCUMENTS

2008/0291208 A1* 11/2008 Keall ........................ G06T 1/20
 345/506
2015/0086134 A1* 3/2015 Hameed .................... G06T 1/20
 382/279

* cited by examiner

*Primary Examiner* — Joni Hsu
(74) *Attorney, Agent, or Firm* — Run8 Patent Group, LLC; Peter Miller

(57) ABSTRACT

Disclosed herein is a processor for deep learning. In one embodiment, the processor comprises: a load and store unit configured to load and store image pixel data and stencil data; a register unit, implementing a banked register file, configured to: load and store a subset of the image pixel data from the load and store unit, and concurrently provide access to image pixel values stored in a register file entry of the banked register file, wherein the subset of the image pixel data comprises the image pixel values stored in the register file entry; and a plurality of arithmetic logic units configured to concurrently perform one or more operations on the image pixel values stored in the register file entry and corresponding stencil data of the stencil data.

19 Claims, 46 Drawing Sheets

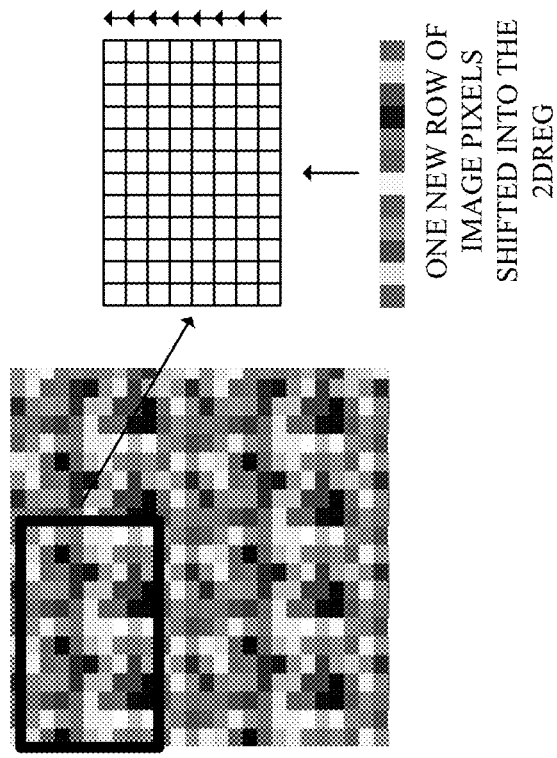
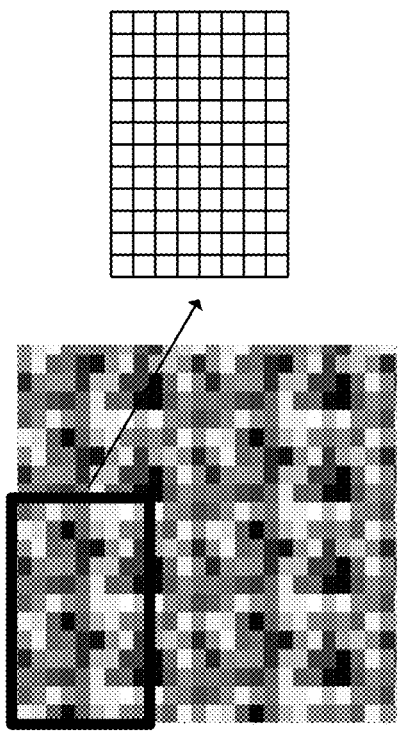
FIG. 10B

FIG. 17A

```
//Channel 0 loads
for(int i = 0; i < 4; i++){
    //Load one row of 64 8-bit elements of channel 0
    LD_VRA_512b(vR_Channel_0, channel_0_Ptr, LDST_ADDR_OFFSET_REG0, LDST_UPD_ADDR, LDST_8BIT);
    //Perform software shifting to load one row of channel 0 into v4R of channel 0
    SHIFTUP_V4(v4R_Channel_0, vR_Channel_0);
}

//Channel 1 loads
for(int i = 0; i < 4; i++){
    LD_VRA_512b(vR_Channel_1, channel_1_Ptr, LDST_ADDR_OFFSET_REG0, LDST_UPD_ADDR, LDST_8BIT);
    SHIFTUP_V4(v4R_Channel_1, vR_Channel_1);
}

//Channel 0 compute
for(int outputs = 0; outputs < 4; outputs +=2 ){
    //Perform 1st Stencil2D to produce 1st 32x16-bit output
    STENCIL2D(v4R_Channel_0_Out[outputs + 0], v4R_Channel_0, INPUT_RSHIFT_0 , coefIndChannel_0);
    //Perform 2nd Stencil2D to produce 2nd 32x16-bit output
    STENCIL2D(v4R_Channel_0_Out[outputs + 1], v4RChannel_0, INPUT_RSHIFT_32, coefIndChannel_0);
    //Load one row of 64 8-bit elements of channel 0
    LD_VRA_512b(vR_Channel_0, channel_0_Ptr, LDST_ADDR_OFFSET_REG0, LDST_UPD_ADDR, LDST_8BIT);
    //Perform software shifting to load one row of channel 0 into v4R of channel 0
    SHIFTUP_V4(v4R_Channel_0, vRChannel_0);
}

//Channel 1 compute
for(int outputs = 0; outputs < 4; outputs +=2 ){
    STENCIL2D(v4R_Channel_1_Out[outputs + 0], v4R_Channel_1, INPUT_RSHIFT_0 ,coefIndChannel_1);
    STENCIL2D(v4R_Channel_1_Out[outputs + 1], v4R_Channel_1, INPUT_RSHIFT_32,coefIndChannel_1);
    LD_VRA_512b(vR_Channel_1, channel_1_Ptr, LDST_ADDR_OFFSET_REG0, LDST_UPD_ADDR, LDST_8BIT);
    SHIFTUP_V4(v4R_Channel_1, vR_Channel_1);
}

//Sum the outputs of channel 0 and 1
v4R_ChannelSum = ADDV4R(v4R_Channel_0, v4R_Channel_1);
```

FIG. 21

DEEP VISION PROCESSOR

CROSS-REFERENCE TO RELATED APPLICATIONS

This application claims priority to, and is a continuation of U.S. Pat. Application No. 17,868,438, now U.S. Pat. No. 11,734,006, which was filed on Jul. 19, 2022, and which is entitled DEEP VISION PROCESSOR. U.S. patent application Ser. No. 17/868,438 claims priority to, and is a continuation of, U.S. patent application Ser. No. 17/356,372, now U.S. Pat. No. 11,436,014, which was filed on Jun. 23, 2021, and which is entitled "DEEP VISION PROCESSOR," U.S. Pat. Application No. 17,356,372 claims priority to, and is a continuation of, U.S. patent application Ser. No. 16/670,800, now U.S. Pat. No. 11,080,056, which was filed on Oct. 31, 2019 and which is entitled "DEEP VISION PROCESSOR." U.S. application Ser. No. 16/670,800 claims priority to, and is a continuation of, U.S. patent application Ser. No. 16/026,480, now U.S. Pat. No. 10,474,464, which was filed on Jul. 3, 2018 and which is entitled "DEEP VISION PROCESSOR." U.S. patent application Ser. No. 16/026,480 claims the benefit of priority under 35 U.S.C. § 119 (e) to U.S. Provisional Application No. 62/528,796, which was filed on Jul. 5, 2017 and which is entitled "DEEP VISION PROCESSOR." Each of the above-identified applications is hereby incorporated by reference herein in its entirety. Any and all applications for which a foreign or domestic priority claim is identified in the Application Data Sheet as filed with the present application are hereby incorporated by reference in their entirety under 37 CFR 1.57.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present disclosure relates to programmable processors, and in particular to lower energy, programmable processors that can perform one or more neural network techniques (e.g., deep learning techniques) and computer vision techniques (e.g., traditional computer vision techniques).

BACKGROUND

Computer vision technologies that rely on deep learning, such as computer vision technologies based on convolutional neural networks (CNNs), can accomplish complex tasks in a reliable and robust manner. For example, the automotive industry deploys advanced computer vision chipsets in autonomous vehicles and in safety features, such as obstacle detection and collision avoidance systems in automobiles. In the manufacturing and warehousing sectors, neural network and deep learning techniques are being implemented to develop adaptable robots that perform human-like tasks. In security and surveillance applications, embedded devices with neural network and deep learning capabilities conduct real-time image analyses from vast amounts of data. In mobile and entertainment devices, deep learning enables 'intelligent' image and video capture and searches, as well as delivery of virtual reality-based content.

A barrier to the widespread adoption of neural network and deep learning in embedded devices is the extremely high computation cost of neural network and deep learning algorithms. Some computer vision products use programmable general purpose graphics processing units (GPUs). These chips can be power-consumptive while battery-operated embedded devices can be designed for low power, efficient operation. Even devices that are not battery-operated, e.g., devices that can be plugged into a wall outlet and power over Ethernet (POE) device (such as a home security camera system), may be designed for low power, efficient operation, for example, because of thermal management requirement (such as the amount of heat dissipation a device can have). Some computer vision products use specialized chips that rely on fixed function accelerators, which lack flexibility and programmability even though not necessarily power consumptive.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the subject matter of the disclosure.

Disclosed herein is a processor for deep learning. In one embodiment, the processor comprises: a load and store unit configured to load and store image pixel data and stencil data; a register unit, implementing a banked register file, configured to: load and store a subset of the image pixel data from the load and store unit; and concurrently provide access to image pixel values stored in a register file entry of the banked register file, wherein the subset of the image pixel data comprises the image pixel values stored in the register file entry; an interconnect unit in communication with the register unit and a plurality of arithmetic logic units, the interconnect unit configured to: provide the image pixel values stored in the register file entry; and provide corresponding stencil data to the image pixel values stored in the register file entry; and the plurality of arithmetic logic units configured to concurrently perform one or more operations on the image pixel values stored in the register file entry and corresponding stencil data to the image pixel values stored in the register file entry from the interconnect unit.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 10A-10B show a schematic illustration of a register file architecture for stencil flow of a DV core.

FIGS. 17A-17F show a schematic illustration of an example execution flow of 1×1 convolution using a Stencil1DV instruction.

FIG. 21 shows pseudocode for mapping a CNN compute operation to a DV core.

DETAILED DESCRIPTION

Overview

Figure 1:
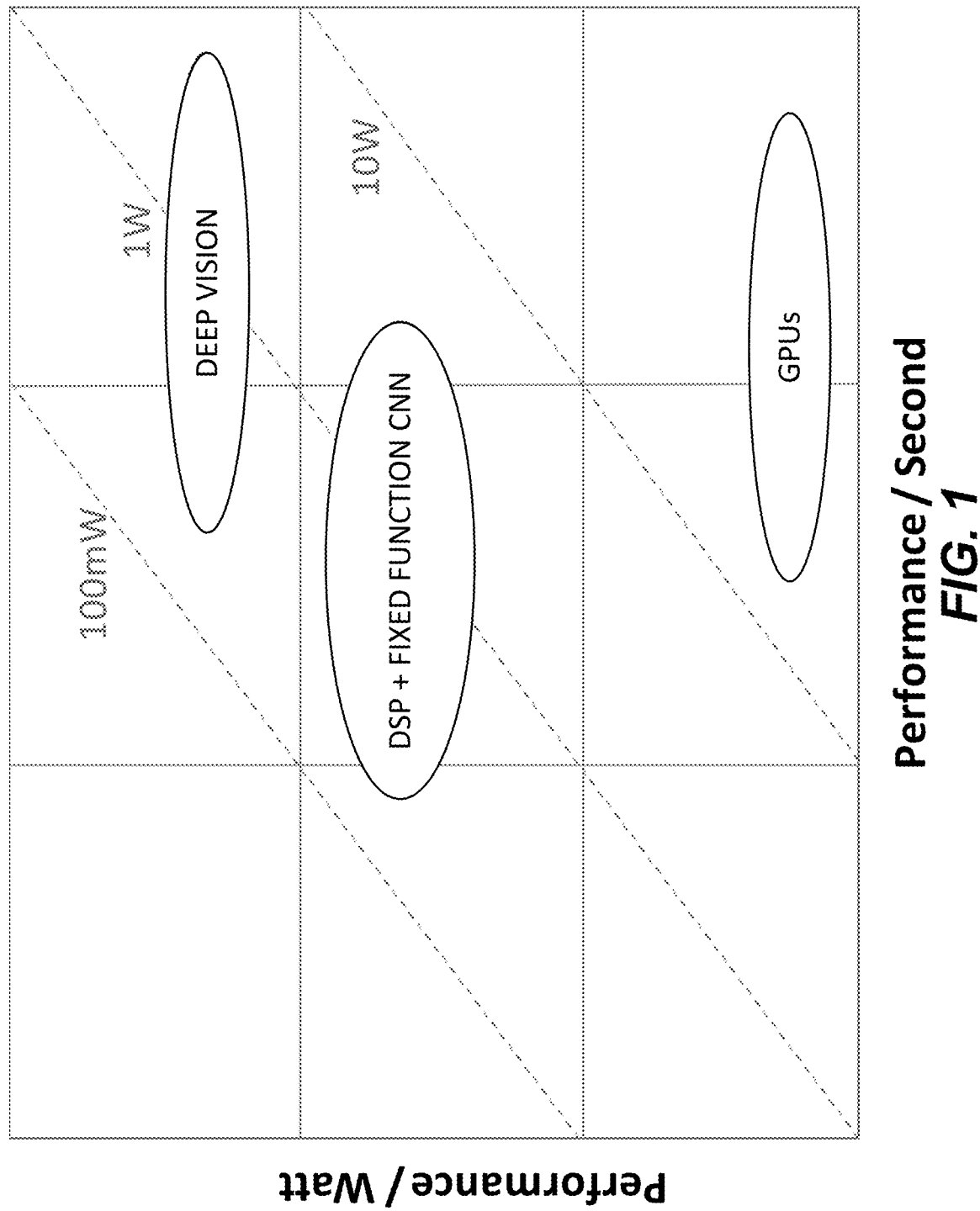
FIG. 1 is an example plot comparing the performance of deep vision (DV) processors, digital signal processors (DSPs) with fixed function convolution neural networks (CNNs), and graphics processing units (GPUs).

The disclosure provides a new approach to both vision processors and embedded deep learning (DL) computer vision software. The approach disclosed herein can be implemented by systems, methods, devices, processors, and processor architectures. A deep vision (DV) processor implementing a deep vision processor architecture disclosed herein can have one or more orders of magnitude higher power efficiency (e.g., up to two orders of magnitude), one or more orders of magnitude lower cost (e.g., at least an order) compared to a GPU for a similar workload, and/or better performance/watt than a GPU (e.g., 66× better performance). Accordingly, the processor can enable fast, power-efficient and lower-cost local versus cloud-based image and data processing.

In some embodiments, the DV processor can be a high-performance, ultra-low power, scalable Application Specific Integrated Circuit (ASIC) processor. Its innovative, completely programmable architecture is designed for machine learning (e.g., deep learning), in addition to traditional vision algorithms. The deep learning optimization software complementing the processor can enable complex convolutional neural networks (CNNs) and other algorithms to be efficiently mapped to embedded processors for optimal performance. It reduces layers & prunes CNNs for optimal power and performance in embedded platforms. The software includes a library of lighter, thinner CNNs that are most suitable for embedded processors.

Applications

In recent years, Deep Learning has revolutionized the field of computer vision by bringing an artificial intelligence based approach to classical computer vision tasks such as image classification, objection detection and identification, activity recognition etc. This approach has had such a transformational impact on the field such that machines have started surpassing humans in some of these visual cognition tasks. Deep learning based vision has been used in data centers, and there is a need to bring visual intelligence to an array of devices including self-driving cars, drones, robots, smart cameras for home monitoring as well as security/surveillance applications, augmented reality, mixed reality, and virtual reality headsets, cell phones, Internet of Things (IoT) cameras, etc.

Automated tasks that are dependent on computer vision have evolved from experimental concepts to everyday applications across several industries. Autonomous vehicles, drones and facial recognition systems are likely to have a transformative impact on society as the need for enhanced driver safety, remote monitoring and real-time surveillance functions continue to grow. Over the past decade, while the capabilities and performance of device-embedded cameras and other detectors have dramatically improved, the computational processing of acquired images has relatively lagged with respect to both chip design and the energy efficiency of computing required for a given operation. The disclosure provides a deep vision (DV) architecture to processor design, which can unleash the potential of computer vision in embedded devices across several industries. The applications of the DV architecture include recognition tasks in low-cost, ultra-low-power cameras to complex scene analysis and autonomous navigation in self-driving cars.

One barrier to the massive adoption of this technology in embedded devices is, however, the high computation cost of deep learning algorithms. Currently GPUs are the main platform being used to implement deep learning solutions, but GPUs consume far too much power for the battery-operated embedded devices. At the same time GPUs are also prohibitively expensive for many of these target domains. In some embodiments, a DV processor implementing the a DV processor architecture disclosed herein have orders of magnitude higher power efficiency and at least an order of magnitude lower cost compared to a GPU for this workload. In some embodiments, a DV processor disclosed herein can perform traditional image analysis approaches, such as feature extraction, edge detection, filtering, or optical flow.

Applications for computer vision technologies include automotive, sports & entertainment, consumer, robotics and machine vision, medical, security and surveillance, retail, and agriculture. The world-wide revenues of computer vision technologies (e.g., hardware and software) has been projected to grow by 500% by the year 2022 (from less than $10 billions to close to $50 billions), with automotive applications accounting for the largest share of revenue, followed by consumer electronics, robotics and security applications. These market segments have been projected to witness high volume sales of embedded hardware (e.g., detection systems and image-processing chips) that account for ~70-80% of total revenue in a given year.

Table 1 lists non-limiting example specific applications within market verticals where the demand for low-power, high performance solutions for embedded computer vision is set to grow dramatically in the coming years.

TABLE 1

Applications for embedded devices with computer vision capabilities.

| ADAS | IP Security | Drones | Robotics |
|---|---|---|---|
| Collision control, Driver alertness, Highway Chauffeur | Person identification, Behavior recognition | Remote monitoring, Collision avoidance, Object identification | Automatic navigation, grasp detection |

Advanced driver assist systems. One driver for the Advanced Driver Assist Systems (ADAS) market is safety. Annual road traffic injuries in the US alone have been projected to be up to 3.6 million by 2030, of which over 90% are due to human errors and deficiencies. Legislation to control these incidents can drive widespread adoption of automotive safety features such as ADAS that supplement and/or complement driver alertness to substantially help reduce or eliminate human error, injuries and fatalities.

In some embodiments, companies in the automotive industry that develop the ADAS subsystem can take advantage of the DV processors. Companies such as Bosch, Delphi, and Continental can utilize the deep learning/computer vision chips disclosed herein along with appropriate software libraries and reference designs for integration into the ADAS sub-system. Car manufacturers can integrate the ADAS subsystem into cars.

Two companies in the ADAS solutions space are Mobileye and Nvidia—both developing and shipping solutions for ADAS. Mobileye's current offerings are fixed function, e.g., they perform a specific function very well, such as identifying a 'STOP' sign or a pedestrian. Nvidia's GPU offerings are programmable with any state of the art deep learning algorithms. However, NVIDIA's solutions are highly power-consumptive and cost over 100s of dollars, or over $1,000 per chip (e.g., nVidia Drive PX2). In the next decade, every new car may have multiple 8K and 4K HD cameras, radars and Lidars generating over 4 TB of data daily and needing compute processing power of 50-100 tera floating point operations per second (TFLOPS). Each car may need multiple GPUs to keep up with the needs of ever increasing data and compute cycles to process the same. Mobileye's offerings, although cost effective, tend to be rigid and not programmable and hence not scalable to the amount of data to be generated by cars in the future. The DV processor can overcome one or more of these hurdles in terms of cost, power, performance, scalability and programmability.

The total car market has been pegged at 110 million units annually. While the penetration of ADAS in this segment is currently at 6%, it has been forecasted to rise to 50% by 2020. This puts the share of addressable market for ADAS at 55 million units in 2020, if there is low/no-growth in the total passenger car market. The DV processor architecture disclosed herein can bring down the costs and barriers of these solutions substantially to achieve a forecasted penetration of 50% by 2020.

Internet Protocol (IP) security camera. In the Internet Protocol (IP) security camera segment, 66 million network cameras are shipped annually and there is a growing demand for analytics, especially real-time detection and recognition of people and objects. Certain end markets for IP cameras, such as hospitals, do not allow upload of the recorded video onto a server/cloud for reasons of patient privacy. In such cases, having a solution that provides detection and recognition at the edge implemented using, for example, the systems, methods, devices, processors, and processor architecture disclosed herein can ensure compliance while meeting the security needs of the institution. The share of addressable market for real-time edge analytics has been forecasted in 2017 to rise to 30% of the annual units by 2020.

Companies in the IP security camera segment (e.g., camera and security system manufacturers, such as Axis, Bosch, Avigilon and Pelco) can take advantage of the DV processors disclosed herein. The camera manufacturers can utilize computer vision chips and software libraries disclosed herein. Alternatively or in addition, camera SoC (System on a Chip) solution providers, such as Ambarella, Geo Vision, Novatek, can utilize the method disclosed herein into the SoC that camera manufacturers can integrate into cameras.

Within the IP security camera market, the current approach to analytics includes software-based solutions and is typically performed offline, e.g., after the video feed is uploaded to the cloud/datacenter. This approach may not meet the need for real-time analytics at the camera, such as person and object recognition. For recognition and detection at the edge, a low-power high-performance silicon embedded in the camera may be required. Low power can be important in this segment due to limited power that can be routed to the camera through the IP cable. The DV processor disclosed herein can be well suited to address this market. The companies in this space developing SoCs are Ambarella, HiSilicon, Fujitsu, Geovision, or Grain Media take utilize the DV processor disclosed herein.

Deep Learning

Deep learning (DL) refers to a machine learning technique that uses very deep convolutional neural networks (CNNs) to accomplish computational tasks. A convolutional neural network (CNN) can refer to a special variant of multi-layer perceptrons (MLPs) that contain repetitive layers of neurons which can be applied across space or time to transform an input volume to an output volume. The repetitive layers generally encountered in CNNs comprise convolutions, normalizations, pooling and classification. LeNet-5, one of the first CNN architectures that has revolutionized the field of deep learning, was designed to perform character recognition and consists of two convolutional layers, two pooling layers and three classifier or fully connected layers. Although, LeNet-5 does not feature a normalization layer, recent networks have demonstrated the efficacy of employing normalization layers to improve training accuracies.

Convolutional Layer. A convolutional layer constitutes an integral part of a CNN. A CNN layer can consist of a set of learnable neurons arranged in the form of filter banks of one or more sizes, which are convolved in space (images) or in time (speech) to identify learnable characteristics of input feature maps. These filters banks can map an input volume consisting of a number of channels extending in dimensions to an output volume consisting of depths covering dimensions. The output of the filter banks can be activation functions which are arranged in the dimension to produce the final output volume.

A function of the convolutional layer can be to learn the same features at different spatial or temporal locations. This learning can achieved by convolving neurons arranged in the form of filter banks with the input volume. Since the same filter is employed across the spatial dimensions of the input, the neurons can be able to share weights resulting in networks with substantially smaller memory footprints than traditional MLPs.

Convolutional layers tend to be compute intensive component of a CNN network. The size of the convolutional kernels employed in CNNs vary substantially with bigger kernel sizes being employed in the beginning layers giving way to smaller kernel sizes in the later stages. Initial layers containing large filter sizes can be better at capturing activations, resulting from high or low frequency feature maps. However, later layers which employ smaller filters can capture mid-frequency information. Smaller filter sizes can result in more distinctive and fewer "dead" features. 3×3 convolutions have become the filter of choice in recent networks such as Google's AlphaGo network or Microsoft's deep residual networks.

Pooling Layer. A pooling layer is generally employed after a convolution stage and performs the task of down sampling across the spatial dimensions at each depth level. Pooling functions, like the convolution layer, operates on stencils of data in a sliding window manner with 2×2 and 3×3 window sizes being more common. The down-sampling operator can be nonlinear in nature with maximum as being the most commonly used function. However, other functions such as L2 Norm and averaging can be used. Pooling decreases the number of parameters and the amount of compute in later stages and prevents overfitting by de-emphasizing the exact position of the learned feature relative to others.

Normalization Layer. Normalization layers speed up training by preventing the distribution of weights from changing too rapidly from one layer to another. Normalization of weights can prevent non-linearity from saturating out, resulting in substantially accelerated training without the need for careful parameter initialization. One method for normalization in recent networks is Batch normalization. Batch normalization can be effective at speeding up training by requiring up to 14 times fewer steps. Batch normalization can be performed over the training data at every depth slice using equation [1] below. Other normalization include local response normalization and local contrast normalization.

$$Y_d = \frac{x_d - E[X_d]}{\sqrt{\text{Var}[X_d]}} \qquad [1]$$

Classification or Fully Connected Layers. Fully connected (FC) layers are like regular neural network layers and are commonly employed after a sequence of convolutions, pooling and other layers. These layers compute the final output by connecting all the activations of the previous layer to the output neurons. Because of all-to-all connections, these layers can generate a lot of parameters and a considerable amount of memory traffic.

Several advances in deep learning have been made in recent years causing an explosion in the adoption of deep learning, especially in the field of computer vision. This widespread adoption has been made possible by better than human accuracies in object classification and recognition. The dominance of deep learning in the field of computer vision can be appreciated by reviewing the results of ImageNet Large Scale Visual Recognition Challenge (ILSVRC) over last few years. ILSVRC is an annual competition organized at Stanford University which evaluates algorithms for object detection and image classification at large scale. In 2010 and 2011 even the best of traditional computer vision techniques that were employed resulted in high error rates of 28% and 26% respectively. In contrast, deep learning approaches have brought the error rate down to a remarkably low value of 3.7% in only 4 years.

A major barrier to the adoption of more accurate deep learning algorithms by embedded devices that handle visual information, is their computational complexity. The increasing accuracy of Deep Learning algorithms has generally been achieved by employing increasingly deeper and larger networks. The number of CNN layers employed in ILSVRC challenge entries have gone up rapidly from 8 layer in 2012 (AlexNet) to 152 layers in 2015 (Resnet-152). Googlenet—a popular CNN developed at Google which was the winner of the 2014 ILSVRC—requires about 3 billion compute operations for one inference. To classify a single object at a 3.57% error rate, the 2015 IL SVRC winner ResNet-152, requires 0.3 trillion operations. The computational workload for computer vision systems in fully autonomous cars is expected to be in the range of 50-100 trillion compute operations per second (TOPS).

A DV processor can be utilized for deep learning algorithms, such as AlexNet, BN-AlexNet, BN-NIN, ENet, GooLeNet, ResNet-18, ResNet-50, ResNet-34, ResNet-101, ResNet-152, Inception-v3, Inception-v4, VGG-16, and VGG-19, to achieve accuracy above 50%, such as 60, 70, 80, 90, 99%, or higher. The number of operations the DV processor performs can be 5M, 35M, 65M, 95M, 125M, 155M, 200M Giga-Ops (GOPS) or more. The number of layers can be 8, 19, 22, 152, 200, 300, or more layers. The DV processor can be used for existing and new deep learning algorithms and architectures.

GPUs have been used for workloads that reach scales of TOPS. GPUs provide high computational throughput and at the same time they are fully programmable thus able to adapt to the changing deep learning network algorithms. They provide high computational throughput, can be fully programmable, thus able to adapt to the ever-changing complexity of deep learning network algorithms. This combination of performance and programmability however, comes at a price in terms of both power and dollar cost. One embedded GPU available today is Nvidia's Tegra X1, which offers 1 TOPS of performance but consumes 10-20 W of power and costs hundreds of dollars, putting it well beyond the cost and power budgets of most smaller embedded devices. Nvidia's Drive PX-2, the high-end GPU solution for autonomous cars, costs thousands of dollars and consumes hundreds of watts of power to deliver 20 TOPS/s of performance. Given the 50-100 TOPS performance requirements of these cars, a Drive PX-2 based system would cost thousands of dollars and consumes kilowatts of energy, which is not feasible for anything but extremely expensive high-end cars.

One approach to overcoming the computational challenges of deep learning networks on embedded systems is to develop fixed function hardware. However, the field of deep learning is evolving at such a pace that having any algorithm in hardware can run the risk of making the chip obsolete within a year. With the costs of making application-specific integrated circuits (ASICs) rising every year, such an approach can be infeasible.

In some embodiments, the programmable processor architecture disclosed herein, which unlike GPUs, can be specialized for deep learning-based computer vision tasks. A DV processor with the architecture can bring down the power-cost of deep learning computation by, for example, 50× compared to GPUs and bringing the dollar cost down by, for example, more than 10×. The DV processor architecture disclosed herein is well suited for the rapidly evolving field of deep learning, including different deep learning parameters, input channels and output depths. The DV architecture can keep the data as close to the processor as possible (or practicable or desirable) to amortize memory power dissipation. A DV processor implementing the DV processor architecture can be fully programmable and offers energy efficiency comparable to fixed function hardware.

A DV processor can be a low-power programmable image processor with high-efficiency for image-processing applications. A DV processor can handle deep learning tasks with orders of magnitude power-cost advantages compared to current industry standards. A In some embodiments, a DV processor can be an embedded computer vision processor used in the market segments of automotive safety, security cameras and self-guiding drone systems. A DV processor can be a low-cost processing solution with the high performance-power envelope compared to other processors.

Example Comparisons of GPUS, DSPs with Fixed Function CNNs, and DV Processors

FIG. 1 is an example plot comparing the performance of deep vision (DV) processors, digital signal processors (DSPs) with fixed function CNNs, and graphics processing units (GPUs). A DV processor can have high efficiency with a completely programmable architecture scalable from sub-1W cameras to large automotive systems. A DSP with a fixed function CNN can be more efficient than GPUs. However, a DSP may not adapt well to changing algorithm approaches. And a DSP with a fixed function CNN may have restricted critical memory and compute optimizations. A GPU can be a very flexible general purpose data-parallel engine, which can seamlessly scales from small to large systems. However, a GPU can have very high power, size, and cost.

GPUs can be inefficient for deep learning. For example, every core of a GPU can fetch data from storage to process a single pixel. For example, different cores of a GPU can fetch data of the same or different pixels from the L1 storage. The process of expensive data re-fetching can be power consumptive, resulting in significant hardware and energy overhead from large number of cores.

GPUs can require large expensive data stores. For example, an NVidia Tegra X1 processor can include a group of 32 cores sharing a 64 KB register file. The GPU needs to maintain data for multiple threads scheduled on each core. Each core may have to continuously read/write data back and forth from the large register file as it switches to different threads. With the 64 KB register file, each core (e.g., each core can have 2 arithmetic logic units) requires 2 KB of register store.

Figure 2:
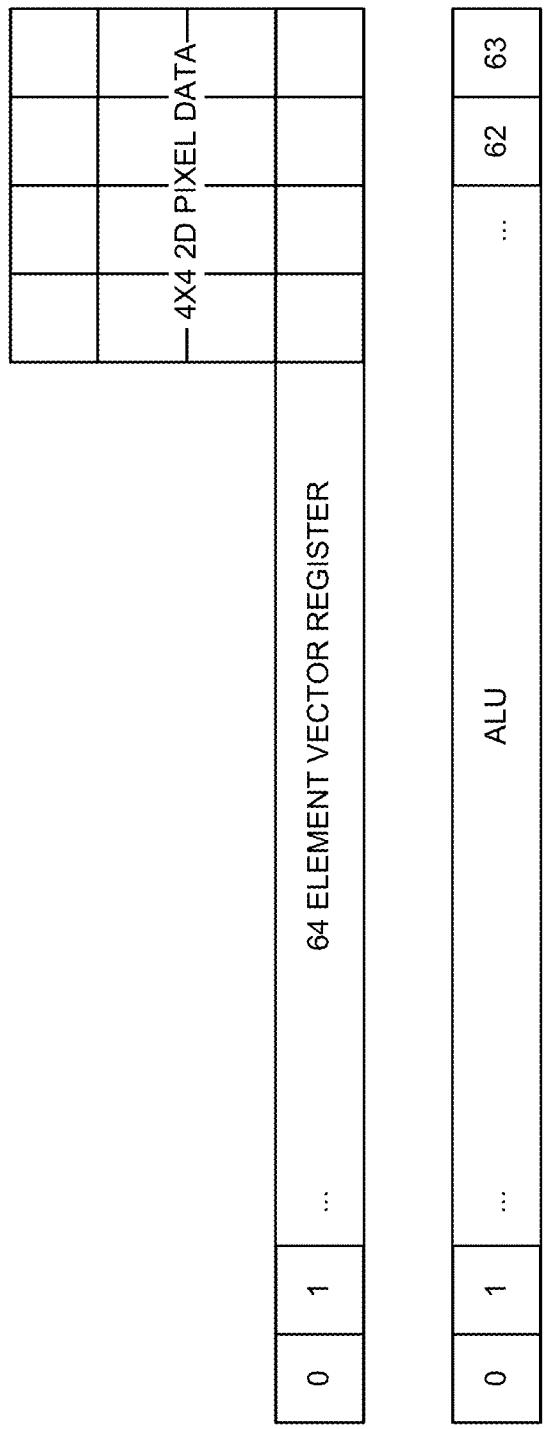
FIG. 2 is an example schematic illustration comparing signal dimensional digital signal processors that are single-dimensional and two-dimensional (2D) pixel data.

Digital signal processors (DSPs) can be single-dimensional or one dimensional (1D) and require data shuffling to work with two-dimensional (2D) pixel data. FIG. 2 is an example schematic illustration comparing signal dimensional digital signal processors that are single-dimensional and two-dimensional pixel data. DSP processors are inherently 1D and operate on one pixel row at a time. Thus, executing overlapping 2D stencils require unnecessary data shuffling. For example, a two-dimensional pixel data can have a dimension of 4×4. Even though a 64-element vector register can store the 16 elements of the two-dimensional pixel data, data shuffling can be required to transform the 4×4 pixel data into one-dimensional data.

Utilization of SIMD can drop if its vector size is increased to gain more parallelism. This can occur for smaller images. This can also occur for multiple very long instruction word (VLIW) slots, which may be alleviated by using multiple small vectors operations. But, register file (RF) area and energy cost can increase substantially due to increase in number of ports as well as need for data bypass and interlocks checking against multiple instruction slots. In some embodiments, a DV processor can have register file area and energy cost lower than a DSP. The DV processor may have the same number or a different number of ports (e.g., more ports or fewer ports), compared to the DSP. The DV processor in some implementations may or may not implement data bypass and/or interlocks checking against multiple instruction slots.

Figure 3:
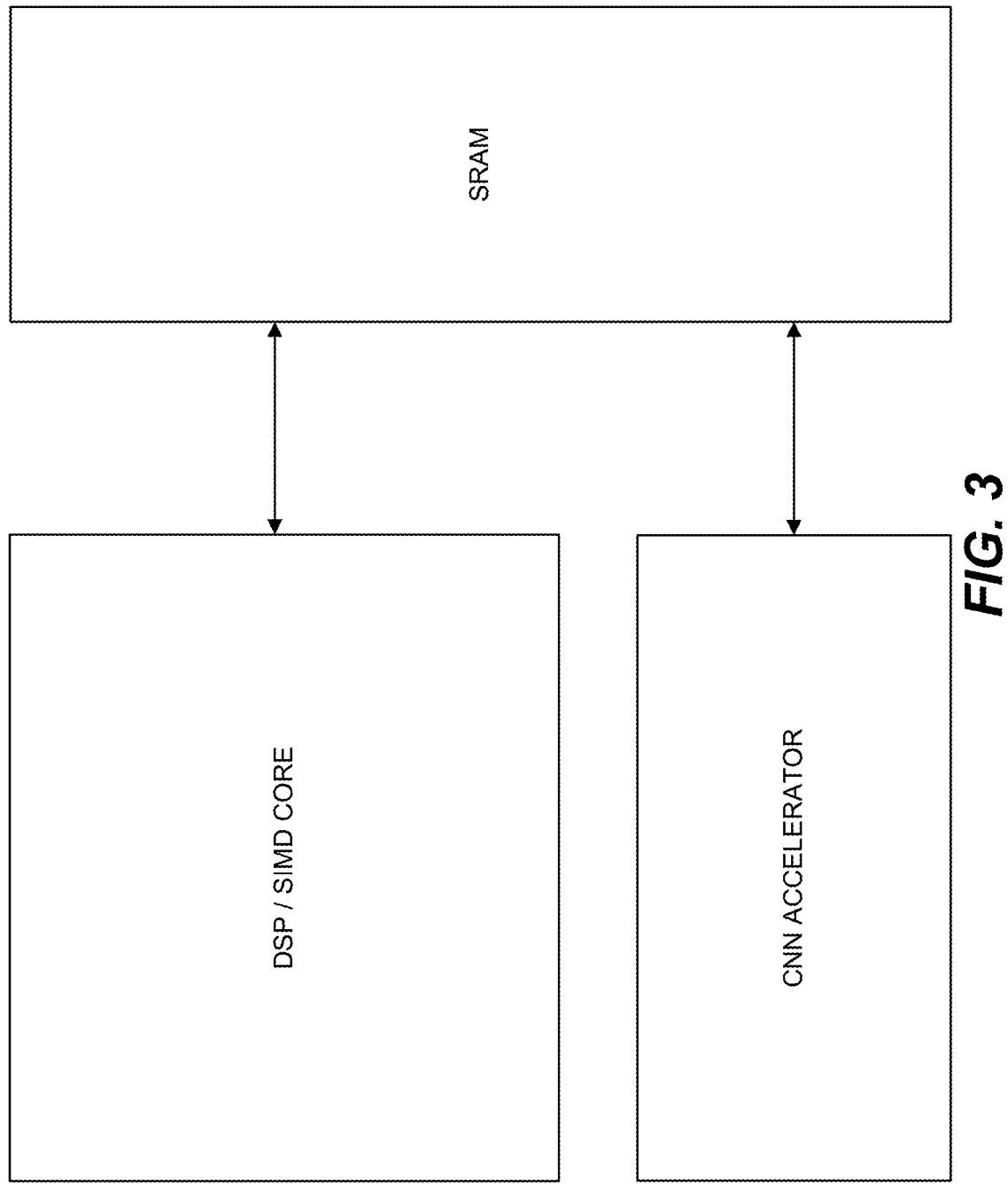
FIG. 3 shows an example processor architecture with a digital signal processor/single instruction multiple data (SIMD) core and a convolution neural network accelerator in communication with static random access memory (SRAM).

Adding a deep learning accelerator to a DSP may not improve DSP efficiency. FIG. 3 shows an example processor architecture with a digital signal processor or single instruction multiple data (SIMD) core and a convolution neural network (CNN) accelerator in communication with static random access memory (SRAM). The structure of CNN computations can be changing. For example, AlexNet requires 11×2D convolutions while the Inception-v2 network can require 1×3 and 3×1 1D convolutions. Many CNN computations may need to be performed on the DSP or SIMD core, which can require a lot of back and forth communication between the DSP or SIMD core and the CNN accelerator through an SRAM. Such back and forth communication can incur a large energy cost. A CNN accelerator may not accelerate other algorithms, such as feature extraction, segmentation, or long short term memory (LSTM).

Execution overhead and data movement can dominate power and cost of a processor. Instruction execution overheads can include those associated with load store units, cache management, pipeline management, data bypass logic, register file, compute operations, instruction fetch, instruction decode, sequencing and branching, or exception handing. Relative to compute operations, L1 memory fetch, L2 memory fetch, and DRAM fetch can consume 50×, 400×, and 2000× the amount of energy. For a processor, compute operations can use 1% of the total processor power consumption, while execution overhead and data movement can consume 20% and 79% respectively of the total processor power consumption.

Example Convolution Engine Architecture and Deep Vision Processor Architecture A convolution Engine (CE) can be a programmable processor. Certain embodiments of a CE engine has been disclosed in U.S. Pat. No. 9,477,999, the content of which is hereby incorporated by reference in its entirety. Briefly, a CE can implement instruction set architecture (ISA) specialized for data-flow prevalent in computational photography, traditional computer vision, and video processing.

In some embodiments of a CE or a DV processor, by not requiring full programmability and instead targeting key data-flow patterns used in deep learning, the processor can be efficient and programmed and reused across a wide range of applications. A CE or a DV processor can encapsulate the Map-Reduce abstraction shown in Equation [2] below.

$$Img \overset{CE \text{ or } DV}{*} f[n,m] = R_{|l|<c}\{R_{|k|<c}\{\text{Map}(Img[k], f[n-k, m-l])\}\} \quad [2]$$

TABLE 2

Comparison of power (watts) and performance (milliseconds) of traditional CV.

| | Map | Reduce | Stencil Sizes | Data Flow |
|---|---|---|---|---|
| IME SAD | Abs diff | Add | 4 × 4 | 2D convolution |
| FME ½ pixel up-sampling | Multiply | Add | 6 | 1D horizontal and vertical convolution |
| FME ¼ pixel up-sampling | Average | None | — | 2D matrix operation |
| SIFT Gaussian blur | Multiply | Add | 9, 13, 15 | 1D horizontal and vertical convolution |
| SIFT DOG | Subtract | None | — | 2D matrix operation |
| SIFT extrema | Compare | Logical AND | 9 × 3 | 2D convolution |
| Demosaic interpolation | Multiply | Complex | 3 | 1D horizontal and vertical convolution |

Abbreviations are as the follows: Integral motion estimation (IME) sum of absolute differences (SAD), fractional motion estimation (FME), SIFT (scale invariant feature transform), and difference of Gaussian (Dog).

A CE or a DV processor architecture can define an abstract computation model, referred to as Map-Reduce. This Map-Reduce computation abstraction is a generalized representation of the entire domain of algorithms using a convolution-like stencil based data-flow. Equation [2] shows this generalized computation model, and Table 2 shows how various classical imaging operations can be expressed as Map-Reduce computations by choosing the appropriate Map, and Reduce functions and stencil sizes.

The 2D shift register can be the main storage buffer for the image data. Unlike a traditional register file, which is accessed one row at a time, this register allows the capability to read its rows, columns, or even 2D sub-blocks. It also provides horizontal and vertical data-shifting capabilities to support the convolution-like sliding windows data-flows. The 2D coefficient register is similar to 2D shift register but has no shifts. The 2D coefficient register is used to store convolution coefficients or other "constant" data which does not change while different parts of an image or video frame are processed. The Output Register file is a more traditional Vector/SIMD register file with row-only access. This can be used by the SIMD engine which sits alongside the Map-Reduce core and also acts as the intermediate output register for the Map-Reduce core.

A CE or a DV processor can include a number of interface units (IFs), ALUs, reduce units, and SIMDs. The interface units such as Horizontal IF, Vertical IF, and 2D IF can be used for reading the appropriate row, column or 2D data stencils of appropriate sized out of the registers and routing them to the ALUs based on the size and type of computation. The ALU layer can incorporate 64, 128, 256, or more ALUs which can operate in parallel to implement large number of compute operations in a single instruction. The registers, interface units and ALUs implement the "Map" part of the Map-Reduce abstraction. The reduce unit support the "Reduce" abstraction providing support for various reduction types including arithmetic, logical and generalized graph reduction. In addition to the Map-Reduce core, a CE or DV processor can include a wide SIMD engine to support those data-parallel operations which do not map well to the Map-Reduce abstraction. In some embodiments, a smart interconnect of a DV processor can implement a number of interface units of a mapping unit.

Figure 4:
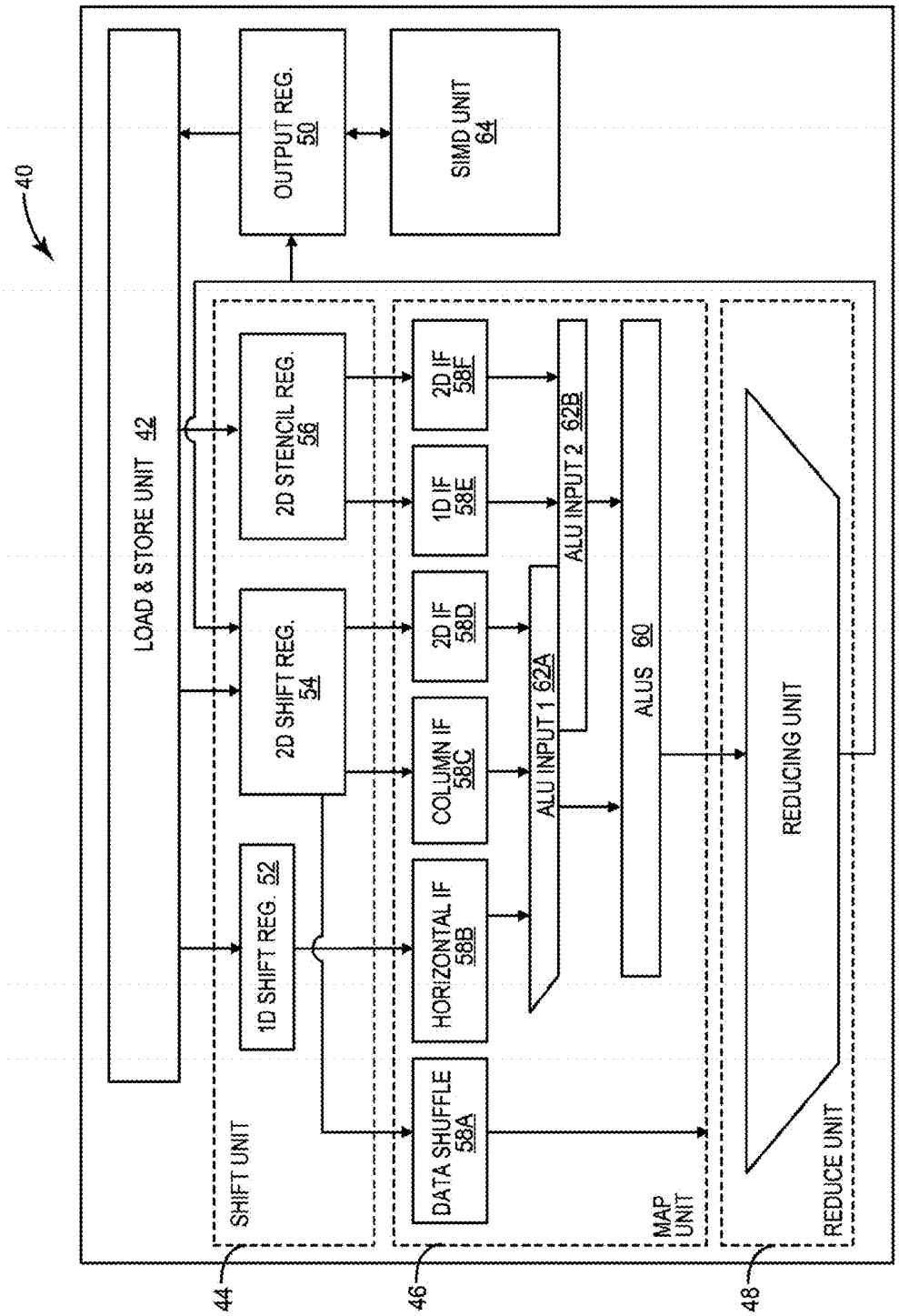
FIG. 4 shows an example architecture of some embodiments of a convolution engine (CE) or DV processor.

FIG. 4 shows an example architecture of some embodiments of a CE or DV processor. The CE or DV processor 40 can include a load and store unit 42, a shift register unit 44, a mapping unit 46, a reduction unit 48, and an output register 50. The load and store unit 42 loads and stores image pixel data and stencil data to and from various register files. To improve efficiency, the load and store unit 42 supports multiple memory access widths and can handle unaligned accesses. In one embodiment, the maximum memory access width of the load and store unit 42 is 256-bits. Further, in another embodiment, the load and store unit 42 provides interleaved access where data from a memory load is split and stored in two registers. This may be helpful in applications such as demosaic, which requires splitting the input data into multiple color channels. By designing the load and store unit 42 to support multiple memory access widths and unaligned accesses, the flexibility of the data flow in the CE or DV processor 40 is vastly improved. That is, any of the data in the load and store unit 42 may be accessed via a single read operation, which saves both time and power.

The shift register unit 44 includes a number of 1-dimensional and 2-dimensional shift registers. Specifically, the shift register unit 44 includes a first 1-dimensional shift register 52, a 2-dimensional shift register 54, and a 2-dimensional stencil register 56. In general, the first 1-dimensional shift register 52, the 2-dimensional shift register 54, and the 2-dimensional stencil register 56 provide a subset of image pixel data from the load and store unit 42 to the mapping unit 46, allowing new image pixel data to be shifted in as needed. The first 1-dimensional shift register 52 may be used by the CE or DV processor 40 for a horizontal convolution process, in which new image pixels are shifted horizontally into the 1-dimensional shift register 52 as a 1-dimensional stencil moves over an image row. The 2-dimensional shift register 54 and the 2-dimensional stencil register 56 may be used for vertical and 2-dimensional convolution processes. Specifically, the 2-dimensional shift register 54 may be used to store image pixel data, while the 2-dimensional stencil register 56 may be used to store stencil data. The 2-dimensional shift register 54 supports vertical row shift: one new row of image pixel data is shifted into the 2-dimensional shift register 54 as a 2-dimensional stencil moves vertically down into the image. The 2-dimensional shift register 54 further provides simultaneous access to all of the image pixels stored therein, thereby enabling the shift register unit 44 to simultaneously feed any number of desired image pixels to the mapping unit 46. A standard vector register file, due to its limited design, is incapable of providing the aforementioned functionality.

The 2-dimensional stencil register 56 stores data that does not change as the stencil moves across the image. Specifically, the 2-dimensional stencil register 56 may store stencil data, current image pixels, or pixels at the center of windowed min/max stencils. The results of filtering operations from the mapping unit 46 and the reduction unit 48 are written back either to the 2-dimensional shift register 54 or to the output register 50. The output register 52 is designed to behave both as a 2-dimensional shift register as well as a vector register file. The shift register behavior of the output register 50 is invoked when the data from the reduction unit 48 is written to the output register 50. The shift register functionality of the output register simplifies register write logic and reduces energy, which is especially useful when the stencil operation produces the data for just a few locations and the newly produced data needs to be merged with existing data which would normally result in a read modify and write operation. Specifically, by shifting the write location of the output register 50 to the next empty element upon each write operation from the reduction unit 48, time and energy may be saved in the CE or DV processor 40. The vector register file behavior of the output register 50 is invoked when the output register file is interfaced with a vector unit of some kind.

Using the 2-dimensional shift register 54 and the 2-dimensional stencil register 56 in the shift register unit 44 makes the CE or DV processor 40 tailored to the storage and access of image pixel data. Specifically, because image pixel data includes both rows and columns of image pixel values, storing and accessing the image pixel data as in a 2-dimensional register leads to significant advantages in the efficiency and performance of the convolution image processor when storing or accessing the data. As discussed above, data overheads such as predicting, fetching, storing, and accessing data in memory account for a large portion of the processing time in general purpose processors. Accordingly, the CE or DV processor 40 is far more efficient and performs better than such general purpose processors.

The mapping unit 46 includes a number of interface units (IFs) 58A-58F and a number of arithmetic logic units (ALUs) 60. The IFs 58 arrange image pixel data provided by one of the shift registers in the shift register unit 44 into a specific pattern to be acted upon by the ALUs 60. Arranging the data may include providing multiple shifted 1-dimensional or 2-dimensional blocks of image pixel data, providing access to multiple shifted vertical columns of image pixel data, or providing multiple arbitrary arrangements of image pixel data. All of the functionality required for generating multiple shifted versions of the image pixel data is encapsulated in the IFs 58. This allows a shortening of wires by efficiently generating the image pixel data required by the ALUs 60 within one block while keeping the rest of the data-path of the CE or DV processor 40 simple and relatively free of control logic. Since the IFs 58 are tasked to facilitate stencil based operations, multiplexing logic for the IFs 58 remains simple and prevents the IFs 58 from becoming a bottleneck.

The IFs 58 may include a number of task-specific IFs 58 configured to arrange image pixel data in a particular way. Specifically, the IFs 58 may include a data shuffle IF 58A, a horizontal IF 58B, a column IF 58C, a first 2-dimensional IF 58D, a 1-dimensional IF 58E, and a second 2-dimensional IF 58F. The data shuffle IF 58A may be coupled to the 2-dimensional shift register 54 and configured to provide one or more arbitrary arrangements of image pixel data from the 2-dimensional shift register 54 to the reduction unit 48. The horizontal IF 58B may be coupled to the 1-dimensional shift register 52 and configured to provide multiple shifted versions of a row of image pixel data from the 1-dimensional shift register 52 to a first input 62A of the ALUs 60. The column IF 58C may be coupled to the 2-dimensional shift register 54 and configured to provide multiple shifted versions of a column of image pixel data from the 2-dimensional shift register 54 to the first input 62A of the ALUs 60. The first 2-dimensional IF 58D may be coupled to the 2-dimensional shift register 54 and configured to provide multiple shifted versions of a 2-dimensional block of image pixel data from the 2-dimensional shift register 54 to the first input 62A of the ALUs 60. The 1-dimensional IF 58E may be coupled to the 2-dimensional stencil register 56 and configured to provide multiple shifted versions of a 1-dimensional block of stencil data (either row or column) from the 2-dimensional stencil register 56 to a second input 62B of the ALUs 60. The second 2-dimensional IF 58 F may be coupled to the 2-dimensional stencil register 56 and configured to provide multiple shifted versions of a 2-dimensional block of stencil data from the 2-dimensional stencil register 56 to the second input 62B of the ALUs 60. Multiple data sizes are supported by each one of the IFs 58 and an appropriate one may be selected.

Since all of the data re-arrangement is handled by the IFs 58, the ALUs 60 are simply fixed point two-input arithmetic ALUs. The ALUs 60 may be configured to perform arithmetic operations such as multiplication, difference of absolutes, addition, subtraction, comparison, and the like on a given image pixel and stencil value. The mapping unit 46 may be programmable, such that the particular arrangement of image pixel data provided to each one of the ALUs 60 by the IFs 58 and the operation performed by each one of the ALUs 60 can be selected, for example, by a user. Providing such flexibility in the mapping unit 46 allows the convolution image processor 40 to implement a large number of convolution operations such that the convolution image processor can perform a variety of image processing techniques. The versatility of the mapping unit 46, when combined with the efficiency of the shift register unit 44, results in a convolution image processor 40 that is highly efficient due to data write and access patterns in both the shift register unit 44 and the mapping unit 46 that are tailored to image pixel data and highly versatile due to the programmability of the mapping unit 46.

The output of each one of the ALUs 60 is fed to the reduction unit 48. In general, the reduction unit 48 is configured to combine at least two of the resulting values from the mapping unit 46. The number of resulting values from the mapping unit 46 combined by the reduction unit 48 is dependent upon the size of the stencil used in the convolution process. For example, a 4×4 2-dimensional stencil requires a 16 to 1 reduction, while a 2×2 2-dimensional stencil requires an 8 to 1 reduction. The reduction unit 48 may be implemented as a tree and outputs can be tapped out from multiple stages of the tree. In one embodiment, complex reductions may be performed by the reduction unit 48 in order to increase the functionality of the CE or DV processor 40, as discussed in further detail below.

As an example of the operation of the CE or DV processor 40, a convolution process using 4×4 2-dimensional stencil data is now described. Stencil data from the load and store unit 42 is loaded into the first four rows of the 2-dimensional stencil register 56. Further, four rows of image pixel data are shifted into the first four rows of the 2-dimensional shift register 54. In the present example, there are 64 ALUs 60 in the mapping unit 46. Accordingly, up to four 4×4 2-dimensional blocks may be operated on in parallel. The first 2-dimensional IF 58D thus generates four shifted versions of 4×4 2-dimensional blocks of image pixel data from the 2-dimensional shift register 54 and feeds them to the first input 62A of the ALUs 60. The second 2-dimensional IF 58F copies the 4×4 2-dimensional stencil four times and sends each stencil value to the second input 62B of the ALUs 60. Each one of the 64 ALUs 60 then performs an element-wise arithmetic operation (e.g., multiplication) on a different image pixel and corresponding stencil value. The 64 resulting values are then delivered to the reduction unit 48, where they are combined with the other resulting values from the 4×4 block in which they originated for a 16 to 1 reduction, for example, by summing the resulting values for each 4×4 block. The four outputs of the reduction unit 48 are then normalized and written to the output register 50.

Since the registers contain data for sixteen filter locations, the same operation described above is continued, however, the first 2-dimensional IF 58D employs horizontal offset to skip over locations that have already been processed and get new data while the rest of the operations described above continue to execute. Once sixteen locations have been filtered, the existing rows are shifted down and a new row of image pixel data is brought into the 2-dimensional shift register 54 from the load and store unit 42. The data processing then continues in the vertical direction. Once all rows have been operated on, the process is started again from the first image row, processing the next vertical stripe and continuing execution until the whole input data has been filtered.

For symmetric stencils, the IFs 58 combine the symmetric data before coefficient multiplication (since the stencil values are the same). Accordingly, the ALUs 60 may be implemented as adders instead of multipliers. Since adders take 2-3× less energy than multipliers, the energy consumption of the CE or DV processor may be further reduced.

TABLE 3

Exemplary convolution engine instructions and functions

| Instruction | Function |
|---|---|
| SET_CE_OPS | Set arithmetic functions for MAP and operations |
| REDUCE | Set convolution size |
| SET_CE_OPSIZE | Load n bits to specified row of 2-dimensional coefficient register |
| LD_COEFF_REG_n | Load n bits to 1-dimensional shift register; optional shift left |
| LD_1D_REG_n | Load n bits to top row of 2-dimensional shift register; option shift row down |
| LD_2D_REG_n | Store top row of 2D output register to memory 1-dimensional convolution step - input from 1- dimensional shift register |
| STD_OUT_REG_n | 1-dimensional convolution step - column access to 2-dimensional shift register |
| CONVOLVE_1D_HOR | 2-dimensional convolution step with 2-dimensional access to 2-dimensional shift register |
| CONVOLVE_1D_VER | Set arithmetic functions for MAP and operations |
| CONVOLVE_2D | Set convolution size |

In one embodiment, an additional SIMD unit 64 may be provided in the CE or DV processor 40 to enable an algorithm to perform vector operations on the output data located in the output register 50. The SIMD unit 64 may interface with the output register 50 to perform regular vector operations. The SIMD unit 64 may be a lightweight unit which only supports basic vector add and subtract type operations and has no support for higher cost operations such as multiplications found in a typical SIMD engine. An application may perform computation that conforms neither to the convolution block nor to the vector unit, or may otherwise benefit from a fixed function implementation. If the designer wishes to build a customized unit for such computation, the convolution image processor allows the fixed function block to access its output register 50. In one exemplary embodiment, additional custom functional blocks such as those used to compute motion vector costs in IME, FME, and Hadamard Transform in FME are implemented in additional SIMD units 64.

In one embodiment, the CE or DV processor 40 is implemented as a processor extension, adding a small set of convolution engine instructions to the processor instruction set architecture (ISA). The additional convolution engine instructions can be issued as needed in software through compiler intrinsics. Table 3 lists a number of exemplary instructions and their functions that may be used with the CE or DV processor 40 according to various embodiments.

TABLE 4

Comparison of power (watts) and performance (milliseconds) of traditional CV algorithms running on one DV core compared to Intel Iris 5100 GPU. A DV core can achieve similar performance at 1/80$^{th}$ of the power.

|  | CE (1 core) | | Intel Iris 5100 GPU | |
| --- | --- | --- | --- | --- |
|  | Performance | Power | Performance | Power (W) |
| Canny Edge Detection (HD) | 0.73 msec | 0.133 W | 0.67 msec | 11.0 W |
| Gaussian Blur, 7x7 (HD) | 2.71 msec | 0.137 W | 2.80 msec | 12.5 W |
| Laplacian Filter, 7x7 (HD) | 5.51 msec | 0.135 W | 5.51 msec | 11.6 W |
| Image Classification (HD) | 0.89 ms | 134 mW | 0.79 ms | 12.0 W |

A DV processor can implement a new Instruction Set Architecture, Register File Organization and data-path interconnects to make the processor a better fit for deep learning. In some embodiments, a DV processor can implement features of some embodiments of a CE. For example, a DV processor can perform traditional CV algorithms. A DV processor can have additional support for Deep Learning, as well a processor microarchitecture for additional optimizations enabled by Deep Learning. The area and power requirement of the architecture can be further reduced. The ISA of a DV processor can be based on a novel register file organization as well a smart interconnect structure which allows the DV processor to effectively capture data-reuse patterns, eliminate data transfer overheads, and enable a large number of operations per memory access. In some embodiments, a DV processor improves energy and area efficiency by 8-15× over data-parallel Single Instruction Multiple Data engines for most image processing applications, and by over 30× compared to GPUs. Significantly the resulting architecture can be within a factor of 2-3× of the energy and area efficiency of custom accelerators optimized for a single kernel, despite offering a fully programmable solution. Table 4 shows example performance of a DV.

Improvements of DV. Deep learning based networks support important operations other than convolutions, such as pooling, rectified linear unit layers (RELU) and matrix vector multiplications. These operations can be used extensively in classifier layers. The instruction set of the DV processor architecture is diverse enough to support in the data-path to handle some or all deep learning constructs efficiently. This support is enables the DV processor architecture to support compiler optimizations making it easier to write code for deep networks. In some embodiments, a DV processor has better performance and higher efficiency than some earlier embodiments of a CE.

Register File Architecture. Some embodiments of a convolution engine or a DV processor employ a two-dimensional shift register file to facilitate stencil based data-flow. The register file has the capability to independently shift in the horizontal as well as the vertical directions allowing the CE or DV processor to exploit data-reuse in both one and two-dimensional kernels with equal ease. While the shift register may be well suited for executing convolutions of various sizes, its inability to grant access to its individual entries, like a regular register file, may present challenges regarding supporting other deep learning layers, such as RELU, fully-connected layers, 1×1 convolutions in some earlier embodiments of a CE. Some embodiments of a DV processor address these challenges. Some embodiments of a CE or a DV can address this challenge by using a separate register file for SIMD operations, resulting in additional data transfers between two separate register files. The power and performance may decrease. In some embodiments, a DV processor employ one register file that can efficiently support convolutions as well as RELU, fully-connected and normalization layers.

Furthermore, the shift register of some embodiments of a CE can be designed to shift the whole register file regardless of the size of the shift being executed, which can use register file energy (e.g., for small kernels such as 3×3 kernel which are prevalent in deep learning networks). In some embodiments of a DV processor, the whole register file may not need to be shifted (e.g., depending on the size of the shift being executed). Additionally or alternatively, the shift register file of some embodiments of a DV processor can store data corresponding to multiple deep learning channels simultaneously. This improves reuse of input channel data by multiple depth kernels, decreasing traffic between the processor and L1 memory and memory power usage. In some embodiments, the DV processor can utilize a register file for accessing access and shift register file entries in groups where the size of each group corresponds to the kernel size.

The shift register file architecture of a DV processor may not require shifting all entries at every access, allowing the shift register file to be implemented on an ASIC using traditional register file compilers, resulting in smaller area and energy usage. In some embodiments, the shift register file of a DV processor can have a flip-flop based implementation.

In some implementations, to effectively support deep learning, the DV processor implements a register file that allows shift operation on groups of register file entries with the ability to store multiple groups concurrently. This would improve reuse of channel data by the depth kernels inside the processor, cutting down on memory traffic between the processor and the L1 cache. In addition to shift operation, the DV processor can also support other means of accessing individual register file entries to support layers in addition to convolutions, such as RELU, fully-connect and normalization layers. A DV processor may have these attributes while being implemented using a traditional register file compiler, thus minimizing area and energy usage.

Smart Interconnect. The smart interconnect is an important component of a CE and a DV processor in some implementations. The smart interconnect can directly influence CE's or DV processor's programmability. Because the interconnect supports multiple kernel sizes, it contains multiple large multiplexers and numerous wires. Some embodiments of a DV processor can address congestion created by the wires and the multiplexers, thus requiring fewer pipeline stages to meet the timing constraints. With fewer multiplexers, the area can advantageously be smaller.

In some embodiments, the DV processor utilize a popular deep learning kernel size (e.g., the 3×3 kernel size) as the basic building block to reduce congestion in the interconnect. By supporting one kernel size (or one or more kernel sizes) as the basic building block and building bigger kernel sizes on top of the basic building block, the implementation of the interconnect of a DV processor can be made less complex. This could alleviate pressure on the wires and the multiplexers, but can make room for other programmability options.

SIMD. Some embodiments of a CE or a DV processor support SIMD operations, including simple additions and subtractions. In some embodiments of a CE or a DV processor, a register file separate from the shift register file is employed because SIMD operations operate on individual register file entries.

In some embodiments, the DV processor disclosed herein expands the SIMD instructions of some embodiments of a CE to proficiently support the deep learning constructs. Apart from regular SIMD instructions such as multiplications, additions and subtractions, the DV processor can be explicitly optimized for matrix-vector and matrix-matrix multiplication to efficiently support 1×1 convolutions and fully-connected layers. In this regard the DV processor can leverage the components used to support the Map and Reduce logic in stencil instructions and optimize them to be used with SIMD operations to support matrix-vector and matrix-matrix operations.

One challenge with traditional SIMD register files is that the width of register file entries must match the SIMD width. A wide SIMD array would require a wide register file entry. Because of micro-architectural limitations, the size of the register files cannot be made arbitrarily large. Also, keeping large register file entries full becomes infeasible for all but a few operations. In some implementations, the SIMD width of the DV processor can be large, but without the width of the register file entries being increased. In this regard, register file groups can be configured such that multiple register file entries can be joined together to work as one. This would also the DV processor to use just one register file entry when the data is small and use groups of register files together when data is large.

In some embodiments, a DV processor can implement the architectural modifications described herein to expand the scope of some embodiments of a CE to effectively address the performance and energy needs of both traditional computer vision as well as deep learning.

Example of Deep Vision Processor Architecture

Figure 5:
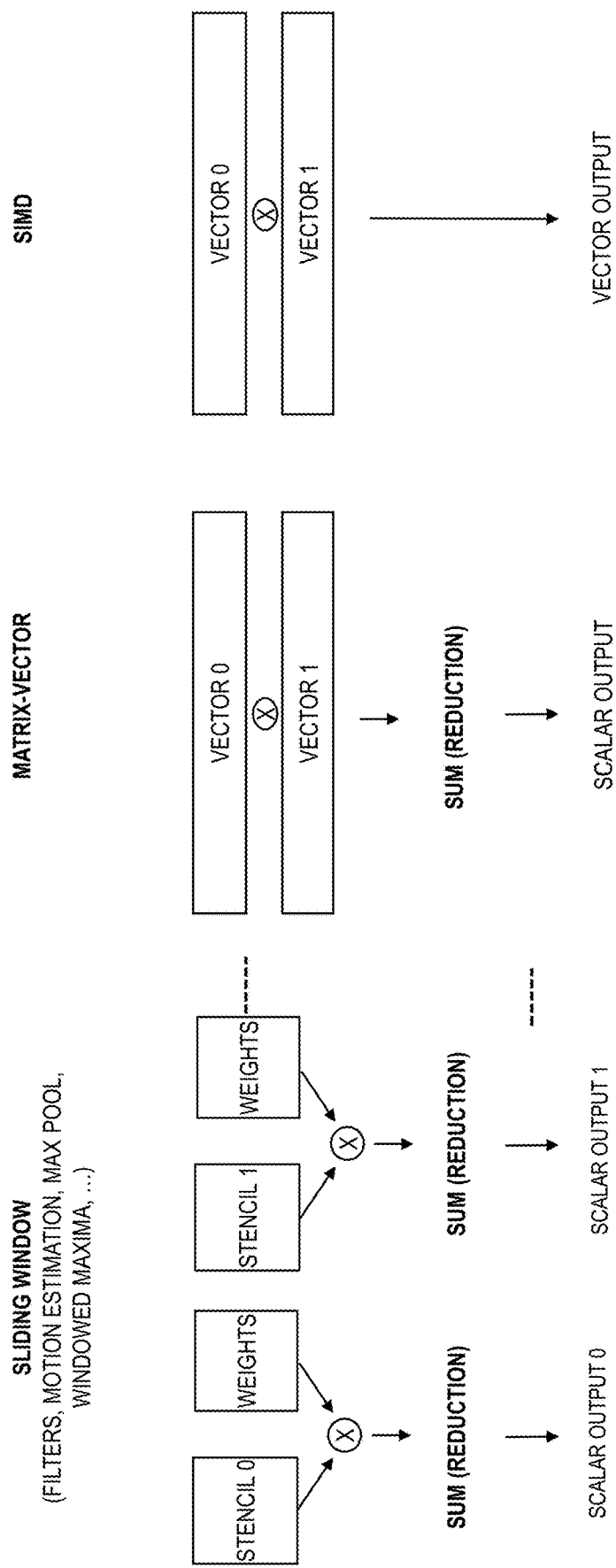
FIG. 5 shows three example computation flows of a DV core.

In some embodiments, a deep vision (DV) processor architecture extend the Instruction Set Architecture, Register File Organization and data-path interconnects to make them a better fit for deep learning. FIG. 5 shows three example computation flows of a DV core. Pixel processing computations can be abstracted as one of three computation flows: a sliding window, a matrix-vector computation, and a SIMD computation in a DV processor. The DV processor architecture can combine efficient support for all three computation flows in a single core. Some computation flows using a DV processor architecture are illustrated with reference to figures below.

The DV processor can be programmable, scalable, or low power. The DV processor can have programmable performance achieved at power/cost close to a fixed function processor. The DV processor can be used for the entire range of vision algorithms, such as deep learning/CNN, traditional computer vision such as optical flow, segmentation, feature extraction, vector-vector and matrix vector operations, recurrence and LSTMs. The DV processor architecture can be scalable and programmable. For example, one homogenous core can be replicated multiple times to scale to high performance levels. As another example, a DV runtime drivers can automatically scale the software to make use of larger or fewer number of core, abstracting these details away from the developer. Automated mapping (e.g., in software) can support broad range of CNN frameworks. A DV processor can have an optimized micro-architecture for various deep learning networks. A DV processor can enable computationally challenging tasks to be performed by embedded devices. A DV processor can have a smaller overall footprint, and improved performance-power envelope.

In some implementations, the DV processor can be efficient. It can minimize memory accesses, even to the L1 memory. For example, data can reside in a small low-energy buffer inside the processor core for as long as it can. A large degree of parallelism can be possible within a single core. For example, the cost of instruction execution machinery can be amortized. Hundreds of arithmetic logic units (ALU) operations per core can be possible.

Figure 6:
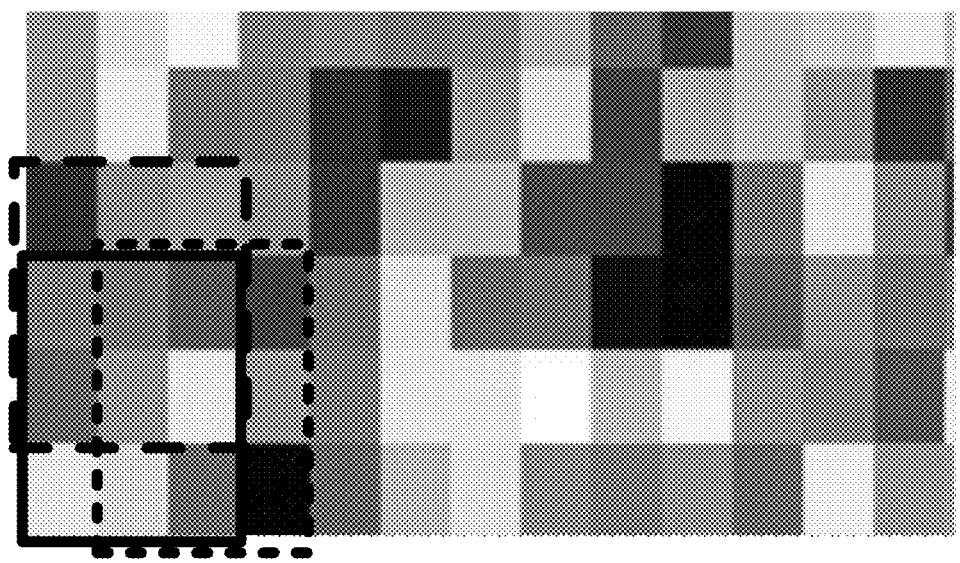
FIG. 6 is an example illustration of efficiency opportunities in deep learning workload.
Figure 7:
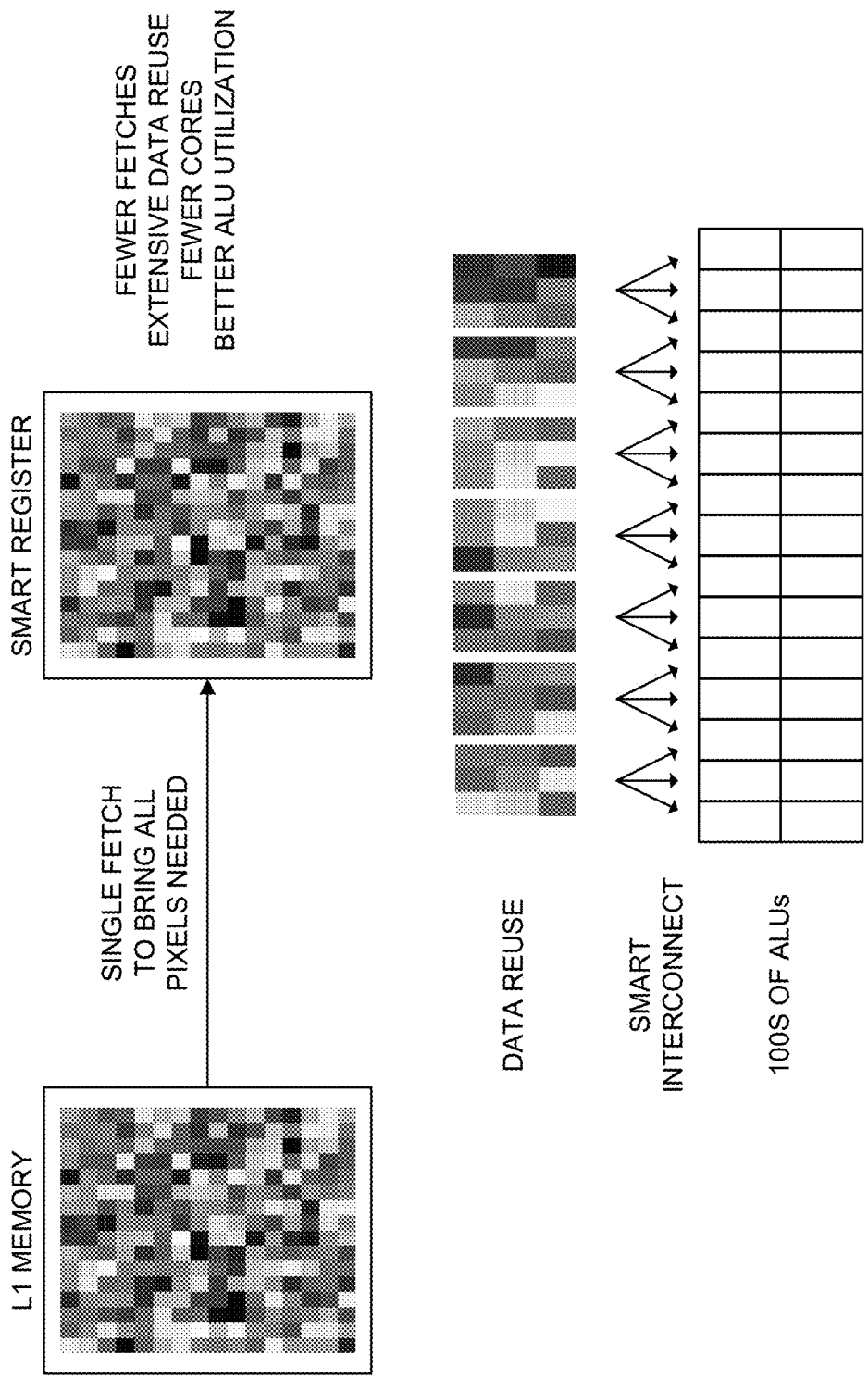
FIG. 7 is an example illustration of a deep vision (DV) processor architecture taking advantage of the opportunity of data reuse.

FIG. 6 is an example illustration of efficiency opportunities in deep learning workload. The figure shows three overlapping windows of pixels, which can create opportunity for data reuse, for example, within a single processor core. FIG. 7 is an example illustration of a deep vision (DV) processor architecture, which take advantage of the opportunity of data reuse. Pixel data of all pixels needed can be brought from the L1 memory to a smart register. The architecture can result in fewer fetches needed. With extensive data reuse, through a smart interconnect, 100s of arithmetic logic units can have better utilization. In some embodiments, fewer cores may be needed.

The DV processor can include a proprietary register file and Register-to-ALU interconnect architecture. The register file can provide direct support for various access patterns involved in image and media processing, such as 2D stencils, 1D stencils, column accesses, 2D vectors and traditional 1D vectors. The register file can eliminate some or all need for expensive data shuffles by retaining some or most of the data in a small data store, thus minimizing need to go to more costly memory (e.g., L1 memory). The DV processor can achieve high amount of parallelism (256 16-bit ALU operations) in a simple single-issue processor core with a 2Read-1Write register file.

Figure 8:
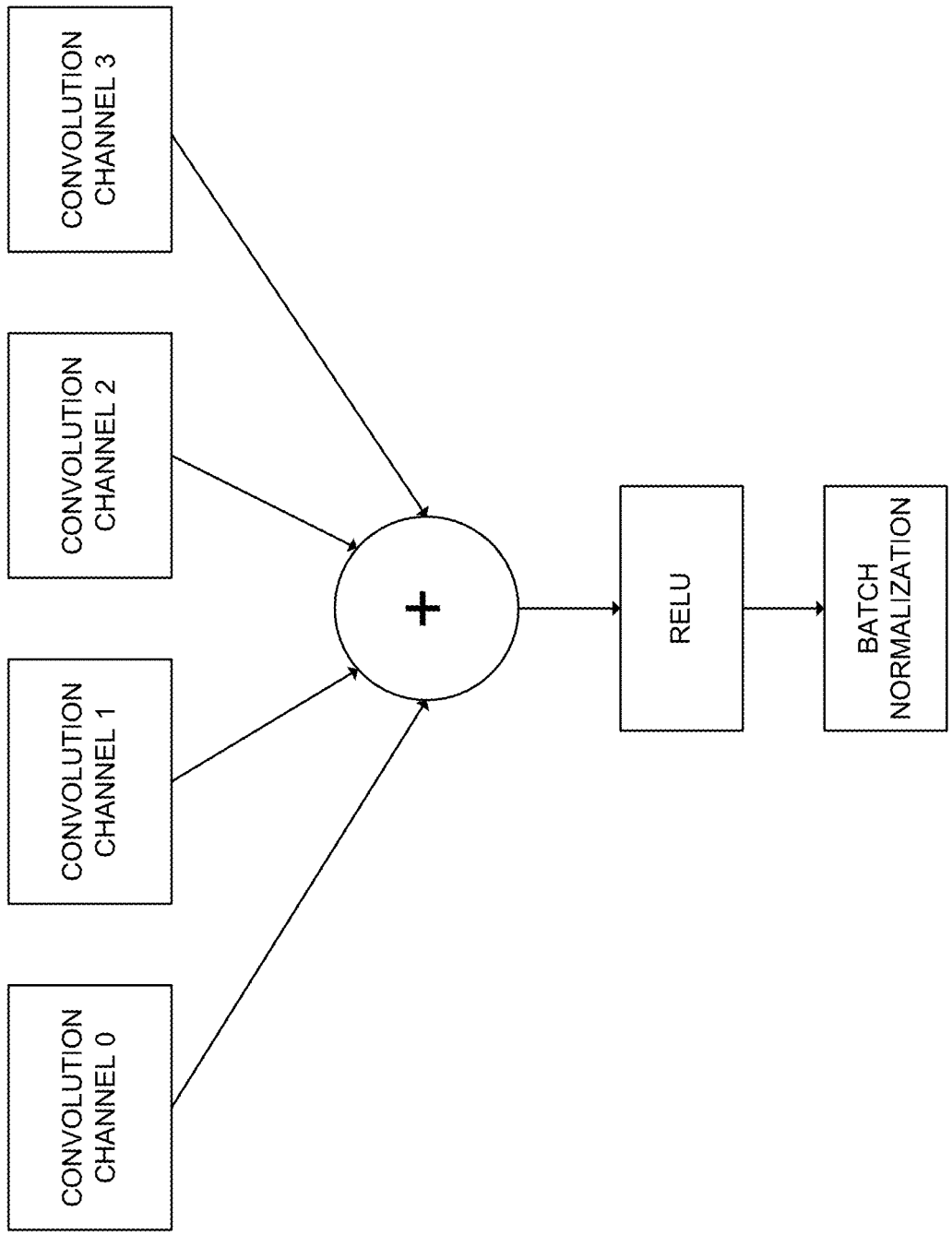
FIG. 8 shows example computations for a convolutional neural network.

FIG. 8 shows example computations for a convolutional neural network (CNN). A CNN can include a convolution layer, followed by a Rectified Linear Unit (ReLU) layer, and a batch normalization layer. In one implementation, a DV core of a DV processor can obviate the intermediate write to memory by retaining data from multiple compute operations (e.g., operations for convolutions) in the register file. In contrast, a SIMD processor with a CNN accelerator can require a write-back of high precision intermediate results to memory after each convolution. Batch Norm may not be accelerated in DSP, whereas it is accelerated by the DV core.

Figure 9:
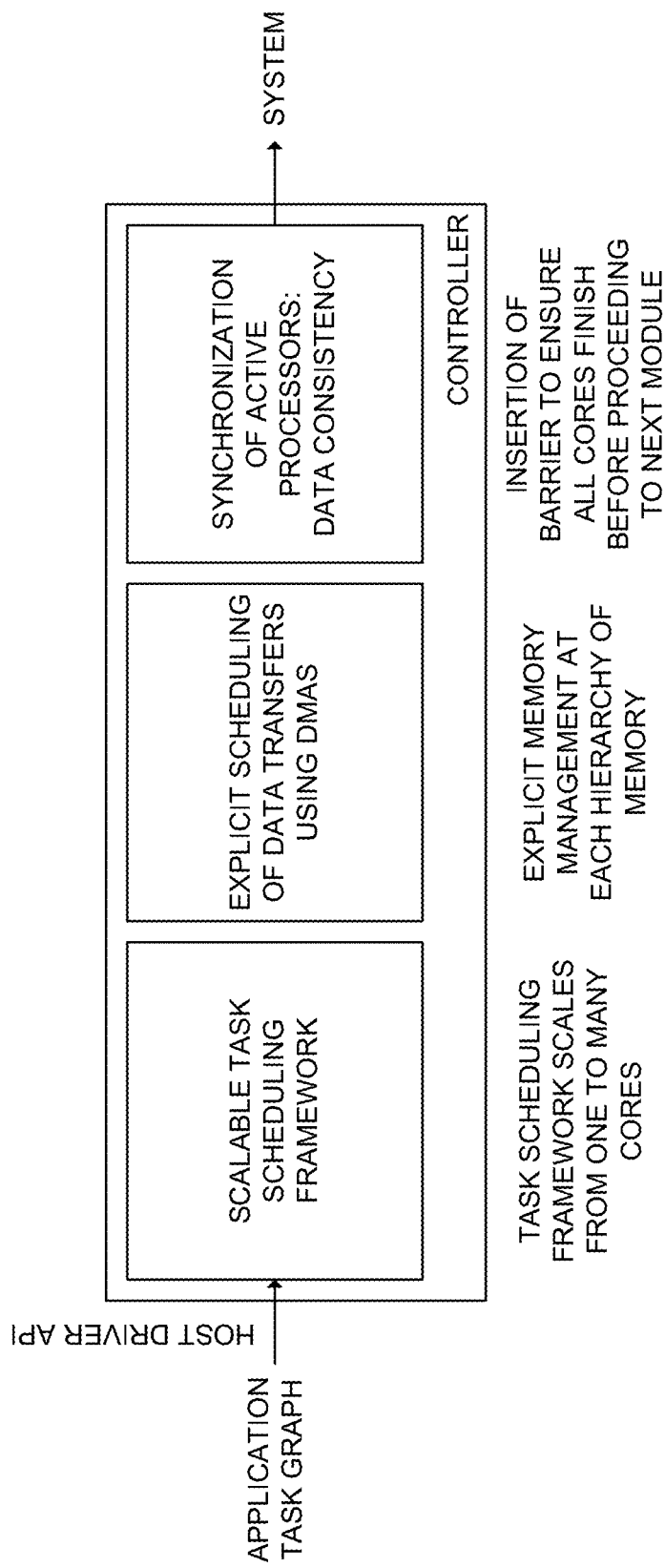
FIG. 9 shows an example scaling of a DV processor architecture to many cores.

Scalable Design. Scalability can be achieved by repeating the same homogenous DV core. For example, each core can be capable of executing some or all vision or deep learning workloads. Deep Learning algorithms can be inherently massively parallel. For example, CNN computation can be distributed across any number of available cores at runtime easily. Multiple deep learning applications can run simultaneously on each core. For example, runtime schedules of multiple applications on any subset of homogenous cores can be achieved. FIG. 9 shows an example scaling of a DV processor architecture to many cores. The DV processor can have GPU like runtime, scalable from one core to many cores. The DV processor can implement explicit management of memory hierarchy using direct memory access (DMA). Tables 5-6 show DV processor architecture efficiency metrics.

TABLE 5

DV Processor architecture efficiency metrics comparing a GPU to a Deep Vision Processor.

| | GPU | DV |
|---|---|---|
| Storage per ALU | 1 KB | 18 Bytes |
| Reduction Scheme | High Precision Adders | Low cost reduction network |

TABLE 6

DV Processor architecture efficiency metrics comparing a DSP/SIMD to a Deep Vision Processor.

| | 5 Slot VLIW DSP/SIMD | DV |
|---|---|---|
| Register File Reads | 32 Bits/ALU | 12 Bits/ALU |
| Register File Complexity | 10 Read Ports, 5 Write Ports | 2 Read ports, 1 Write Port |
| Reduction Scheme | High Precision Adders | Low cost reduction network |

Example Deep Vision Processor Implementation

Some embodiments of a DV processor improves on a Convolution Engine. A DV processor was built using Cadence/Tensilica Processor Generator tool. The processor generator tool allowed specifying the data-path components and desired instruction set for a processor using Tensilica's TIE language. The instruction set architecture of some embodiments of the CE was modified and augmented to add corresponding data-path components to the using Tensilica Instruction Extension (TIE). Cadence TIE compiler uses this description to generate cycle-accurate simulation models, C compiler and register transfer language (RTL) for the processor configuration created. The simulation models generated by the TIE compiler were used to determine accurate performance numbers, shown below, for the algorithms run on the DV processor.

For accurate energy and area numbers, Cadence Genus and Innovus tools were used to synthesize and place and route the design and map to TSMC 28 nm HPC standard cell library. This mapping gave the area of the design as well as the achievable clock frequency. The post-layout netlist was simulated with TSMC power models to determine the power spent in the design for real workloads.

Example Register File Organization

1. To avoid shifting the whole shift register file, the DV processor architecture can divide the register file into groups of register entries and add hardware support for shifting these groups to better support smaller kernel sizes, such as 3×3.

2. In some implementations, the above register file can be mapped to the standard register file compiler. Standard register file components, instead of flip flops, may be used. When flip flops are used instead of standard register file components, the power and performance of the grouped shift register file may be higher than non group-based shift register file.

3. To merge the shift register file and the separate SIMD register file used in some embodiments of a CE, the DV processor architecture can employ a standard vector/SIMD register file. The register file can be enhanced to also support access to groups of register entries in addition to individual entries. A separate instruction can be added to shift the register group to simulate shift register file behavior. Since shifting can be performed in software, power and performance could be impacted.

4. There can be power and performance trade-offs for the vector register file with support for register groups. In some implementation, the DV processor can implement one or more memory banking strategies for the register file because the complexity added by register file groups could prevent the compiler from inferring standard register file components.

5. The DV processor can be optimized for convolution algorithms, in terms of performance, power as well as ease of programmability, with different register file organizations.

Example Banked Register File Architecture

Figure 10A:
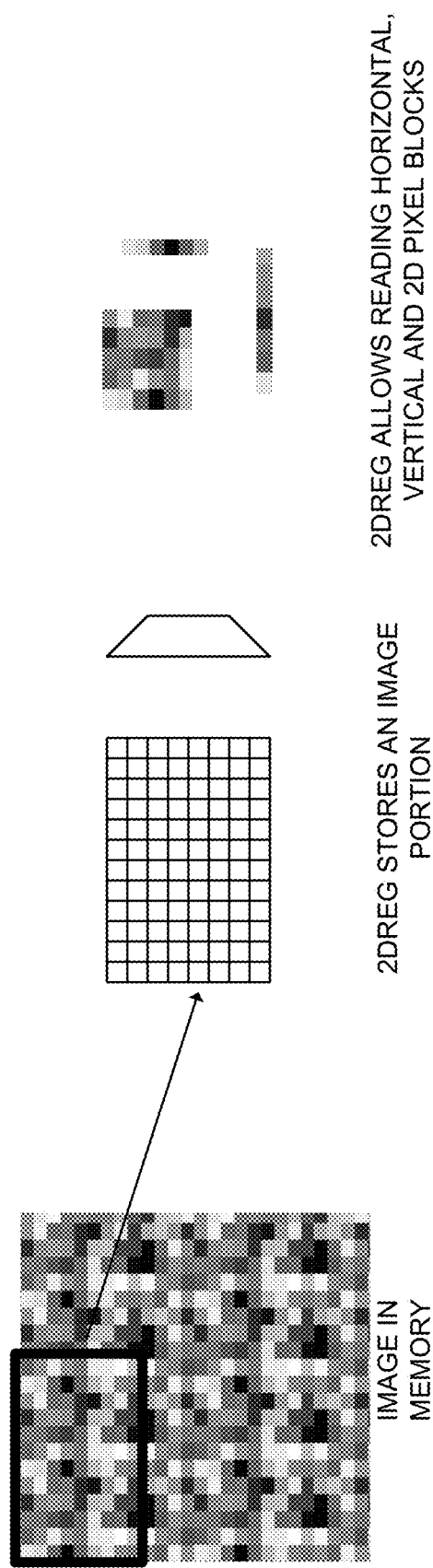

FIGS. 10A-10B show a schematic illustration of a register file architecture for stencil flow of a DV core. A register unit of a DV processor can implement the DV register file architecture. For efficient stencil computations, simultaneous access to multiple image rows and ability to read horizontal, vertical and two-dimensional pixel sub-blocks can be needed. A DV processor can include a two-dimensional Register (2D_Reg) used as a storage block to efficient stencil computations. Pixel-shift capability can be added to 2D_Reg to support sliding window flow. However traditional ASIC Register File blocks do not support such 2D Registers.

Figure 11:
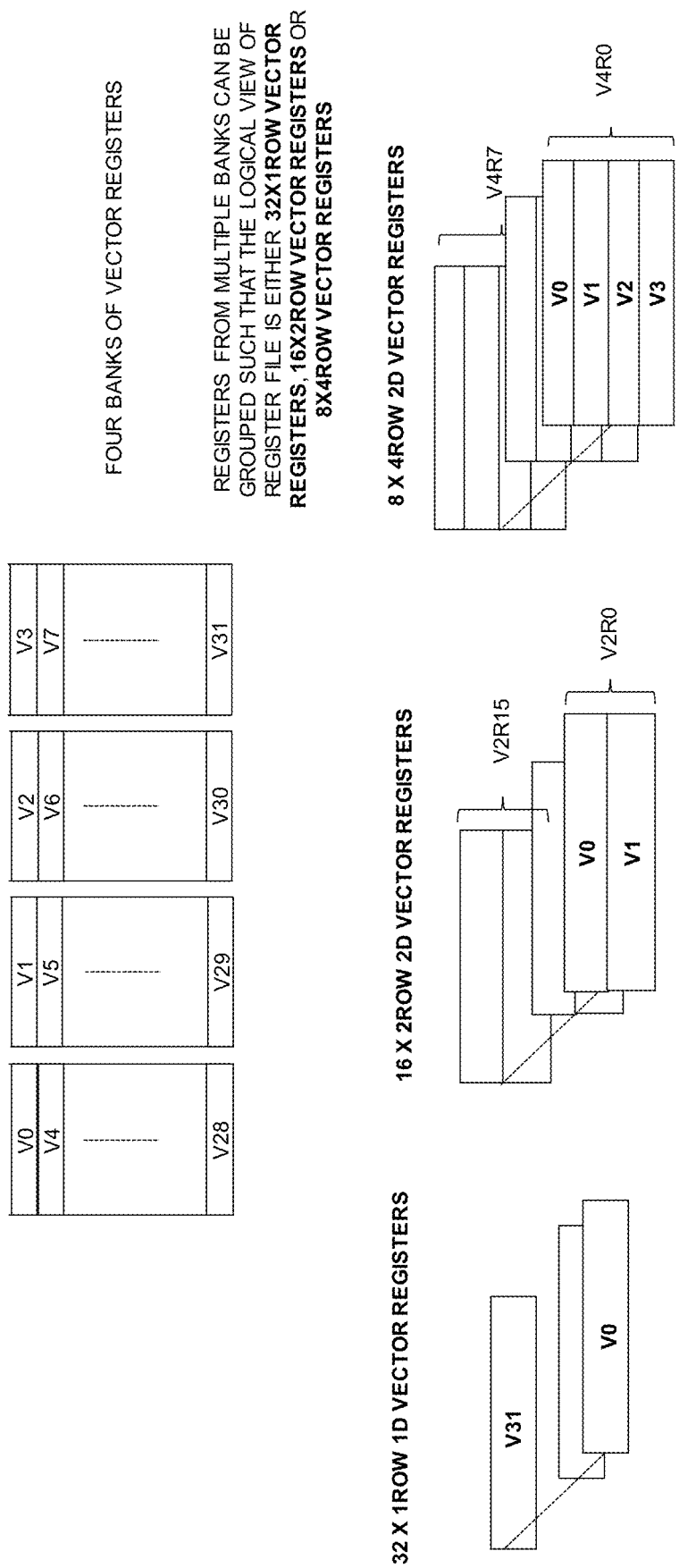
FIG. 11 is a schematic illustration of 2D register (2D_Reg) abstraction implemented using a banked register file architecture.
Figure 12:
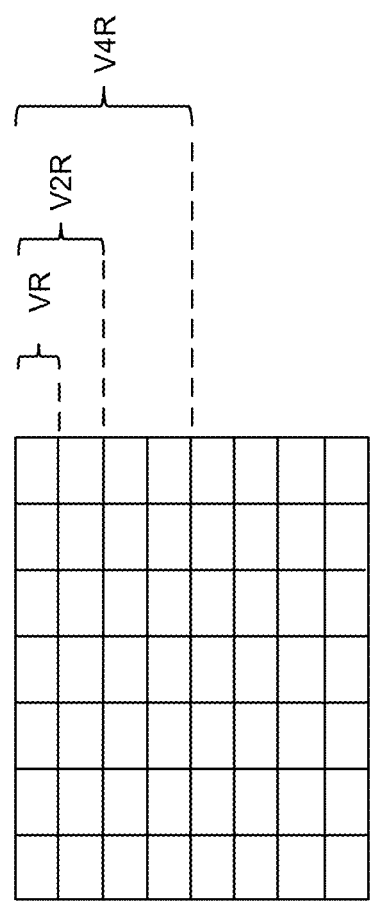
FIG. 12 is a schematic illustration showing an example smart register file architecture.

For example, a DV processor can implement 2D_Reg abstraction using a banked register file architecture or group-based shift register architecture (FIG. 11). For example, four banks of traditional vector registers can implement 32 1-row 1D vector registers, 16 2-row 2D vector registers (e.g., 16 groups of two registers), or 8 4-row, 2D vector registers (e.g., 8 groups of four registers). In some implementations, the number of banks can be 2, 3, 4, 5, 6, 7, 8, 9, 10, 20, 30, or more. The number of groups per bank can be 2, 4, 8, 16, 32, 64, 128, 256, or more. FIG. 12 is a schematic illustration showing an example smart register file architecture. Register file can be accessible in groups of 1 (VR), 2 (V2R) and 4 (V4R) registers. For example, V4R acts as a '2D Register' to store multiple image rows supporting 2D stencils and 1D vertical stencil operations. V4R can support vertical row shifts to facilitate sliding window flow. Register groups can also facilitate multiple SIMD widths (64, 128, 256, or more elements).

Figure 13:
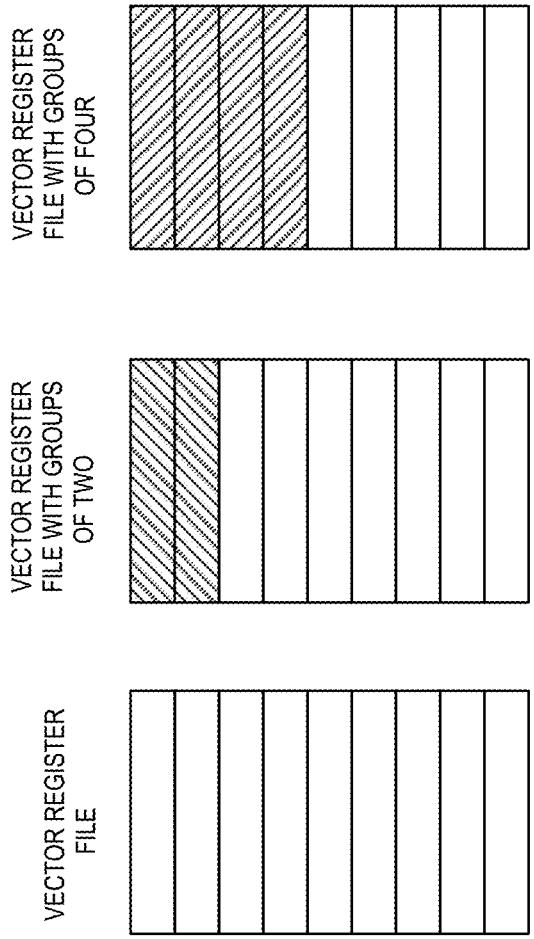
FIG. 13 shows an example comparison of a traditional vector register file and vector register files with groups of two or four registers.
Figure 14A:
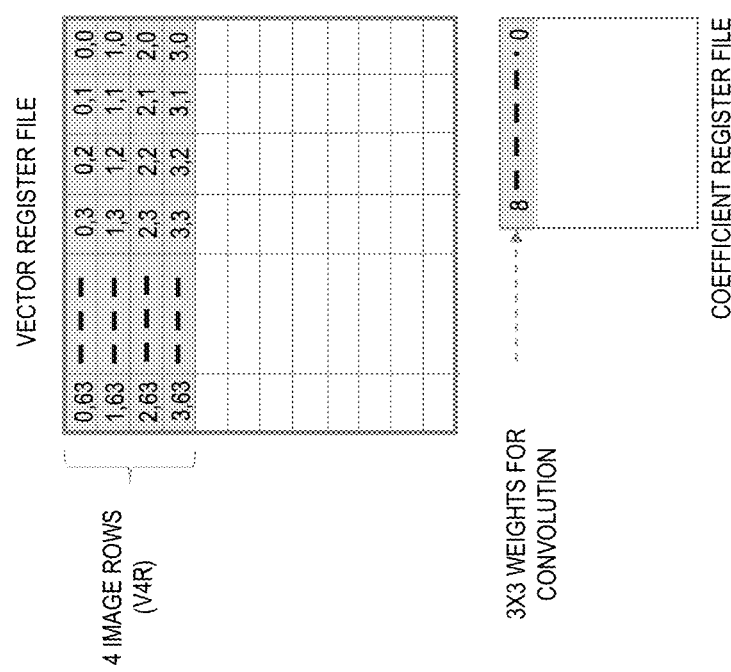
FIGS. 14A-14F show a schematic illustration of using an example Stencil2D instruction to produce multiple 3×3 convolution outputs with image data stored in a V4R register group.
Figure 14B:
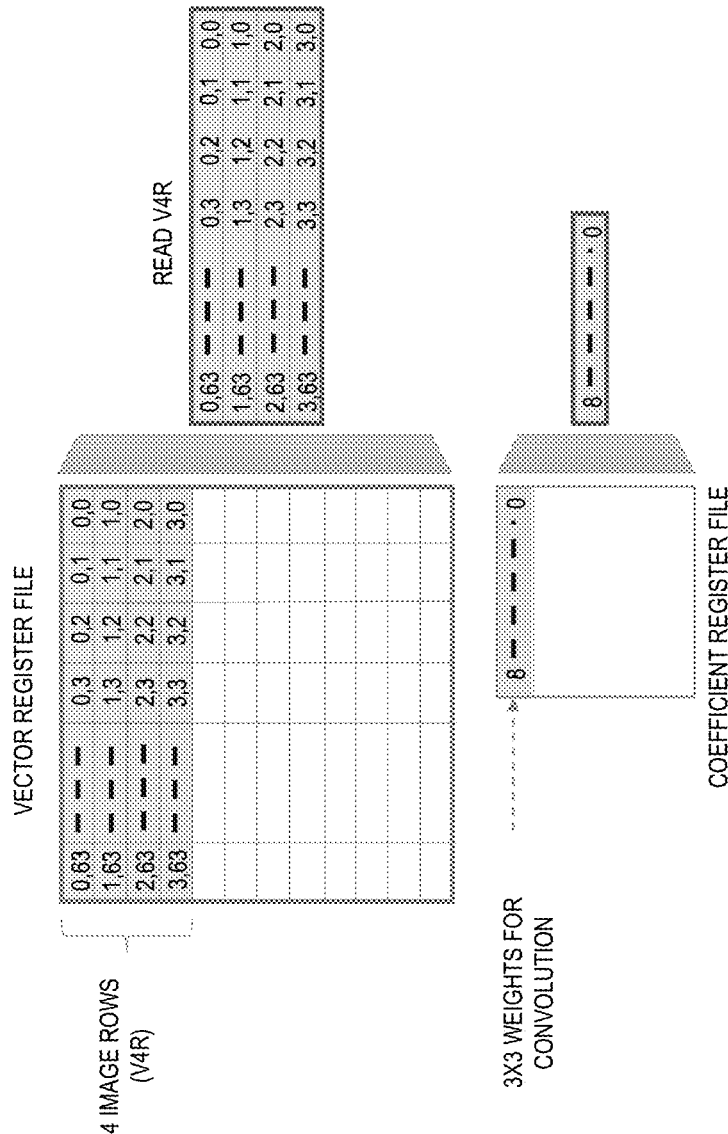
Figure 14C:
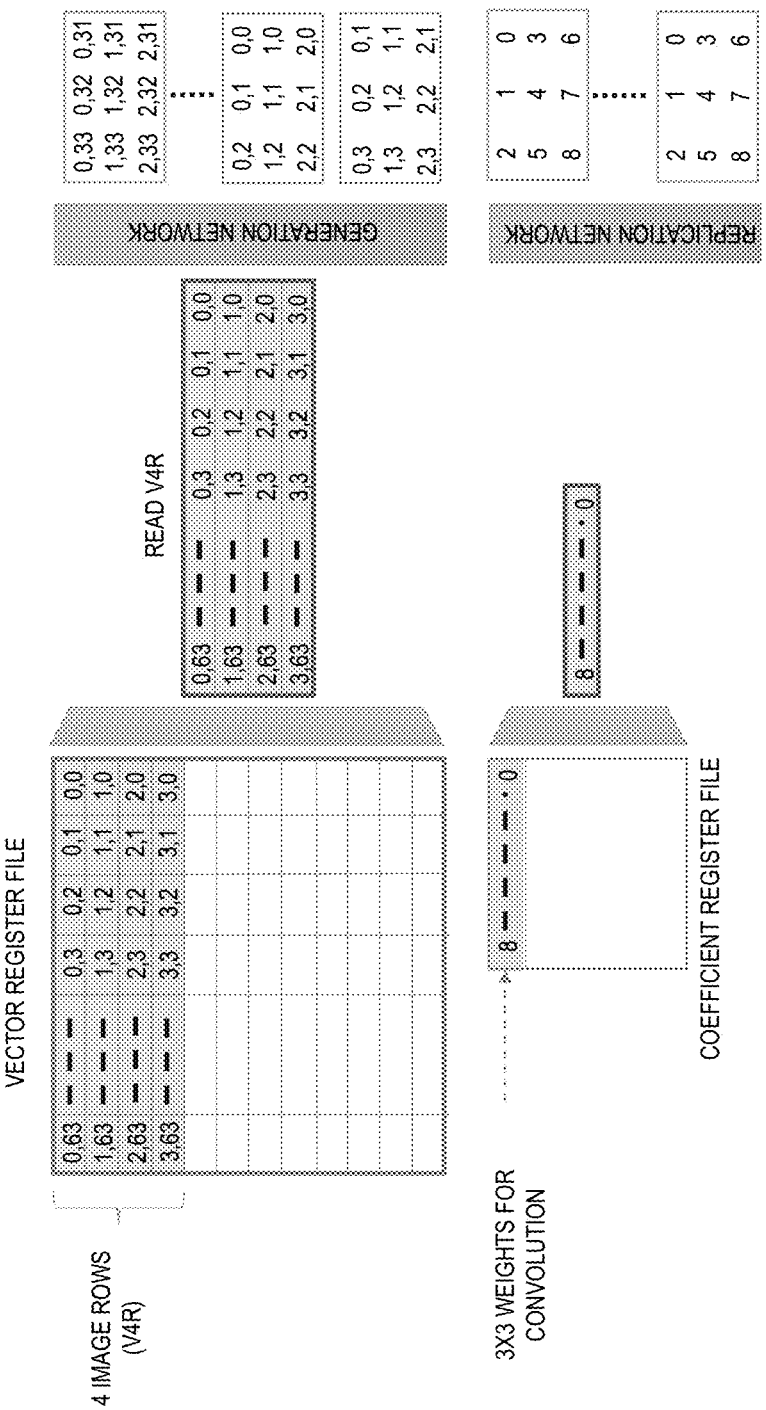
Figure 14D:
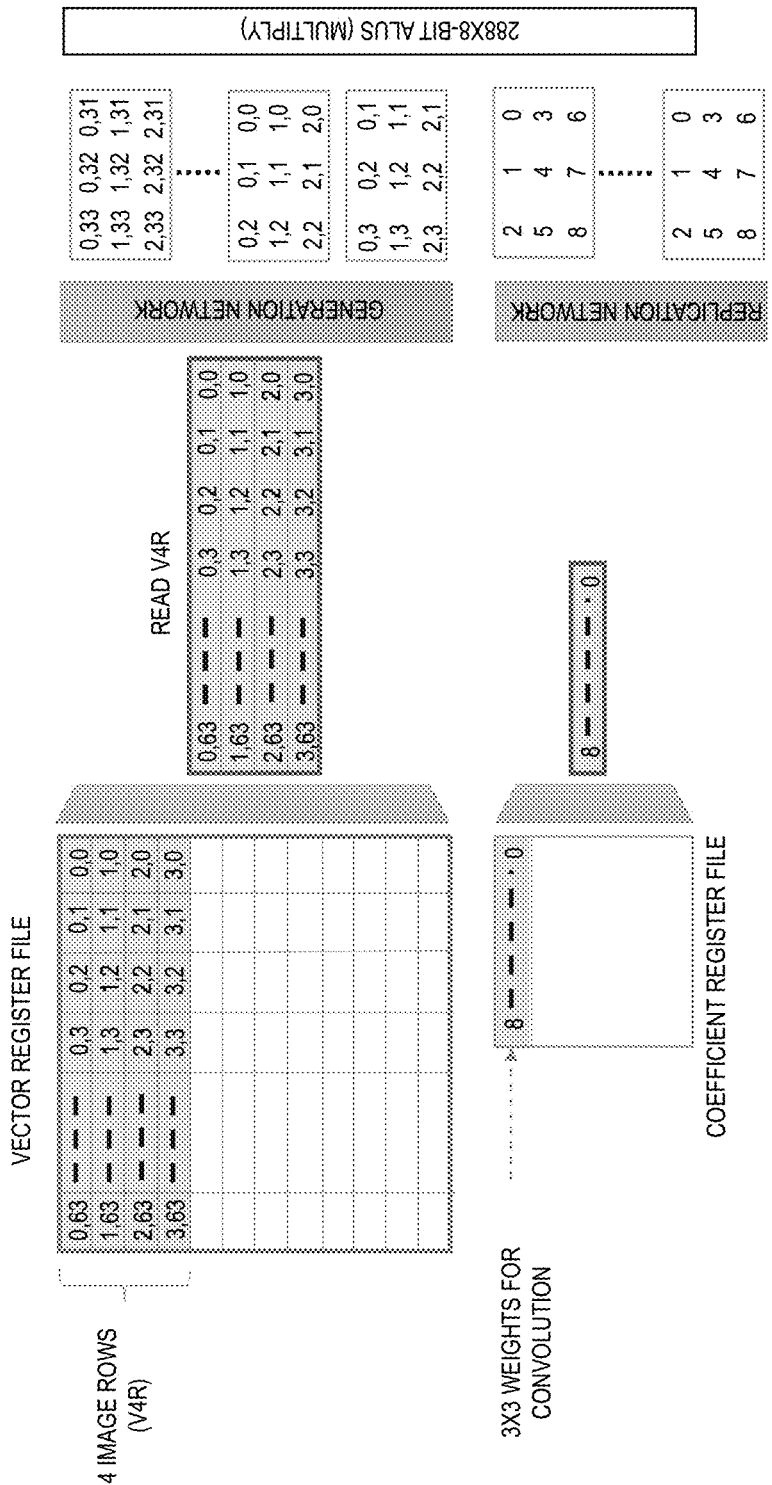
Figure 14E:
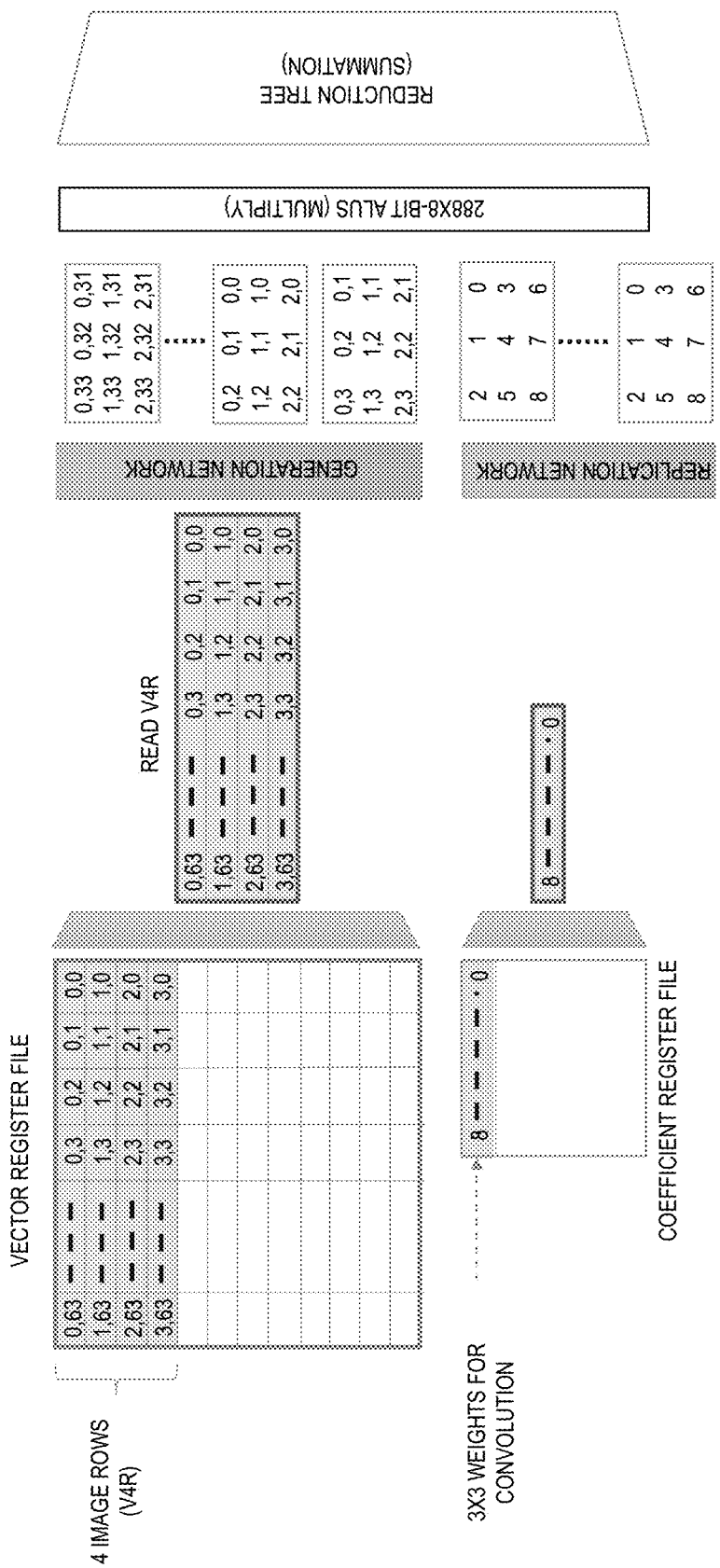
Figure 14F:
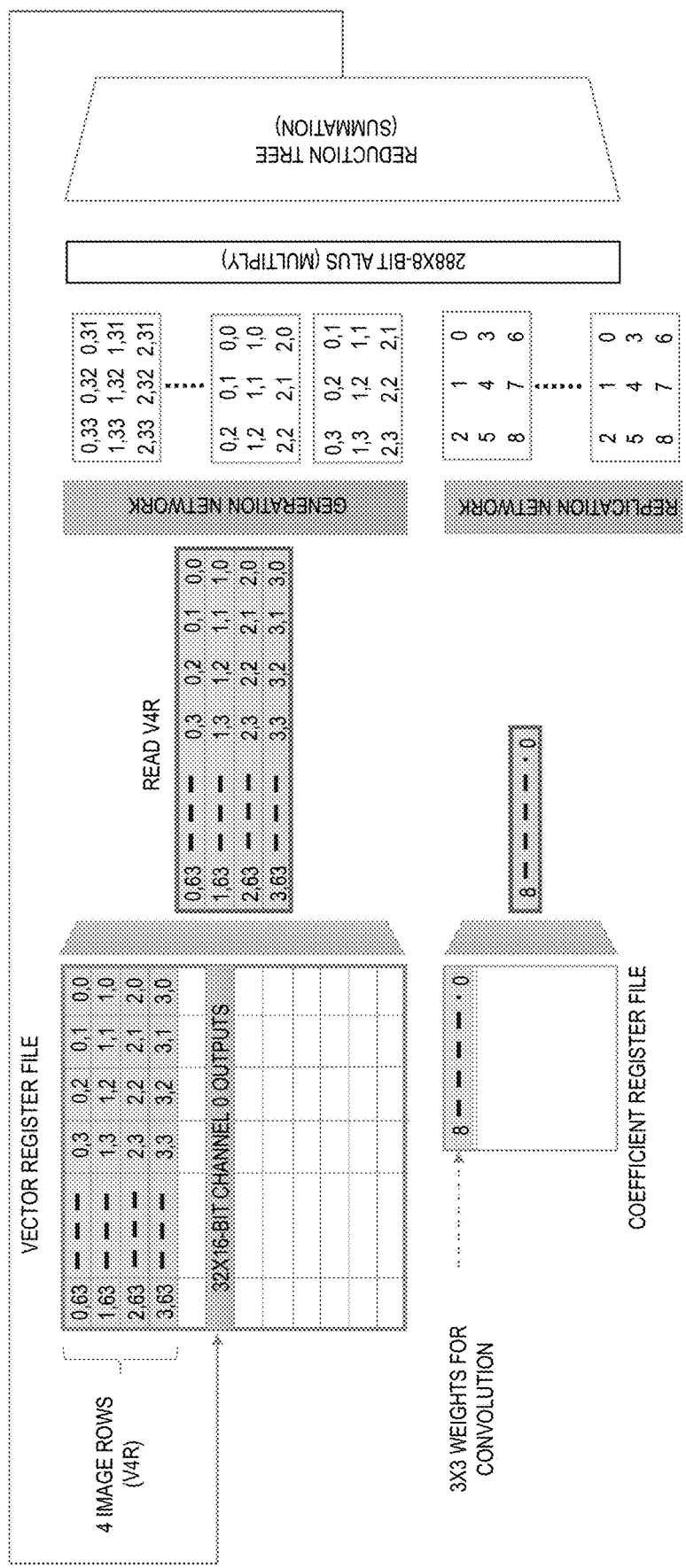

FIG. 13 shows an example comparison of a traditional vector register file and vector register files with groups of two or four registers. To avoid shifting the whole shift register file and to replace flip-flops with standard register file components and to use a software compiler to perform register file based optimizations, the DV processor architecture in some implementations replaces the shift register file with a thirty two entry traditional vector register file. Since traditional vector register files typically allow access to just one register file entry at a time, they cannot support shift up/down operations necessary for performing stencil computations efficiently. The semantics of the traditional vector register file has been changed to address this challenge. Access to groups of one, two and four registers have been added, with each group reading/writing all the registers within that group simultaneously. Coupled with support of 3×3 (2D), 4×4 (2D), 1×3 (1D Vertical) and 1×4 (1D Vertical) as the basic building blocks for 2D and 1D Vertical stencil operations, shift up/down operations can be restricted to just the group of four register entries in some embodiments. To facilitate access to multiple register file entries simultaneously, the register file can be implemented in banks of four, where the width of each bank is the size of one register file entry. These banks of registers can be implemented using standard register file components instead of flip-flops, resulting in lower register file power, addition of a separate instruction to shift the register group in software can simulate shift register file behavior while minimizing impacts power and performance.

Example Smart Interconnect Organization

1. The DV processor architecture can simplify the interconnect by supporting 3×3 kernels (or higher order, such as 4×4) as the basic building block to reduce routing congestion, power and area. In one implementation, the DV processor architecture can include accumulator registers for supporting kernels that are bigger than 3×3. The accumulators as they may adversely impact the timing of the datapath.

2. The DV processor can be optimized for convolution algorithms, in terms of performance and power, by the different smart interconnect organizations disclosed herein.

By using 3×3 (2D), 4×4 (2D), 1×3 (1D Vertical), 1×4 (1D Vertical), 3×1 (1D Horizontal) and 4×1 (1D Horizontal) as the basic building block for all stencil operations, the interconnect stencil of the DV processor can be size agnostic. The interconnect design can also be simplified. Accumulator registers of the DV processor can allow accumulation of results from basic building blocks to create bigger stencil sizes. These registers can be placed after the Reduce stage (or the Map-Reduce abstraction described above). These set of simplifications have not only reduced routing congestion but has also improved power and register file area.

Example SIMD

1. The DV processor architecture can support 1×1 convolutions, RELU and other operations. The DV processor can include many SIMD instructions for multiply, arithmetic shifts, comparison and predicated execution operations.

2. The DV processor architecture can support matrix-vector and matrix-matrix operations by, for example, implementing support for reduction operations in SIMD. Since precision loss can occur when transferring data from a multiply operation to a reduction instruction, the register file can support write large bit-width data operation. The DV processor architecture can implement accumulators to accumulate results of multiple reduction operations.

3. The DV processor architecture can support different group sizes, which provide a good tradeoff between complexity and efficiency. Group size can impact mapping of the register file through standard register file compiler.

In some implementations, the DV processor architecture expands SIMD support some earlier embodiments of a CE to proficiently support diverse deep learning and traditional computer vision constructs. The ability to access groups of registers allows the DV processor to support various SIMD widths without increasing register file access width. The challenge with traditional SIMD register files has been that the width of register file entries may need to match the SIMD width. Thus, a wide SIMD array would require a wide register file entry. However, the micro-architectural limitations the size of the register files cannot be made arbitrarily large. Also, keeping large register file entries fully utilized becomes infeasible for all but a few operations. Thus, to keep the SIMD width large without increasing the width of the register file entries, the DV processor can employ register file groups where multiple register file entries are joined together to work as one. This allows the DV processor to use just one register file entry when the data is small and use groups of two or four registers together when data is large. All of SIMD operations can have 1 register, a group of two registers (also referred to as a 2 register group) and a group of four registers (also referred to as a 4 register group).

In addition to regular SIMD instructions, such as multiplications, arithmetic operations, logical operations, reductions, etc. the DV processor architecture can be explicitly optimized matrix-vector and matrix-matrix multiplication to efficiently support 1×1 convolutions and fully connected layers. The DV processor architecture leverages the components used to support the Map and Reduce logic in stencil operations and optimize them to be used with SIMD operations. In some embodiment, this can achieved in the form of a vector-vector matrix instruction that uses element wise multiplication as the MAP operation followed by carry-select adder based low-cost, low-energy reduction as the REDUCE step. The result is a fused vector-vector multiplication instruction with a performance and energy efficiency that is much higher than using MACs (multiply and accumulate units) to perform the same operation.

Example Instructions

Example 2D Stencil Instructions

FIGS. 14A-14F show a schematic illustration of using a Stencil2D instruction to produce multiple 3×3 convolution outputs with image data stored in a V4R register group (e.g., a group of four registers). In the illustrated example, each row of the V4R register group can include 64×8-bit elements. The image data in the V4R can be retrieved from a vector register file including the V4R register group (e.g., with a read V4R operation), and a generation network can generate data read from the V4R register group for processing by ALUs. A replication network can replicate the weights read or retrieved from a coefficient register file. A DV core (e.g., ALUs of a DV core) can multiply the data generated with corresponding replicated weights using 288× 8-bit ALUs. The output elements of the ALUs can have 16-bit precision. With a reduction tree, corresponding output elements of the ALUs can be summed to generate 32×16-bit elements of a channel (such as channel 0). The 32×16 bit output elements of the reduction tree can be stored back to the vector register file (e.g., in one row of the vector register file). In some embodiments, the 16-bit output elements can be reduced to 8-bit elements before being stored back to the vector register file (e.g., one half of a row of the vector register file). In some embodiments, the input elements and output elements of the ALUs can have 8-bit precision.

In addition to implementing a 3×3 Stencil2D instruction, a DV processor can implement other variants of Stencil2D (e.g., 4×4 Stencil2D). Larger stencils, such as 5×5, 7×7, and 8×8, can be computed by combining multiple Stencil2D operations. In some embodiments, larger stencils can be supported without combining multiple Stencil2D operations. Supported stencil variations can include 2D stencils, 1D horizontal stencils, or 1D vertical stencils. 2D Stencils include 3×3 and 4×4 Stencil generation, which can be directly supported by a stencil generation network. Larger Stencil sizes, such as 5×5, 7×7, 8×8 etc., can be computed by accumulating results from multiple smaller stencils. 1D horizontal stencils, such as 1×3 and 1×4 Stencil generation, can be directly supported by a stencil generation network. Larger stencils (1×5, 1×7, 1×8, etc.) can be computed by accumulating smaller stencils. 1D vertical stencils, such as 3×1 and 4×1 stencil generation, can be directly supported by a stencil generation network. Larger Stencils (5×1, 7×1, 8×1, etc.) can be computed by accumulating smaller stencils.

Example 2D Stencil Instruction with an Accumulator Register File

In some embodiments, a DV core can include one or more accumulator register files of accumulator registers. An accumulator register file can be used to store partial results of stencil instructions of the disclosure (e.g., 2D Stencil, 1D stencil, etc.). Results of instructions such as Stencil2D, Stencil1DV or DotProduct can be stored in an Accumulator Register File instead of Vector Register File.

Figure 15:
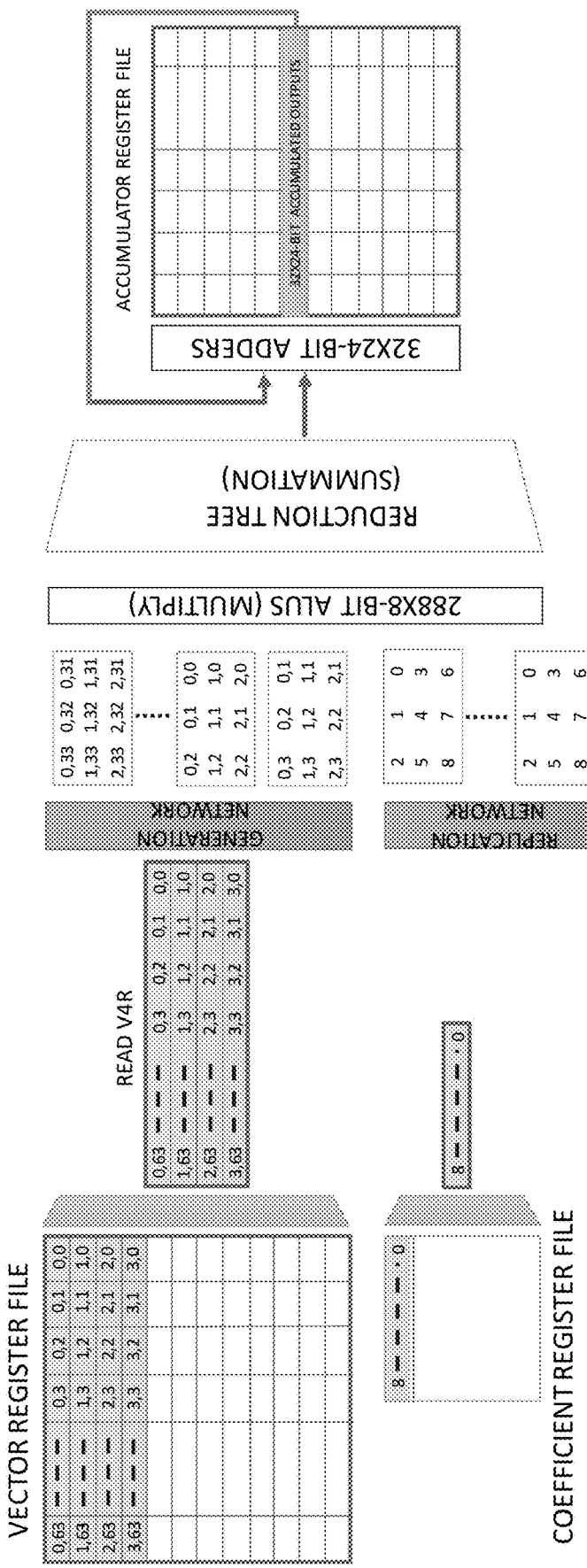
FIG. 15 shows a schematic illustration of an example execution flow of a Stencil2D instruction with the output stored in an accumulator register file.

FIG. 15 shows a schematic illustration of an example execution flow of a Stencil2D instruction with the output stored in an accumulator register file. Instead of saving partial results of convolutions in the memory (e.g., a vector register file shown in FIG. 14F), partial results can be retained in one or more accumulator registers of the accumulator register file. Additional new results can be added to the previous partial results already stored in the accumulator register using, for example 32×24-bit adders. Advantageously, partial results do not need to be written to or read back from the memory file, which saves power and processing cycles. Explicit vector ADD instructions to add the new results to previous results may be unnecessary, which saves processing cycles. Furthermore, accumulator registers can have higher precision than a vector register file. For example, an accumulator register file can have 24-bit precision, and the vector register file can have 8-bit precision.

Example 1D Stencil Instruction

Figure 16:
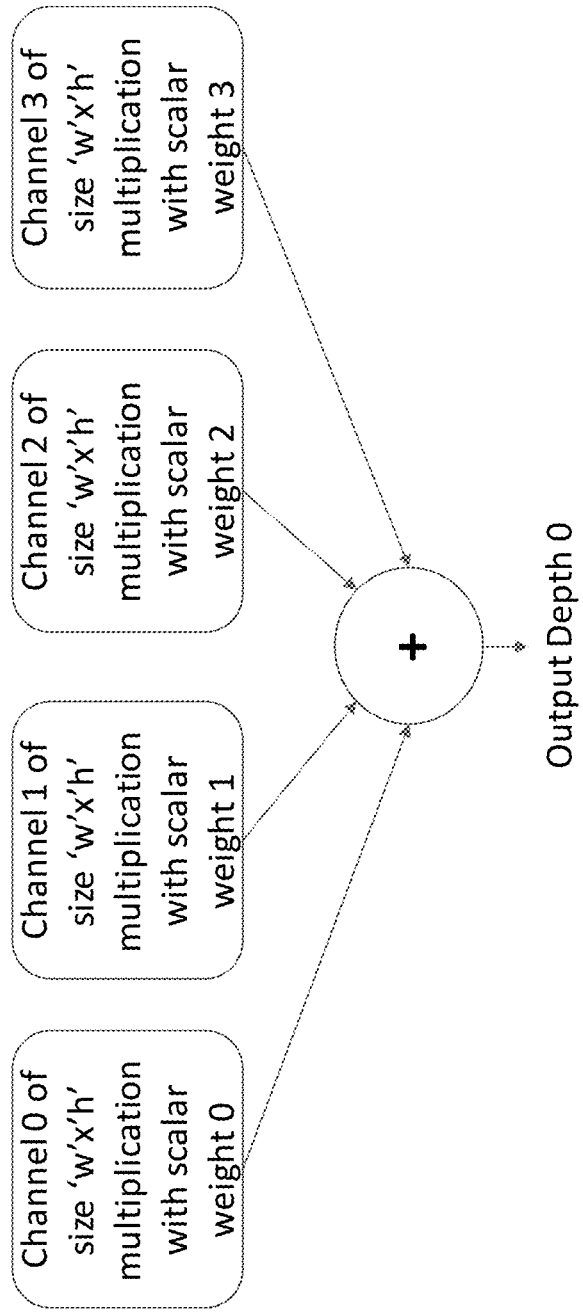
FIG. 16 is a schematic illustration showing an example 1×1 convolution compute graph.

FIG. 16 is a schematic illustration showing an example 1×1 convolution compute graph. The output of each 1×1 convolutional layer in CNNs can be computed by multiplying the input channels of size 'w'×'h' with a pre-trained scalar weight and then summing up the outputs of the weighted channels to produce an output of size 'w'×'h'. For example, the input channels of size 64×64 can be multiplied with a pre-trained scalar weigh, and the outputs of the weighted channels can be summed up to produce an output of size 64×64. A DV core can support Stencil1D instructions (e.g., Stencil1DV, Stencil2DH).

Figure 17A:
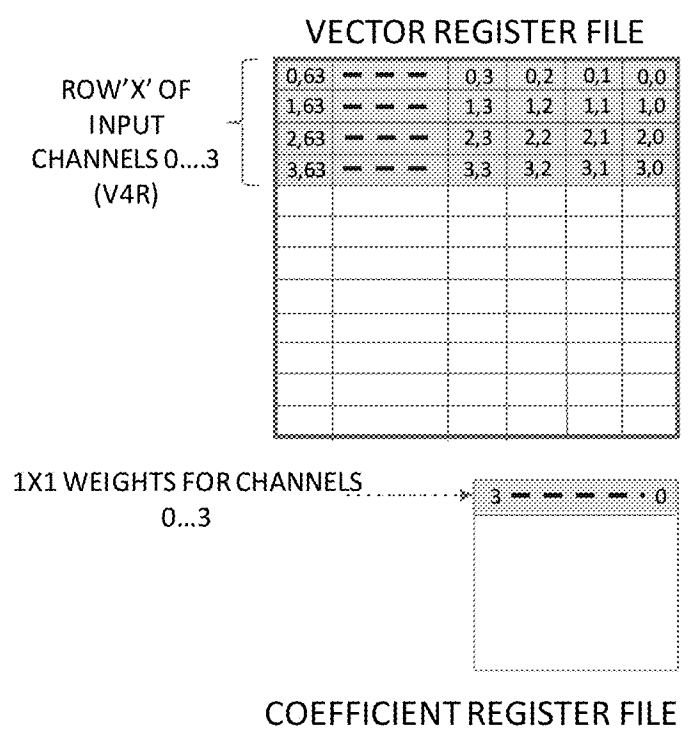
Figure 17B:
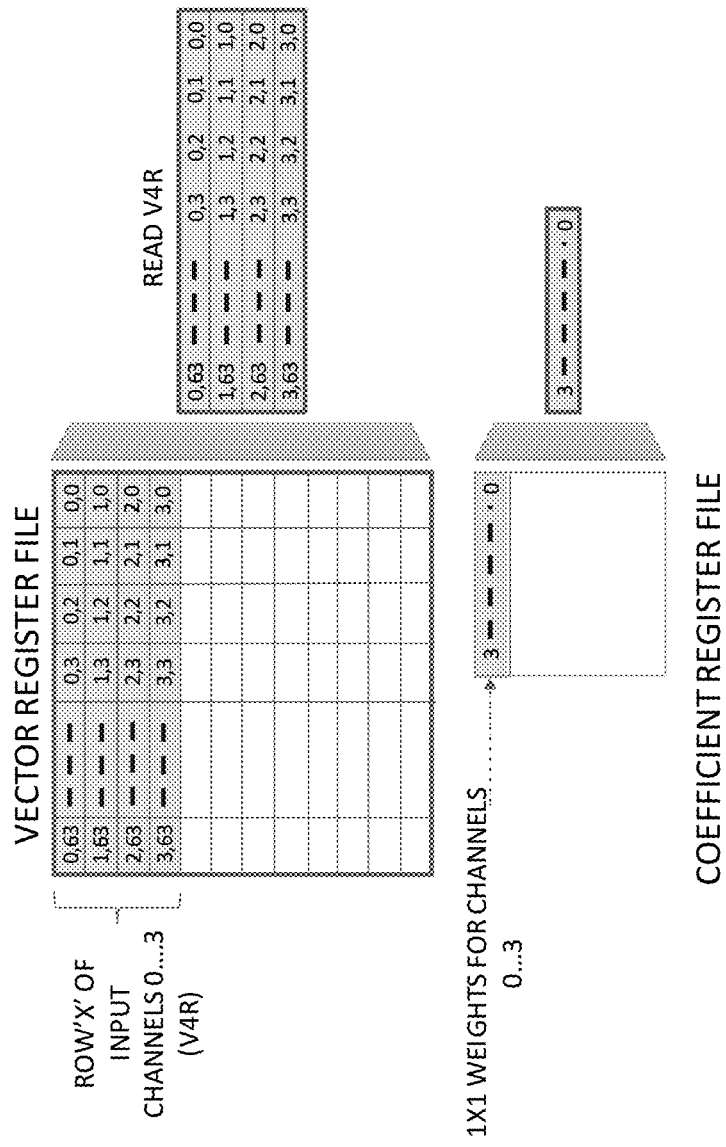
Figure 17C:
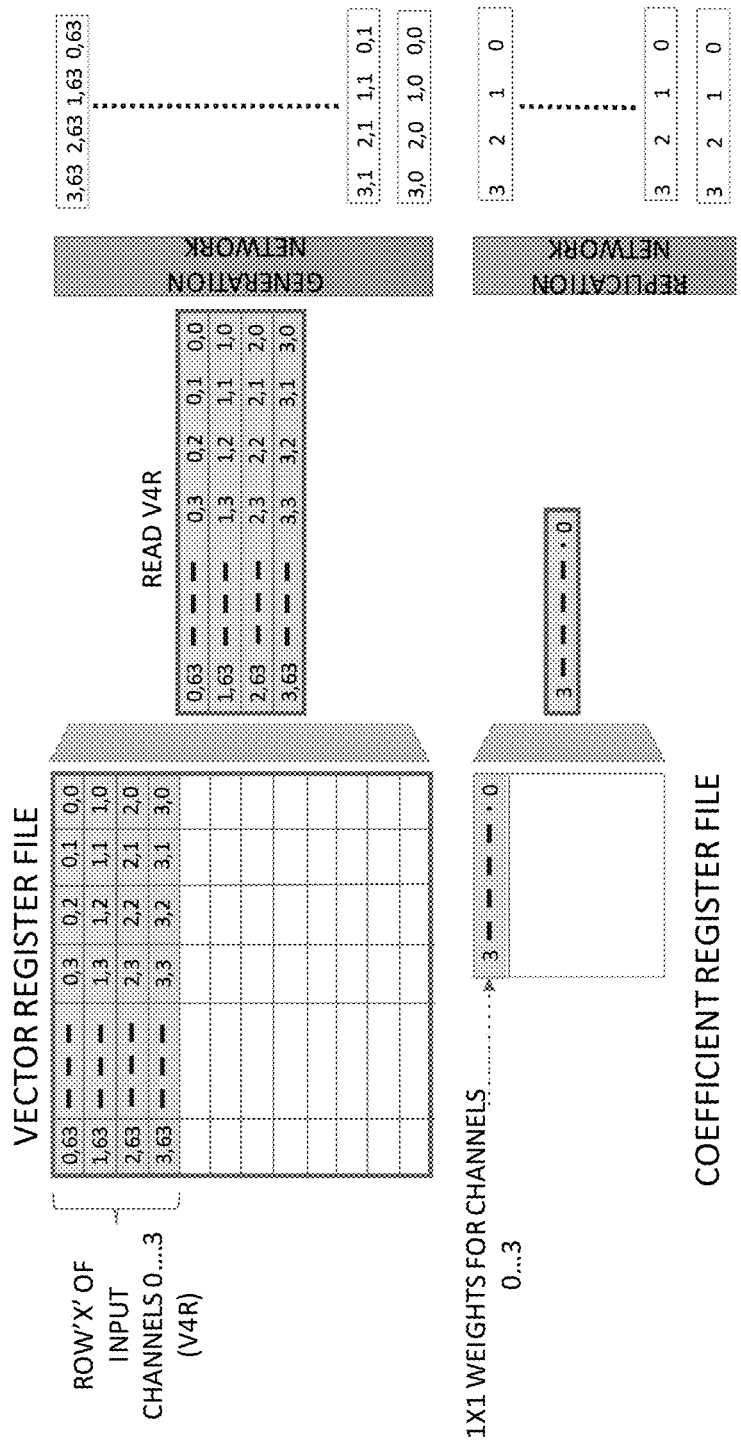
Figure 17D:
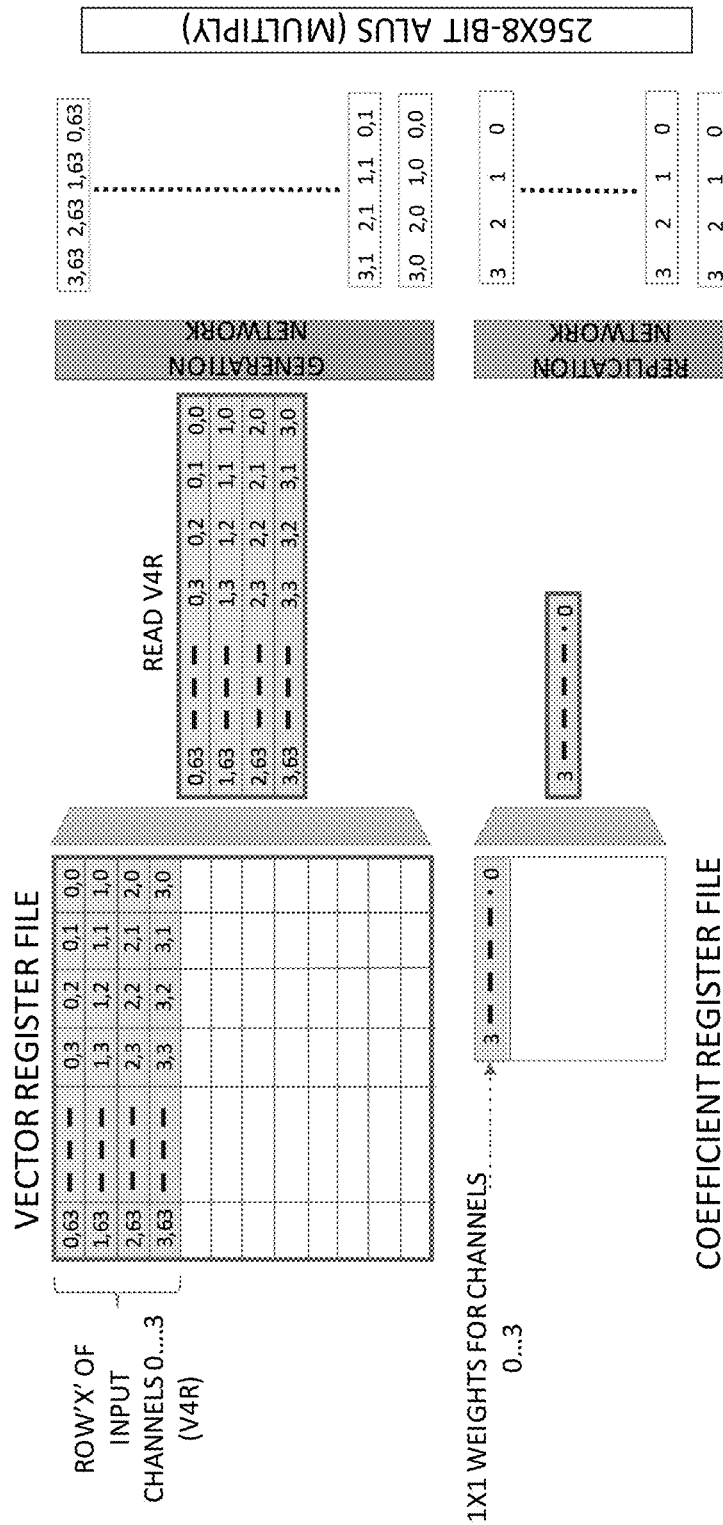
Figure 17E:
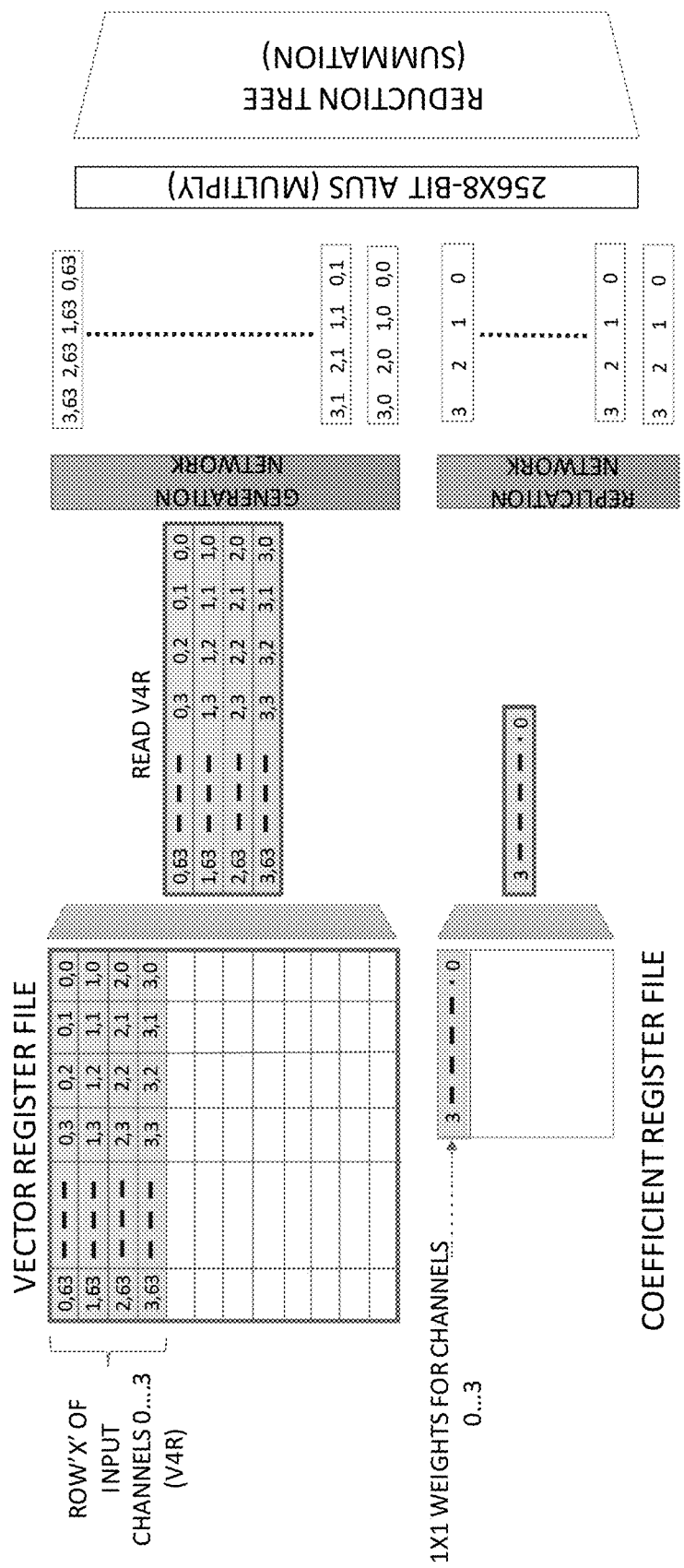
Figure 17F:
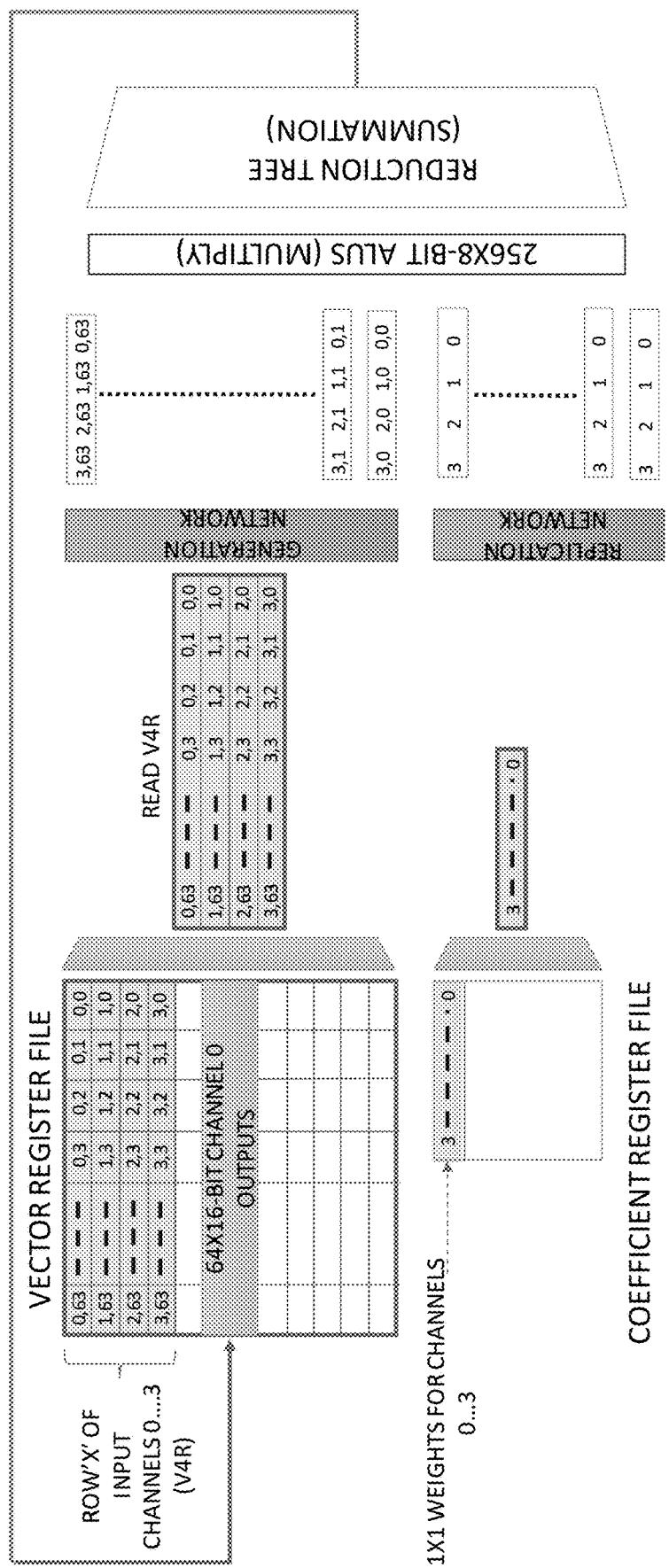

FIGS. 17A-17F show a schematic illustration of an example execution flow of using a Stencil1DV instruction for 1×1 convolution. Row "x" (e.g., row 0) of four input channels can be loaded into a V4R register (FIGS. 17A-17B). Each row can include 64 8-bit elements. Four scalar weights with each weight corresponding to each input channel and each output can be loaded into a single coefficient register (FIGS. 17A-17B). The generate block generates 64 columns of 1×4 values of the V4R register while the coefficients are replicated 64 times (FIG. 17C). FIG. 17C shows that the columns of a V4R are laid flat. The ALU array of 256 8-bit ALUs, for example, performs multiplication of the data with the coefficients (FIG. 17D) while the reduction layer performs 4:1 reduction (FIG. 17E). For example, four corresponding elements can be summed. Thus, the 256 outputs are reduced to 64. The number of outputs produced can be 64 with each output 16-bits wide and are written to a V2R register (FIG. 17F). FIG. 17F shows that the 64 outputs have 16-bit precision.

Example DOTV2R Instructions

Figure 18:
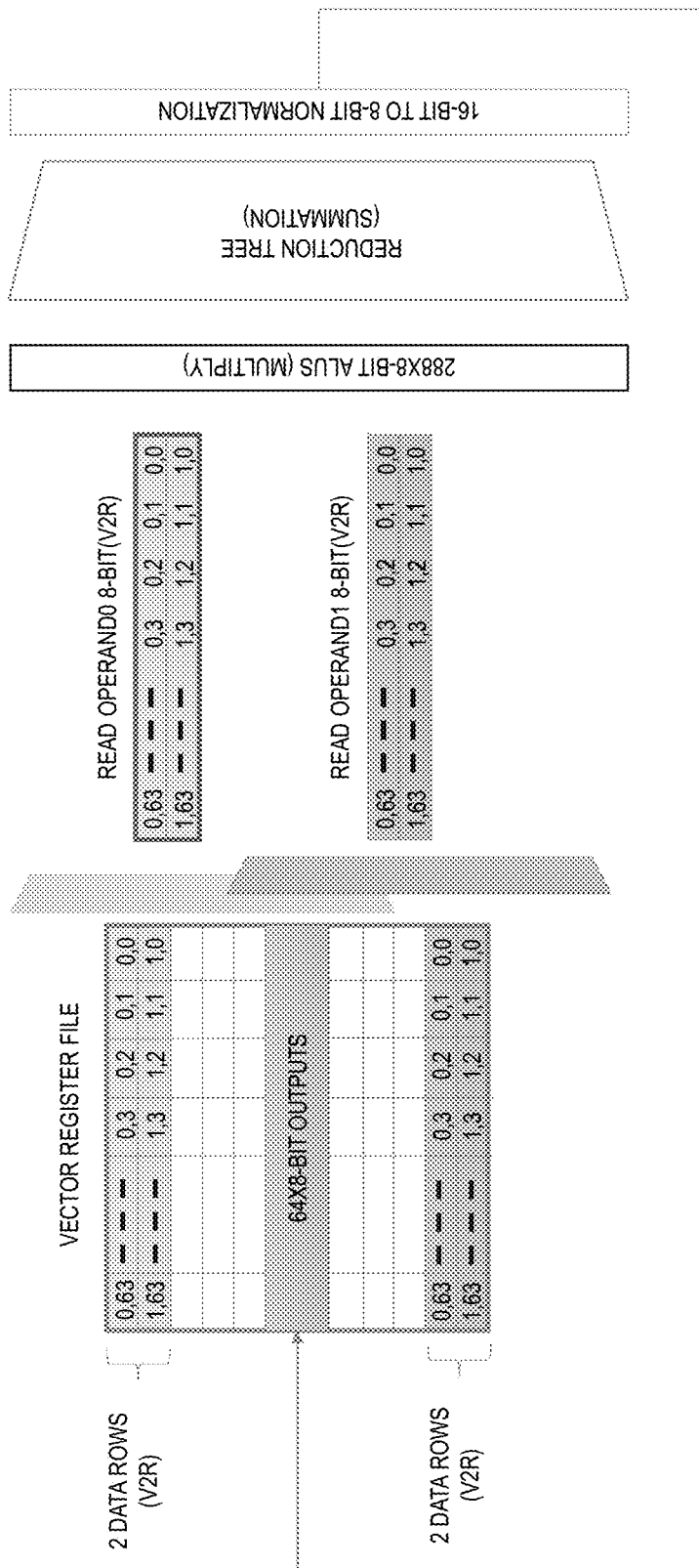
FIG. 18 show a schematic illustration of using an example DOTV2R instruction to produce a vector-vector multiplication of two 128-element vectors using data stored in a V2R register group.
Figure 19A:
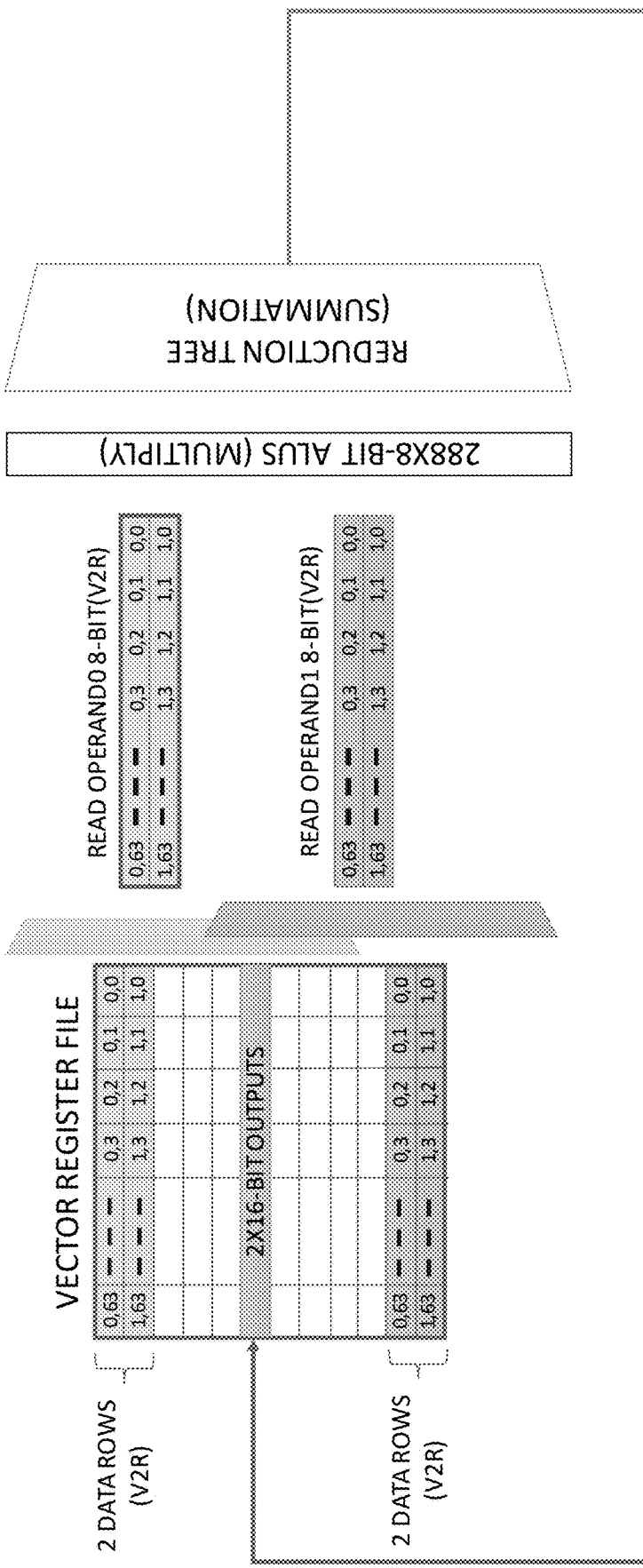
FIGS. 19A-19B show schematic illustrations of example execution flows of a DOTV2R instruction without 16-bit to 8-bit normalization.
Figure 19B:
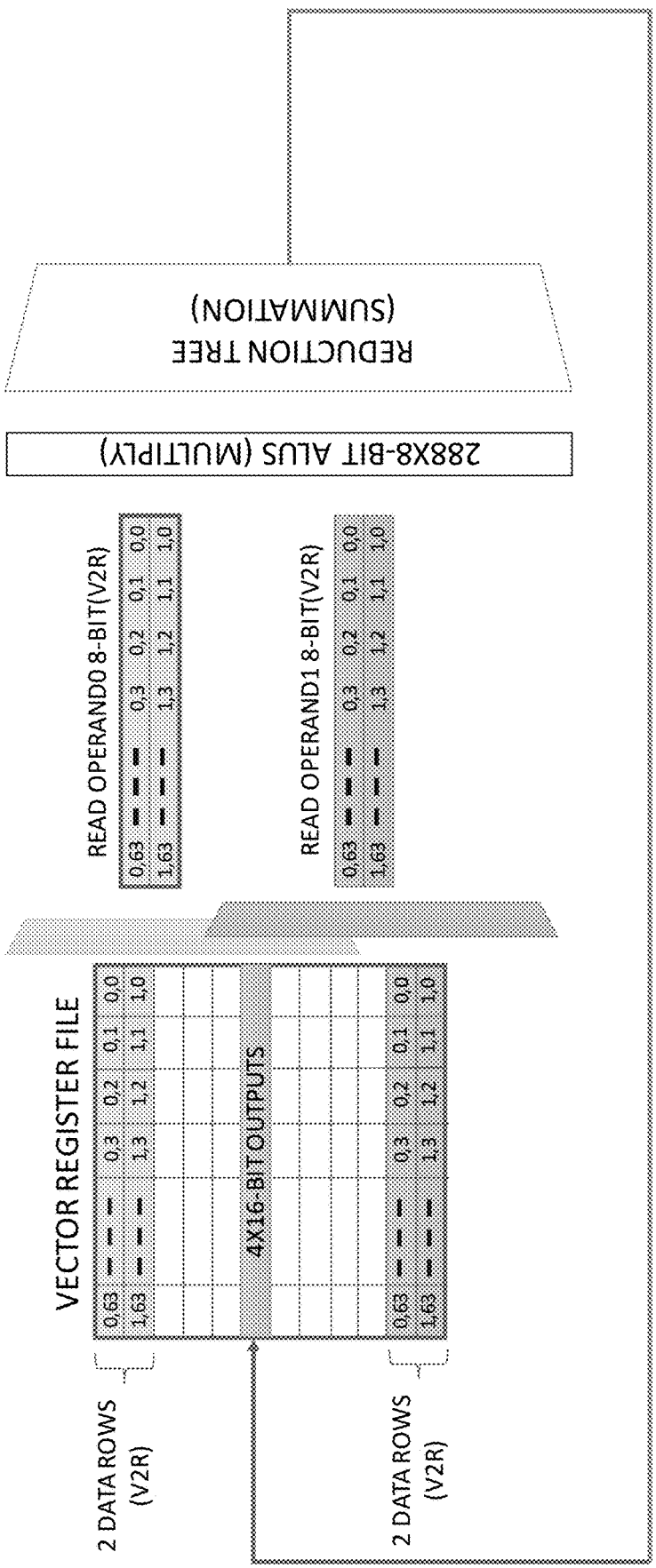

FIG. 18 show a schematic illustration of using an example DOTV2R instruction to produce a vector-vector multiplication of two 128-element vectors using data stored in a V2R register group. In the example execution flow of a DOTV2R instruction shown in FIG. 18, the 64 16-bits outputs of the reduction tree are converted to 8-bits outputs. FIGS. 19A-19B show schematic illustrations of example execution flows of a DOTV2R instruction without 16-bit to 8-bit normalization. The outputs of the reduction tree can be different in different implementations, such as 64×8-bit outputs (FIG. 18), 2×16-bit outputs (FIG. 19A), and 4×16 bit outputs (FIG. 19B). The DV processor can support other variants of dot product, such as DOTVR (a group of 1 register), DOTV4R (a group of 4 registers).

Example Algorithms

Example CNN Graph Algorithm

Figure 20A:
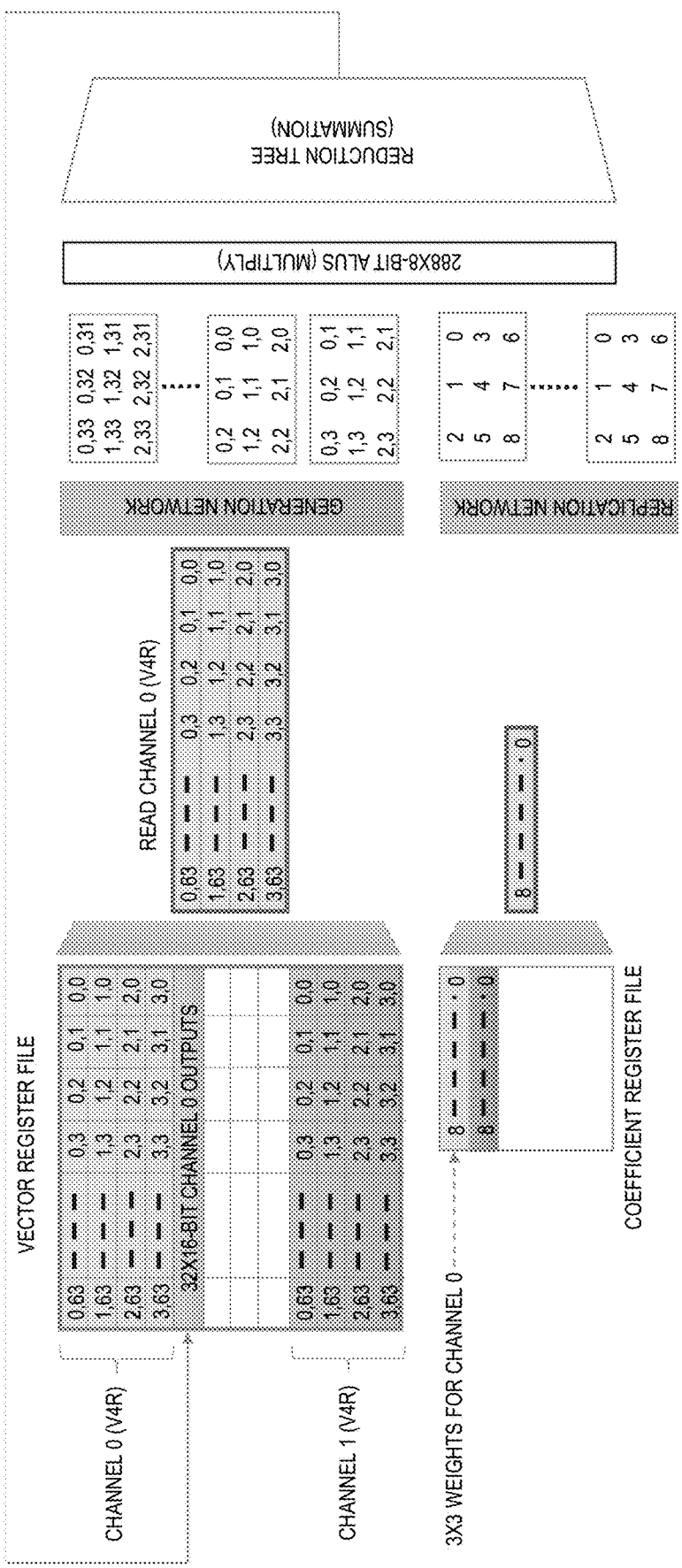
FIGS. 20A-20C show a schematic illustration of mapping a typical CNN compute operation to a DV core.
Figure 20B:
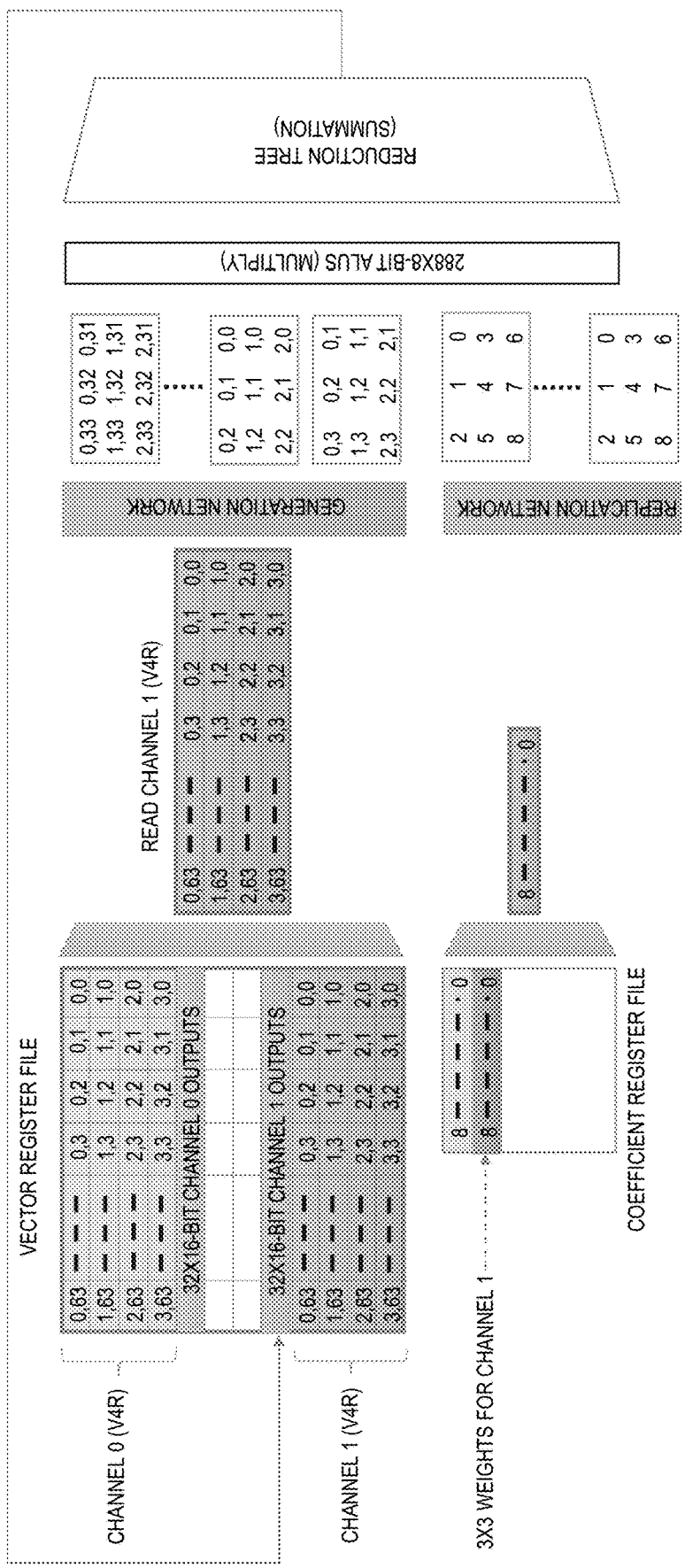
Figure 20C:
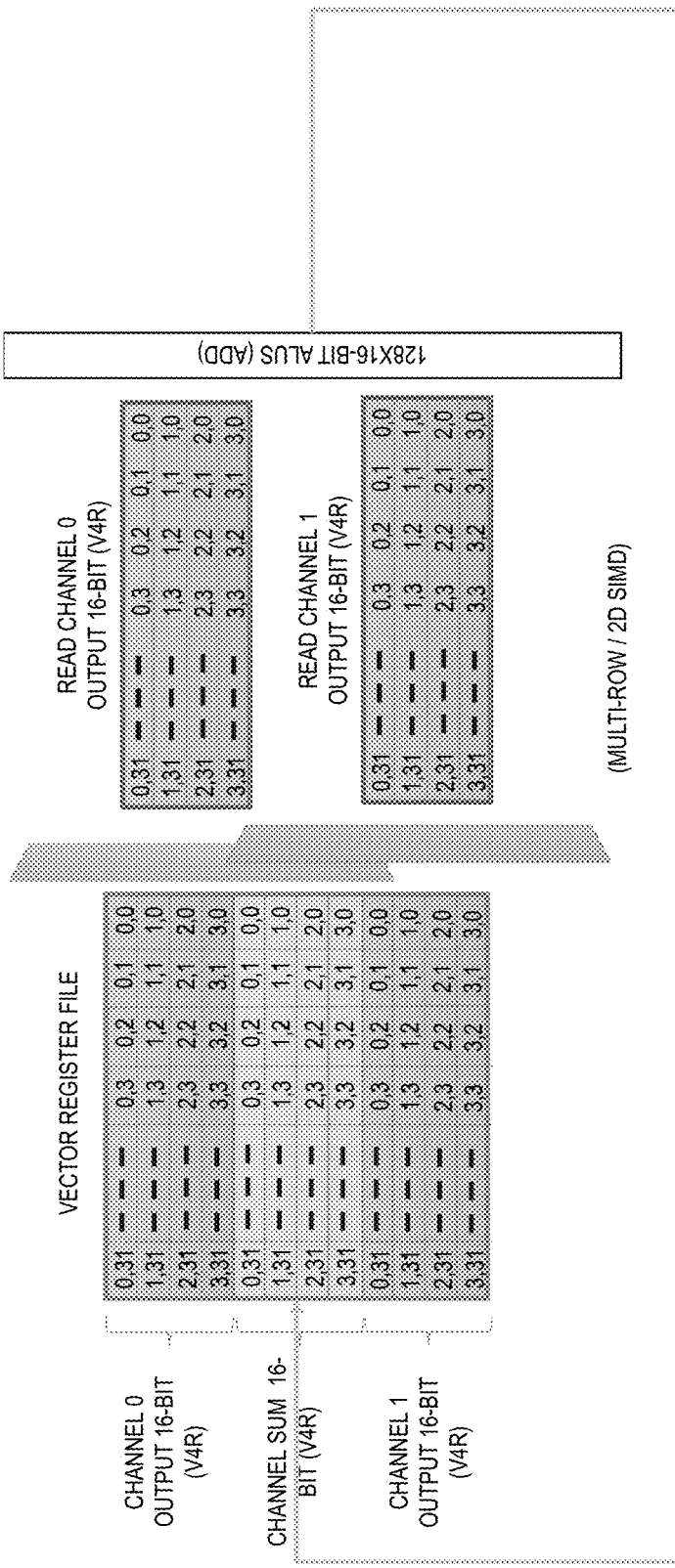
Figure 22:
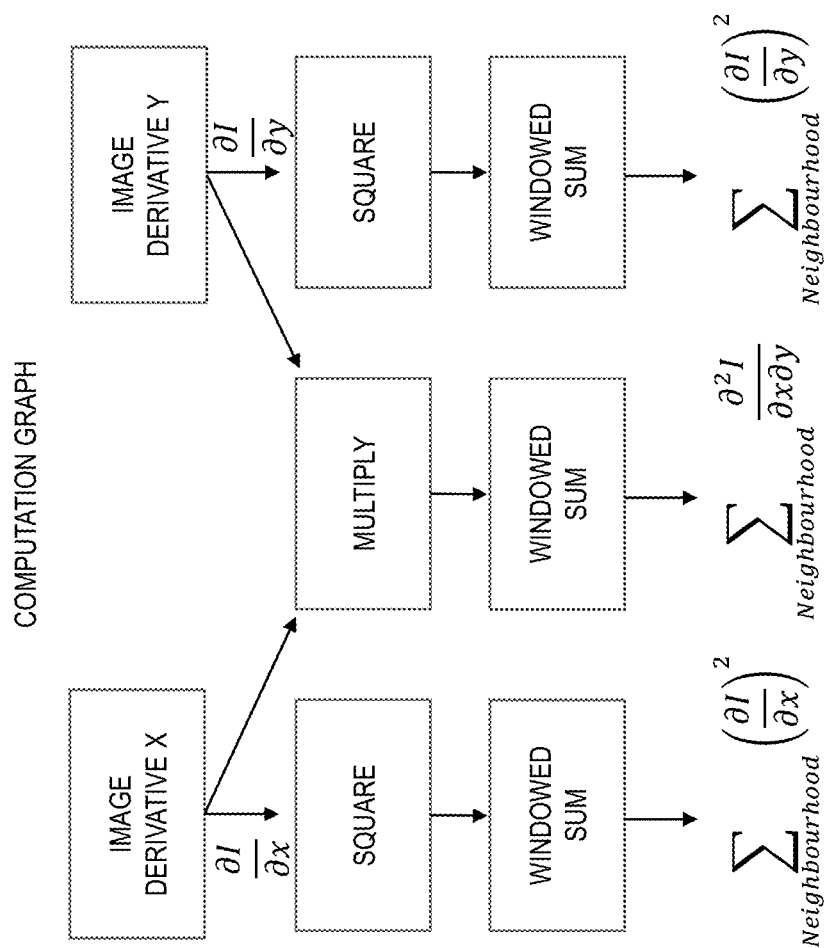
FIG. 22 shows an example computation graph for spatial derivatives computation using a DV processor.
Figure 23A:
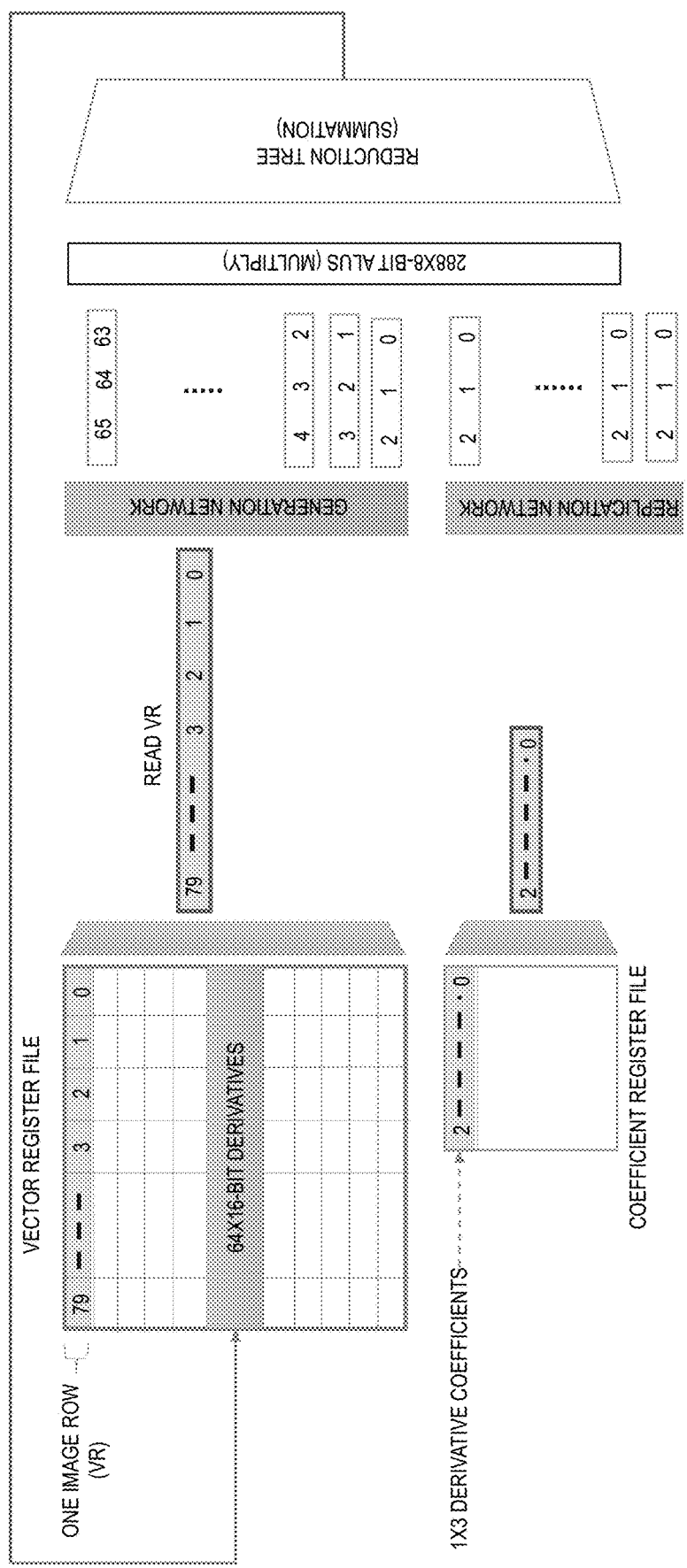
FIGS. 23A-23B shows a schematic illustration of an optical flow computation using a DV processor.
Figure 23B:
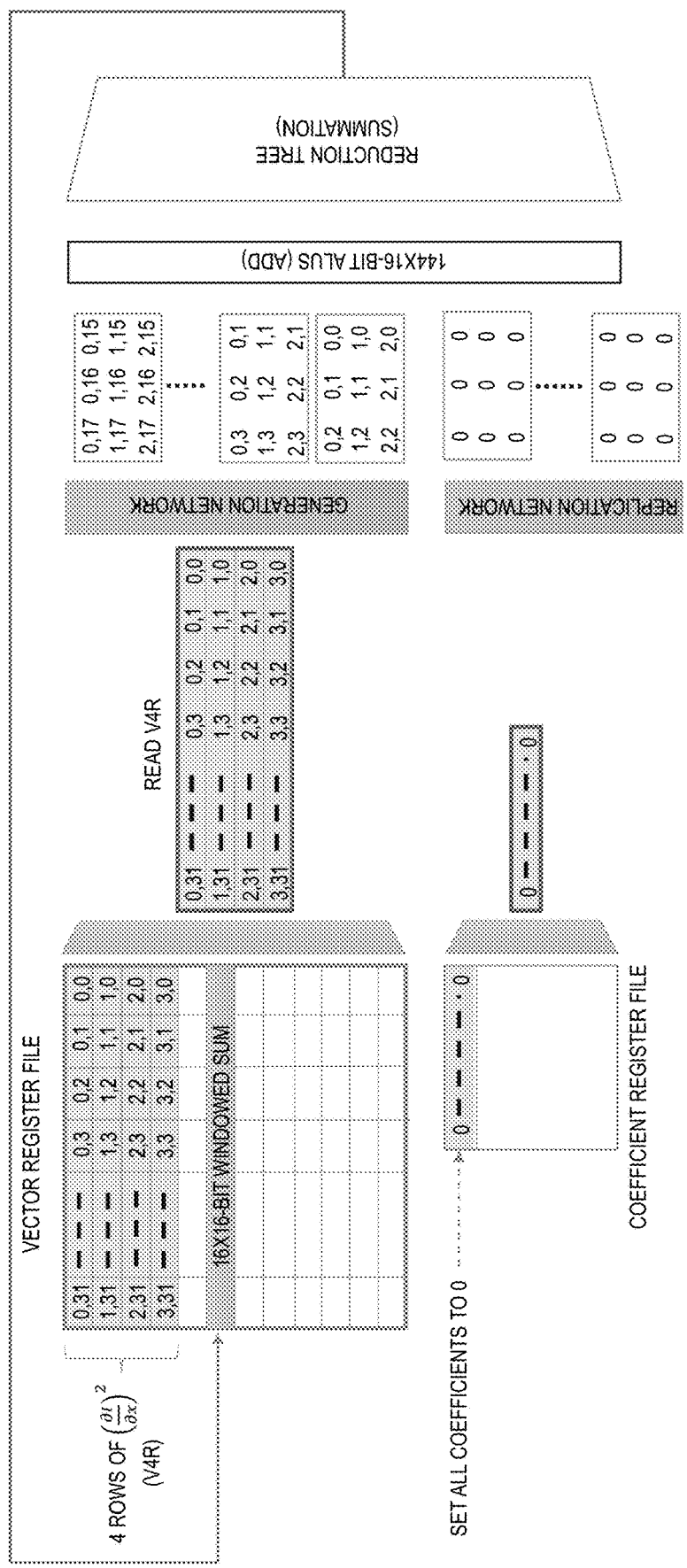

FIGS. 20A-20C show a schematic illustration of mapping a typical CNN compute operation to a DV core. For example, a CNN compute operation can include a 3×3 convolution of channel 0 of the input of a layer of a CNN, a 3×3 convolution of channel 1 of the input, and adding the outputs of the two 3×3 convolutions to generate an output. FIG. 20A shows the convolution of the channel 0 input, which includes computing 1 output row using the Stencil2D instruction. FIG. 20B shows the convolution of the channel 1 input, which includes computing 1 output row using the Stencil2D instruction. FIG. 20A shows the summation of the two convolutions, which includes adding four output channel rows using the ADDV4R instruction. FIG. 21 shows pseudocode for mapping a CNN compute operation to a DV core Example Optical Flow Algorithm FIG. 22 shows an example computation graph for spatial derivatives computation using a DV processor. Table 7 shows an example mapping of spatial derivatives computation to a DV core. FIGS. 23A-23B shows a schematic illustration of an optical flow computation using a DV processor. FIG. 23A shows an example computation of derivative X using a Stencil 1DH operation. FIG. 23B shows an example 3×3 windowed sum using a Stencil2D operation. To perform motion vector refinement for optical flow, for each pixel fetch a 5×5 window from calculated motion vector and use ADDRVR to add motion vectors of multiple pixels to image base address and generate addresses for 5×5 windows of 32 contiguous pixels. Then, the DV processor can send addresses to scatter/gather queues, and gather data from all addresses and refine the motion vector.

TABLE 7

Example mapping of spatial derivatives computation to a DV core.

| Compute Step | Instructions Used |
|---|---|
| Derivative X | Stencil1DH - 1D Horizontal Stencil Instruction |
| Derivative Y | Stencil1DV - 1D Vertical Stencil Instruction |
| Square | MULTV4R - SIMD instruction on a group of 4 registers |
| Multiply | MULTV4R - SIMD instruction on a group of 4 registers |
| Windowed Sum | Stencil2D - 2D Stencil Instruction |

Example Motion Estimation

Figure 24:
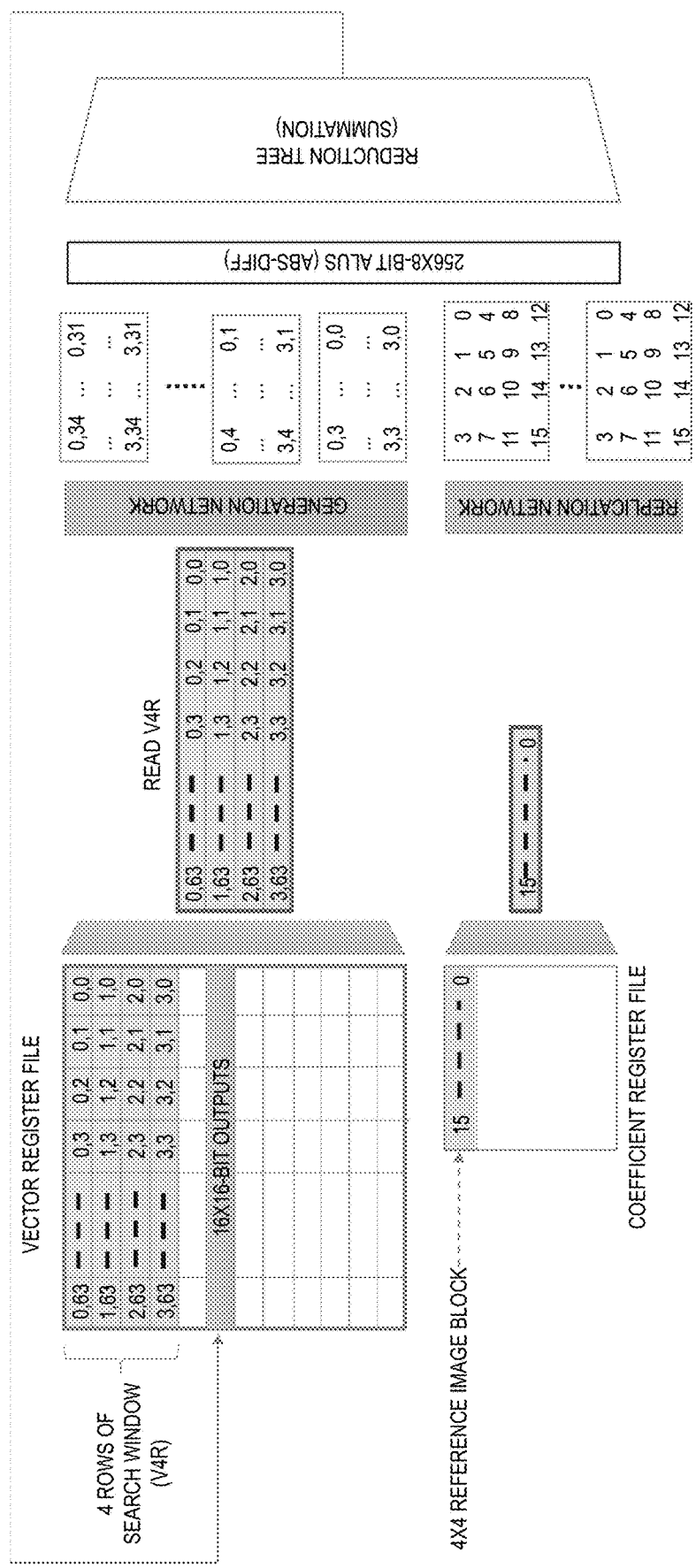
FIG. 24 shows a schematic illustration of motion estimation using a DV processor.

FIG. 24 shows a schematic illustration of motion estimation using a DV processor.

Example Deep Vision Processor Performance Determination

The DV processor was benchmarked against GPU solutions using state-of-the art computationally intensive deep learning networks. To validate the DV architecture, inference power and performance of the new deep learning processor was compared against Tegra X1—the most power embedded GPU currently available on the market—for the following CNNs:

1. Four-Layer CIFAR10 CNN (cs.toronto.edu/~kriz/cifar-.html). CIFAR-10 classification is a common benchmark problem in machine learning. The problem is to classify 32×32 pixel RGB images across 10 categories (airplane, automobile, bird, cat, deer, dog, frog, horse, ship, and truck). The dataset provides 50,000 images for training the CNN model and 10,000 test images to validate the classification accuracy. The particular model used for CIFAR-10 is a multi-layer architecture which achieves 85% accuracy within a few hours of training time on a GPU. It has about 1M parameters and requires about 40M operations to compute inference on a single image.

2. GoogleNet. GoogleNet is a 22 layer deep convolutional neural network architecture for classification and detection. It set the new state of the art for classification and detection in the ImageNet Large-Scale Visual Recognition Challenge 2014 (ILSVRC 2014) which is a training set of 1.2 million images distributed over 1,000 categories. This network introduced a new Inception CNN architecture allowing the authors to use 12× fewer parameters than AlexNet, which is the most popular deep learning network while achieving a significantly high accuracy. GoogleNet uses 7M parameters and requires about 3G Operations to compute inference on a single image.

3. FaceNet. Facenet is one of the most accurate networks for recognizing human faces. Developed by Google, it claims 99.63% accuracy on the facial recognition data set Labeled Faces in the Wild, which consists of 13,000 face images from the internet. "Triplets of roughly aligned matching/non-matching face patches generated using a novel online triplet training method". FaceNet uses 7M parameters and requires about 0.5G Operations to compute inference on a single image.

Benchmarking these on a DV Core against Tegra X1 involved the following steps:

a. Implement library of optimized CNN function in software using the DV instruction set architecture. This library will allow us to implement any Deep Learning network on DV core easily by using these underlying primitives.

b. Use Caffe (caffe.berkeleyvision.org/, a deep learning framework developed by Berkeley AI Research) implementations of GoogleNet, CIFar10 and FaceNet as a reference, implement Matlab versions of these three networks, and create a fixed point version suitable for embedded deployment.

c. With the fixed point Matlab implementation as a reference, implement these networks on DV processor, using the optimized CNN library as the underlying building block.

d. Use Cadence CAD tools to map the processor and its associated memories to the TSMC 28 nm HPC standard cell libraries and create a floor plan for accurate power and area measurements.

e. Create power and performance measurement scripts for the mapped processor.

f. Measure power and performance of benchmark CNNs and benchmark against GPU implementation running in an NVidia Jetson Tegra X1 board.

Example Deep Vision Processor Performance

Figure 25:
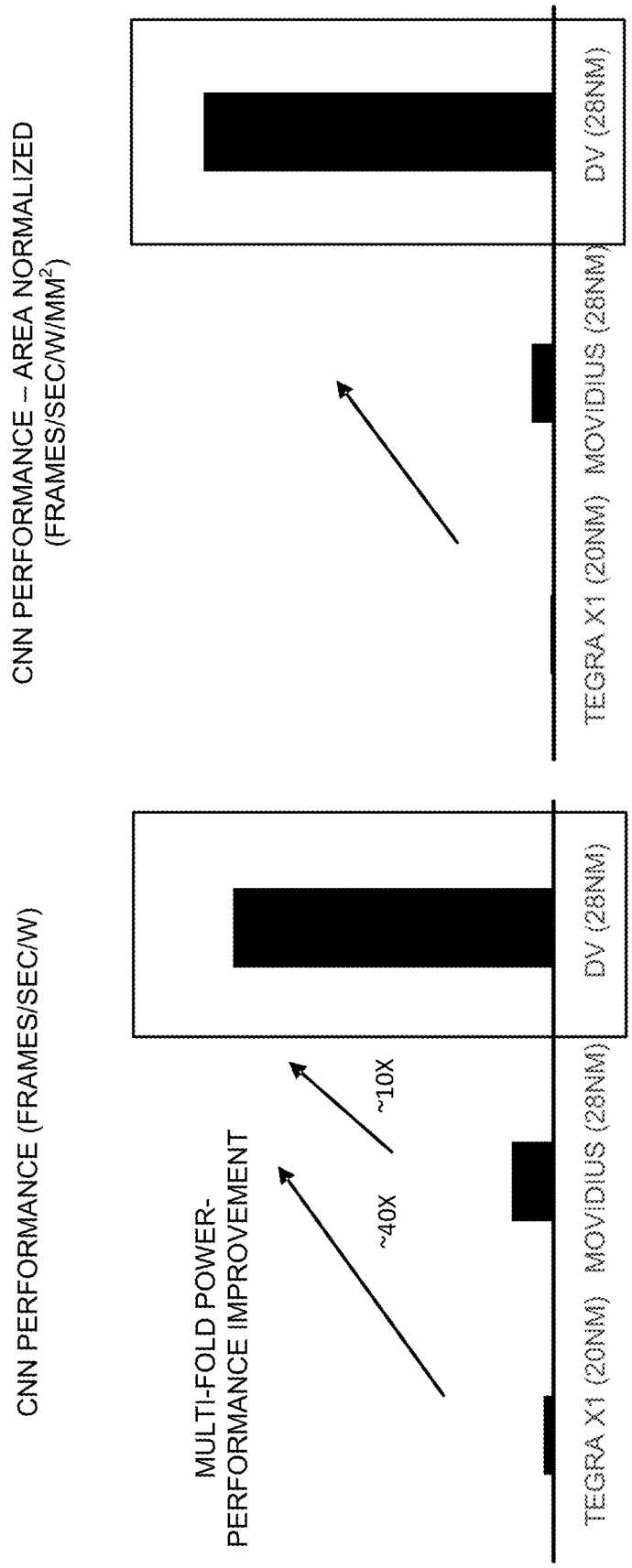
FIG. 25 shows example plots illustrating the projected performance of a DV processor.

Tables 8-10 show example performance metrics of a DV processor (28 nm TSMC HPM, running @800 MHz). Intel Iris 5100 is a 750 GFlops Mobile GPU so it has about 0.75 times performance of a Tegra X1 GPU. FIG. 25 shows example plots illustrating the projected performance of a Deep Vision processor. Representative CNN models used in determining the projected performance include models for object classification (e.g., GoogleNet, ResNet, Inception Net), face recognition (e.g., FaceNet), and image segmentation (e.g., SegNet, FCN).

TABLE 8

Example GoogleNet performance of a DV processor

| | GoogleNet Performance | Power |
|---|---|---|
| Deep Vision DV100 | 128 inferences/second | 1.07 W |
| Nvidia Tegra X1 | 33 inferences/second | 11 W |
| Movidius Myriad 2 | 15 inferences/second | 1.2 W |

TABLE 9

Example SegNet performance of a DV processor

| | SegNet Performance (256x256) | Power |
|---|---|---|
| Deep Vision DV100 | 9 frames/second | 1.1 W |
| Nvidia Tegra X1 | ~3 frames/second | 10-20 W |

TABLE 10

Example DV performance for traditional computer vision techniques.

| | DV | | Intel Iris 5100GPU | |
|---|---|---|---|---|
| | Execution Time | Power | Execution Time | Power |
| Canny Edge Detection (HD) | 0.09 ms | 1.06 W | 0.67 ms | 11 W |
| Gaussian Blur, 7x7 (HD) | 0.34 ms | 1.1 W | 2.8 ms | 12.5 W |
| Laplacian Pyramid, 7x7 (HD) | 0.69 ms | 1.08 W | 5.5 ms | 11.6 W |
| Hu-Moments Based Image Classification (HD) | 0.11 ms | 1.07 W | 0.8 ms | 12 W |

Example Deep Vision CNN Mapping Tool Workflow

Figure 26:
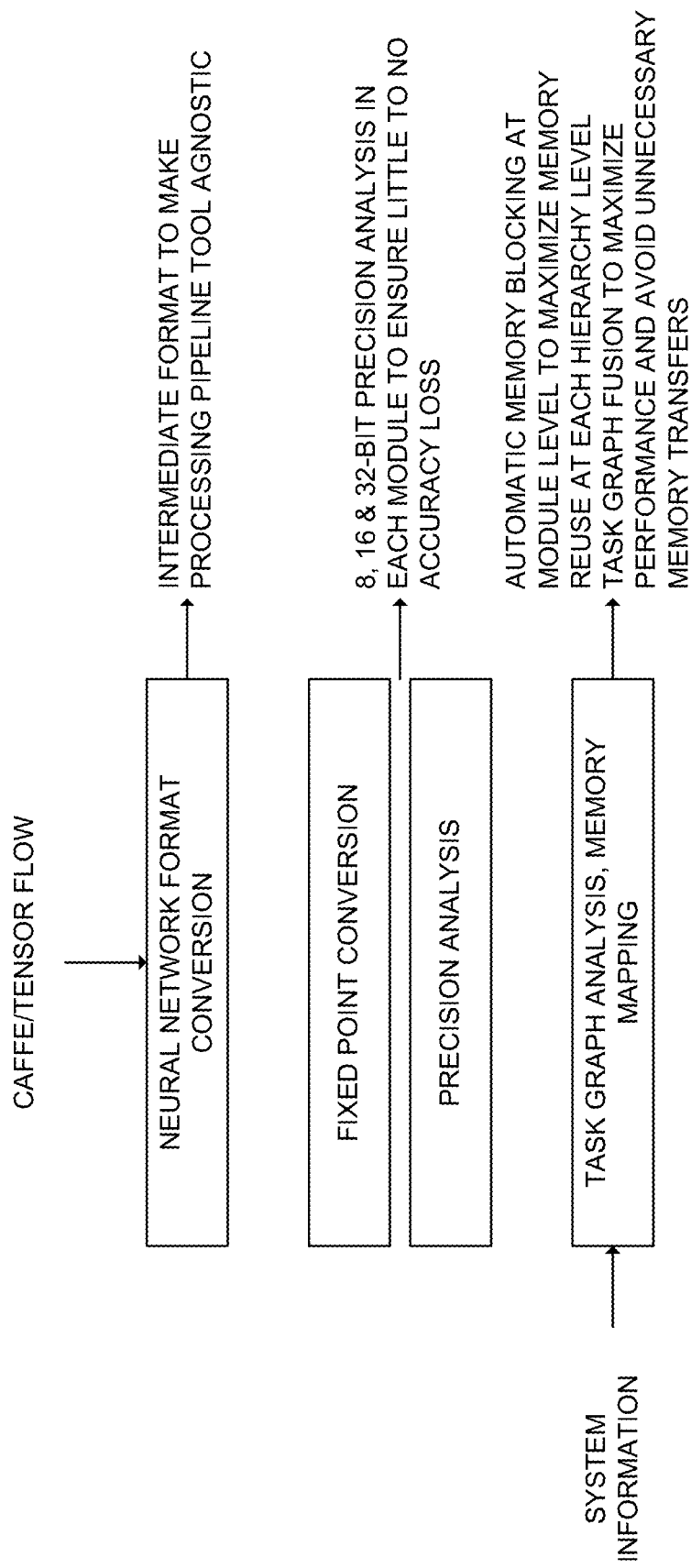
FIG. 26 shows an example workflow of a deep vision CNN mapping tool.

FIG. 26 shows an example deep vision CNN mapping tool workflow. The deep learning optimization software complementing a DVprocessor can enable complex CNN and other algorithms to be efficiently mapped to embedded processors for optimal performance. It can reduce layers and prune CNNs for optimal power and performance in embedded platforms. The software can include a library of lighter, thinner CNNs that are most suitable for embedded processors.

Example Deep Vision Processor

Figure 27:
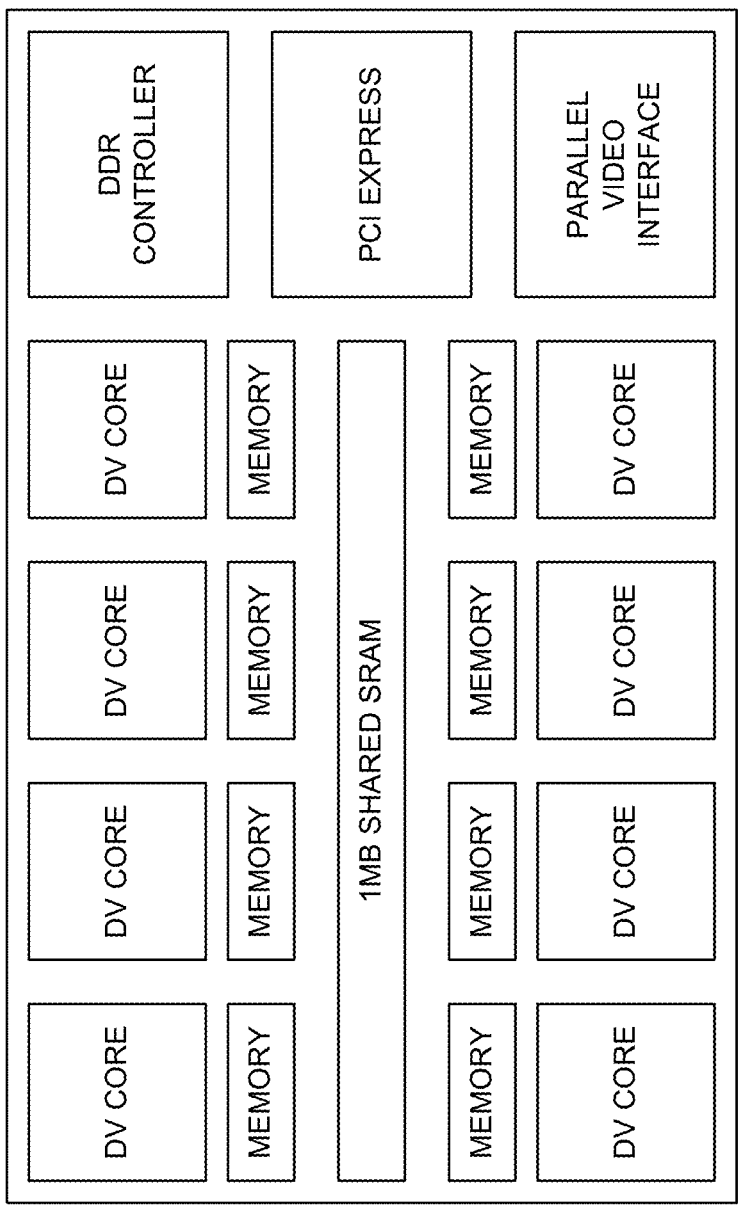
FIG. 27 is a block diagram showing an example DV processor chip.

FIG. 27 shows an example DV processor chip. The DV processor chip can include 8 Cores @800 MHz (e.g., manufactured using 28 nm TSMC), 1 MB L2 memory, 64 KB L1 data memory, 16 KB L1 instruction memory, and PCI Express Gen2 x4. The chip can have 4 TOPS performance with 1 W power consumption. The processor can have a die area of 20 mm², packaged in 15×15 mm² FBGA. The DV processor chip can support 8-bit, 16-bit, 32-bit integer operations. The DV processor chip can utilize DDR3 or LPDDR3 memory through its DDR controller.

Figure 28:
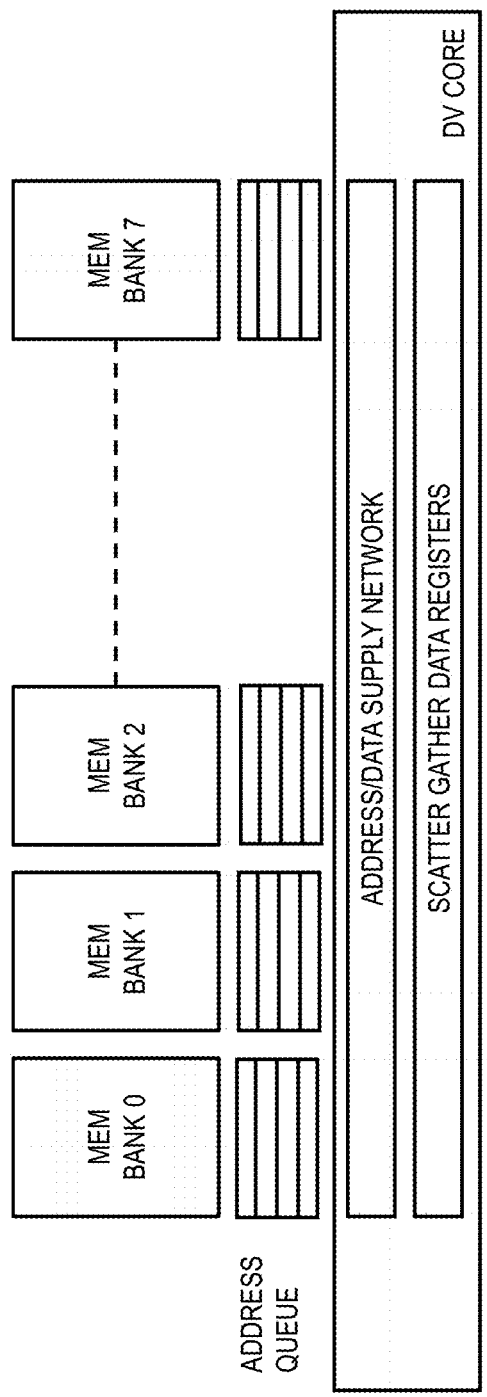
FIG. 28 shows an example DV processor architecture for motion vector refinement of optical flow.
Figure 29:
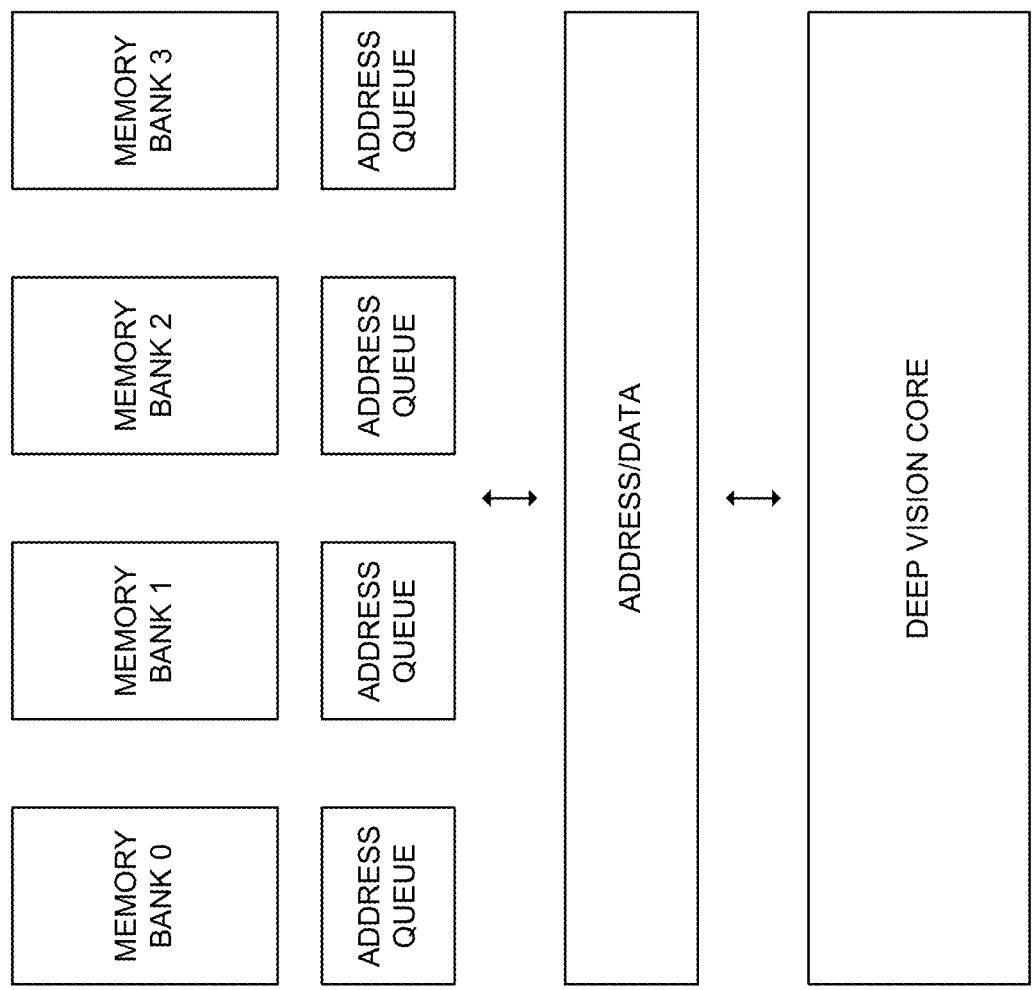
FIG. 29 shows another example DV processor architecture with scatter-gather support.

FIG. 28 shows an example DV processor architecture. For example, for each pixel fetch a 5×5 window from calculated motion vector, use ADDRVR to add motion vectors of multiple pixels to image base address and generate addresses for 5×5 windows of 32 contiguous pixels. Subsequently, send addresses to scatter/gather queues and gather data from all addresses and refine motion vector FIG. 29 shows another example DV processor architecture. In neural networks two types of layers multi-layer perceptrons (fully connected layers), RNNs/LSTMs typically require a large number of parameters with sizes that can run up to hundreds of megabytes. These parameters are generally used to perform matrix-matrix multiplication with incoming data to produce a certain number of outputs. Since the size of these parameters can be large, reducing the size of these parameters can be advantageous. It may be possible to prune the parameters substantially without affecting the accuracy of the neural networks. However, pruning the parameters creates sparsity and the dense matrix-matrix multiplication changes to sparse matrix-matrix multiplication. To facilitate sparse vector multiplication, the DV processor architecture includes scatter-gather support at the L1 memory system in some implementations.

The scatter-gather functionality can be implemented using queues in front of each bank of the L1 memory. These queues contain addresses for the input data that are composed of the base address of the parameters plus the indices of the sparse parameters. The input data fetched from the queues corresponding to the sparse parameters is accumulated into a vector register before being passed on to the processor. Inside the processor this input data is multiplied with the parameter data to perform a dense vector-vector multiplication.

Figure 30:
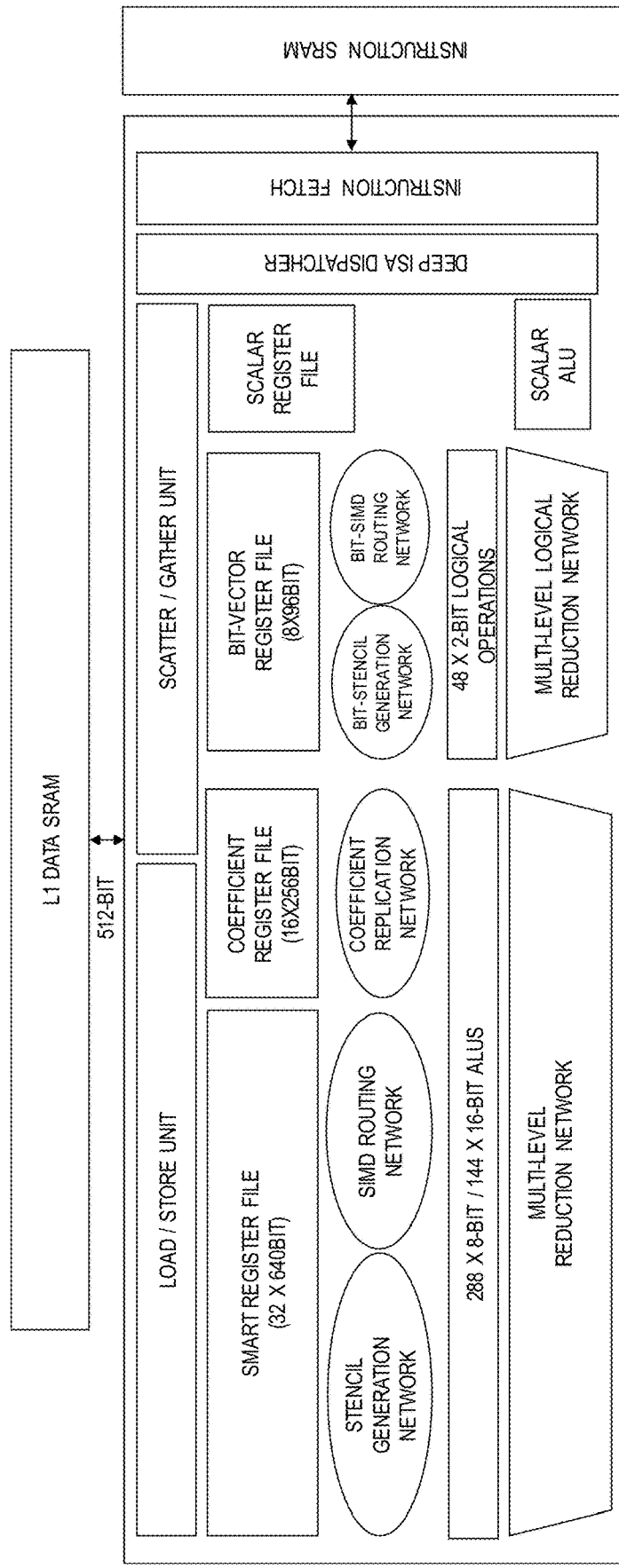
FIG. 30 is a block diagram representing a DV processor core.

FIG. 30 is a block diagram representing a DV processor chip. The processor can include pixel computation blocks and bit computation blocks. Non-limiting examples of pixel computation blocks include Stencil Generation Network (e.g., generate 3×3, 4×4, 3×1, 4×1, 1×3, 1×4 overlapping stencils from V4R or VR), SIMD Routing Network (e.g., routes data in traditional SIMD fashion or enhanced '2D SIMD' operating on multiple vectors rows), Coefficient Register (e.g., stores non-stencil data such as filter weights, motion estimation reference macroblock etc), Coefficient Replication Network (e.g., creates multiple copies of coefficients to do multiple stencil operations in parallel), ALUs (e.g., multi-precision 8-bit/16-bit/32-bit ALUs supporting, multiply, add, and other arithmetic operations), and Multi-level reduction network (e.g., supports multiple levels of summation based reduction (4-to-1, 16-to-1, . . . 128-to-1, 9-to-1, 3-to-1)). Non-limiting examples of bit computation blocks include Bit Vector Register (e.g., each Vector Register contains 48×2-bit elements), Bit-Stencil Generation Network (e.g., generate overlapping stencils from Bit-Vector registers), Bit-SIMD Routing (e.g., routes bit-vector data data in traditional SIMD fashion), Logical Units (e.g., support logical operations such as compare, greater than, etc.), and Multi-level logical reduction network (e.g., logical reduction based on AND/OR operations). In some embodiments, the DV processor chip can be an 8-core computer vision processor chip in communication with, for example, a DDR controller and a PCI Express controller, through a bus infrastructure (e.g., the ARM AXI bus infrastructure). In some implementations, a DV processor can have hardware compression support to reduce memory size and bandwidth requirements for large CNN models.

Example Working Prototype

In some embodiments, a working prototype of the DV processor can be implemented to verify performance for a real-time application in a real embedded system. An ASIC chip can be fabricated in TSMC 28 nm HPC process which incorporates 8 DV cores with a target frequency of 800 MHz. Alternatively or in addition, an FPGA based processor prototype of the DV processor architecture to validate the performance metrics.

Figure 31:
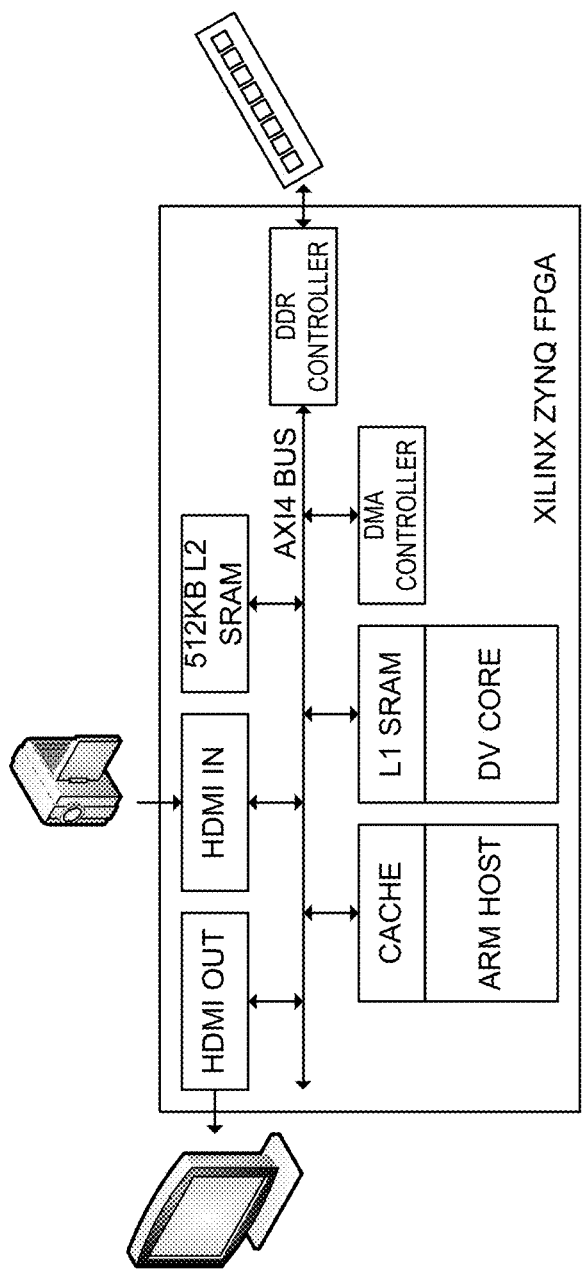
FIG. 31 is an example schematic of a FPGA system.

A Xilinx ZC706 FPGA prototyping board can be used to implement a real embedded system and test out the processor with real-time video data. This system (FIG. 31) can be used to capture video in real-time from a video camera, process it using a CNN running on the DV core to detect objects in the stream, and then display the results on an attached display using an embedded Linux application running on the host ARM processor.

This prototype can incorporate a single DV core and the expected frequency achieved in an FPGA is within 25-50 MHz range. So the expected performance of this prototype can be 150 to 300 times lower than the ASIC product. The less complex CIFAR10 CNN can be used to implement a real-time application scenario:

Real-time classification of objects in the live video stream can be representative of the object classification task frequently used in Security Cameras, as well as by self-navigating cars, drones and robots. Object classification in real-time at 24 frames/second between objects from 10 different classes with an accuracy of 85% or higher may be achieved. For example, 95% accuracy classifying between hundreds of classes with multiple objects detected per frame can be achieved. Real-time face recognition using FaceNet is representative of the use case for security and home cameras, which allows distinguishing between known personnel or home members and strangers or criminals.

A deep vision processor can be mapped to FPGA and implement L1/L2 SRAMs. The Deep Vision processor can be integrated with XIlinx hardware IPs for ARM host, DDR Controller, and HDMI Input/HDMI Output and test. DMAs can be configured for moving video data between HDMI Input/HDMI Output and DDR, as well as between ARM and DV co-processor. Embedded PetaLinux infrastructure can be deployed on ARM along with the drivers for HDMI IPs and Video DMAs. API and library can be used for communication between ARM host processor and DV processor core. The system can be used with a graphical linux application which captures video frames from the camera, passes each frame to DV processor to perform object detection using cifar10 CNN and display the results on the graphical display attached to the board.

Additional Aspects

In a 1st aspect, a processor is disclosed. The processor comprises: a load and store unit configured to load and store image pixel data and stencil data; a register unit, implementing a banked register file, configured to: load and store a subset of the image pixel data from the load and store unit; and concurrently provide access to image pixel values stored in a register file entry of the banked register file, wherein the subset of the image pixel data comprises the image pixel values stored in the register file entry; an interconnect unit in communication with the register unit and a plurality of arithmetic logic units, the interconnect unit configured to: provide the image pixel values stored in the register file entry; and provide corresponding stencil data to the image pixel values stored in the register file entry; and the plurality of arithmetic logic units (ALUs) configured to concurrently perform one or more operations on the image pixel values stored in the register file entry and the corresponding stencil data to the image pixel value is stored in the register file entry from the interconnect unit.

In a 2nd aspect, the processor of aspect 1, wherein the banked register file comprises a plurality of banks of vector registers.

In a 3rd aspect, the processor of aspect 2, wherein a width of a bank of the plurality of banks of vector registers and a size of one register file entry of the banked register file are identical.

In a 4th aspect, the processor of any one of aspects 2-3, wherein the plurality of banks of vectors registers comprises four banks of vector registers.

In a 5th aspect, the processor of aspect 4, wherein the four banks of registers are configured to implement 32 1-row 1D vector registers, 16 2-row 2D vector registers, 8 4-row, 2D vector registers, or a combination thereof.

In a 6th aspect, the processor of any one of aspects 1-5, wherein the processor is configured to implement a plurality of smaller stencil instructions using the banked register file.

In a 7th aspect, the processor of aspect 6, wherein the plurality of smaller stencil instructions comprises a 3×3 Stencil2D instruction, a 4×4 Stencil2D instruction, a 1×3 Stencil1D instruction, a 1×4 Stencil 1D instruction, a 3×1 Stencil 1D instruction, a 4×1 Stencil1D instruction, or a combination thereof.

In a 8th aspect, the processor of aspect 7, wherein the plurality of smaller stencil instructions comprises 1×1 Stencil instruction implemented using the 1×3 Stencil 1D instruction, the 1×4 Stencil1D instruction, the 3×1 Stencil1D instruction, the 4×1 Stencil1D instruction, or a combination thereof.

In a 9th aspect, the processor of any one of aspects 6-7, wherein the processor is configured to implement a plurality of larger stencil instructions using the plurality of smaller stencil instructions.

In a 10th aspect, the processor of aspect 9, wherein the plurality of larger stencil instructions comprises a 5×5 Stencil2D instruction, a 7×7 Stencil2D instruction, a 8×8 Stencil2D instruction, a 1×5 Stencil1D instruction, a 1×7 Stencil1D instruction, a 1×8 Stencil 1D instruction, a 5×1 Stencil1D instruction, a 7×1 Stencil1D instruction, a 8×1 Stencil1D instruction, or a combination thereof.

In a 11th aspect, the processor of any one of aspects 9-10, wherein the plurality of larger stencil instructions comprises an n×1 Stencil1D instruction or a 1×n Stencil1D instruction, wherein n is a positive integer.

In a 12th aspect, the processor of any one of aspects 9-11, wherein the plurality of larger stencil instructions comprises an n×m Stencil2D instruction, wherein n and m are positive integers.

In a 13th aspect, the processor of any one of aspects 1-12, wherein the interconnect unit is configured to provide 3×3 image pixel values of the image pixel values stored in the register file entry.

In a 14th aspect, the processor of aspect 13, wherein the interconnect unit comprises an accumulator unit configured to provide x×y image pixel values accumulated from the 3×3 image pixel values, wherein x and y are positive integers.

In a 15th aspect, the processor of any one of aspects 1-14, wherein the processor is configured to implement one or more DOTV2R instructions using the banked register file.

In a 16th aspect, the processor of any one of aspects 1-15, wherein the register unit is configured to: load and store results of the ALUs.

In a 17th aspect, the processor of any one of aspects 1-15, further comprising a plurality of accumulator registers of an accumulator register file configured to: load and store results of the ALUs.

In a 18th aspect, a register unit of a processor core implementing a banked register file is disclosed. The register unit is configured to: load and store a subset of image pixel data; and concurrently provide access to image pixel values stored in a register file entry of the banked register file, wherein the subset of the image pixel data comprises the image pixel values stored in the register file entry.

In a 19th aspect, The register unit of aspect 18, wherein the banked register file comprises a plurality of banks of vector registers.

In a 20th aspect, the register unit of aspect 19, wherein a width of a bank of the plurality of banks of vector registers and a size of one register file entry of the banked register file are identical.

In a 21st aspect, the register unit of any one of aspects 19-20, wherein the plurality of banks of vectors registers comprises four banks of vector registers.

In a 22nd aspect, the register unit of aspect 21, wherein the four banks of registers are configured to implement 32 1-row 1D vector registers, 16 2-row 2D vector registers, 8 4-row, 2D vector registers, or a combination thereof.

In a 23rd aspect, a processor core is disclosed. The processor core comprises the register unit of any one of aspects 18-22, and wherein the processor core is configured to implement a plurality of smaller stencil instructions using the banked register file.

In a 24th aspect, the processor core of aspect 23, wherein the plurality of smaller stencil instructions comprises a 3×3 Stencil2D instruction, a 4×4 Stencil2D instruction, a 1×3 Stencil1D instruction, a 1×4 Stencil1D instruction, a 3×1 Stencil1D instruction, a 4×1 Stencil1D instruction, or a combination thereof.

In a 25th aspect, the processor core of aspect 24, wherein the plurality of smaller stencil instructions comprises 1×1 Stencil instruction implemented using the 1×3 Stencil1D instruction, the 1×4 Stencil1D instruction, the 3×1 Stencil1D instruction, the 4×1 Stencil1D instruction, or a combination thereof.

In a 26th aspect, the processor core of any one of aspects 23-25, wherein the processor core is configured to implement a plurality of larger stencil instructions using the plurality of smaller stencil instructions.

In a 27th aspect, the processor core of aspect 26, wherein the plurality of larger stencil instructions comprises a 5×5 Stencil2D instruction, a 7×7 Stencil2D instruction, a 8×8 Stencil2D instruction, a 1×5 Stencil1D instruction, a 1×7 Stencil1D instruction, a 1×8 Stencil1D instruction, a 5×1 Stencil1D instruction, a 7×1 Stencil1D instruction, a 8×1 Stencil1D instruction, or a combination thereof.

In a 28th aspect, the processor core of any one of aspects 26-27, wherein the plurality of larger stencil instructions comprises an n×1 Stencil1D instruction or a 1×n Stencil1D instruction, wherein n is a positive integer.

In a 29th aspect, the processor core of any one of aspects 26-28, wherein the plurality of larger stencil instructions comprises an n×m Stencil2D instruction, wherein n and m are positive integers.

In a 30th aspect, the processor core of any one of aspects 23-29, wherein the processor core is configured to implement DOTV2R instructions using the banked register file.

In a 31st aspect, the processor core of any one of aspects 23-30, further comprising ALUs, wherein the register unit is configured to: load and store results of the ALUs.

In a 32nd aspect, the processor core of any one of aspects 23-30, further comprising a plurality of accumulator registers of an accumulator register file configured to: load and store results of the ALUs.

In a 33rd aspect, a method of operating a deep vision processor (or a deep vision processor core) is disclosed. The method comprises: loading and storing image pixel data and stencil data; loading and storing a subset of the image pixel data in a banked register file and concurrently providing access to image pixel values stored in a register file entry of the banked register file, wherein the subset of the image pixel data comprises the image pixel values stored in the register file entry; and performing one or more operations on the image pixel values stored in the register file entry and corresponding stencil data of the stencil data.

In a 34th aspect, the method of aspect 33, wherein the banked register file comprises a plurality of banks of vector registers.

In a 35th aspect, the method of aspect 34, wherein a width of a bank of the plurality of banks of vector registers and a size of one register file entry of the banked register file are identical.

In a 36th aspect, the method of any one of aspects 34-35, wherein the plurality of banks of vectors registers comprises four banks of vector registers.

In a 37th aspect, the method of aspect 36, wherein the four banks of registers are configured to implement 32 1-row 1D vector registers, 16 2-row 2D vector registers, 8 4-row, 2D vector registers, or a combination thereof.

In a 38th aspect, the method of any one of aspects 33-37, wherein performing the one or more operations comprises performing smaller stencil instructions on the image pixel values using the banked register file.

In a 39th aspect, the method of aspect 38, wherein the plurality of smaller stencil instructions comprises a 3×3 Stencil2D stencil instruction, a 4×4 Stencil2D instruction, a 1×3 Stencil1D instruction, a 1×4 Stencil1D instruction, a 3×1 Stencil1D instruction, a 4×1 Stencil1D instruction, 1×1 Stencil instruction or a combination thereof.

In a 40th aspect, the method of any one of aspects 38-39, wherein performing the one or more operations comprises performing larger stencil instructions on the image pixel values using the smaller stencil operations.

In a 41st aspect, the method of aspect 40, wherein the plurality of larger stencil instructions comprises a 5×5 Stencil2D instruction, a 7×7 Stencil2D instruction, a 8×8 Stencil2D instruction, a 1×5 Stencil1D instruction, a 1×7 Stencil1D instruction, a 1×8 Stencil1D instruction, a 5×1 Stencil1D instruction, a 7×1 Stencil1D instruction, a 8×1 Stencil1D instruction, or a combination thereof.

In a 42nd aspect, the method of any one of aspects 33-41, further comprising storing one or more results of the one or more operations in the banked register file or an accumulator register file.

In a 43rd aspect, a method for computing a sum of two convolutions is disclosed. The method comprises: loading one row of m n-bit elements of channel 0; performing software shifting to load one row of channel 0 into V4R of channel 0; loading one row of m n-bit elements of channel 1; performing software shifting to load one row of channel 1 into V4R of channel 1; computing a 0th convolution of data in V4R of channel 0 to produce an output of channel 0; computing a 1st convolution of data in V4R of channel 1 to produce an output of channel 1; and sum the outputs of channel 0 and channel 1.

In a 44th aspect, the method of aspect 43, wherein m is 8, 32, 64, 128, 256, 512, or 1024.

In a 45th aspect, the method of aspect 43, wherein m is 64.

In a 46th aspect, the method of any one of aspects 43-45, wherein n is 8, 32, 64, 128, 256, 512, or 1024.

In a 47th aspect, the method of any one of aspects 43-45, wherein n is 8.

In a 48th aspect, the method of any one of aspects 43-47, wherein computing a 0th convolution of data in V4R of channel 0 to produce an output of channel 0 comprises: performing 1st Stencil2D on the one row of channel 0 to produce 1st 32×16-bit output; performing 2nd Stencil2D to on the one row of channel 0 produce 2nd 32×16-bit output; loading one row of 64 8-bit elements of channel 0; and performing software shifting to load one row of channel 0 into v4R of channel 0.

In a 49th aspect, the method of any one of aspects 43-48, wherein computing a 1st convolution of data in V4R of channel 1 to produce an output of channel 1 comprises: performing 1st Stencil2D on the one row of channel 1 to produce 1st 32×16-bit output; performing 2nd Stencil2D to on the one row of channel 1 produce 2nd 32×16-bit output; loading one row of 64 8-bit elements of channel 1; and performing software shifting to load one row of channel 1 into v4R of channel 1.

In a 50th aspect, a method of mapping a convolution neural network is disclosed. The method comprises: receiving data representing a convolution neural network (CNN); performing a neural network format conversion of the CNN;

performing a fixed point conversion and a precision analysis of the CNN; and performing graph analysis and memory mapping of the CNN based on system information.

In a 51st aspect, the method of aspect 50, wherein performing the neural network format conversion of the CNN comprises performing the neural network format conversion of the CNN to generate an intermediate format to make processing pipeline tool agnostic.

In a 52rd aspect, the method of any one of aspects 50-51, wherein performing the fixed point conversion and the precision analysis of the CNN comprises performing a 8, 16, 32, 64, or 128-bit precision analysis to ensure little to no accuracy loss from the fixed point conversion.

In a 53rd aspect, the method of any one of aspects 50-52, wherein performing the graph analysis and memory mapping of the CNN based on the system information comprises: performing automatic memory blocking at module level to maximize memory reuse at each hierarchy level; and performing task graph fusion to maximize performance and avoid unnecessary memory transfers.

In a 54th aspect, a processor is disclosed. The processor is configured to implement the method of any one of aspects 33-53.

In a 55th aspect, the processor of aspect 54. The processor comprises: a load and store unit; a register unit, implementing a banked register file; an interconnect unit in communication with the register unit; and a plurality of arithmetic logic units (ALUs) in communication with the interconnect unit.

Conclusion

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A processor comprising:
    a register file:
        comprising a set of banks;
        configured to store image data;
        representing a two-dimensional register abstraction;
    an interconnect unit configured to:
        access a set of image data stored in the register file; and
        access a set of stencil data for the set of image data; and
    a set of logic units:
        in communication with the interconnect unit;
        configured to execute a set of stencil operations on the set of image data and the set of stencil data, the set of stencil spanning a first size range and characterized by at least two-dimensions; and
        configured to execute a set of convolution operations on the set of the image data and the stencil data, the set of convolution operations spanning a second size range different from than the first size range.

2. The processor of claim 1:
    wherein the set of logic units is configured to concurrently execute the set of convolution operations comprising a set of smaller convolution operations on the set of the image data and the corresponding stencil data, the set of smaller convolution operations:
        characterized by a set of smaller kernel sizes; and
        representing a larger convolution operation on the image data characterized by a larger kernel size.

3. The processor of claim 2, wherein the set of logic units is configured to concurrently execute the set of smaller convolution operations on the set of the image data and the corresponding stencil data, the set of smaller convolution operations:
    characterized by the set of larger kernel sizes selected from a group of kernel sizes comprising:
        a three-by-three kernel size;
        a four-by-four kernel size;
        a one-by-three kernel size;
        a three-by-one kernel size; a one-by-four kernel size; and
        a four-by-one kernel size.

4. The processor of claim 2, wherein the set of logic units is configured to concurrently execute the set of smaller convolution operations at the first size range on the set of the image data and the corresponding stencil data, the set of convolution operations:
    characterized by the set of larger kernel sizes selected from a group of kernel sizes comprising:
        a five-by-five kernel size;
        a seven-by-seven kernel size;
        an eight-by-eight kernel size;
        a one-by-five kernel size;
        a one-by-seven kernel size;
        a one-by-eight kernel size;
        a five-by one kernel size;
        a seven-by-one kernel size; and
        an eight-by-one kernel size.

5. The processor of claim 2:
    wherein the set of smaller convolutional operations comprises a set of one-dimensional convolutional operations; and
    wherein the larger convolutional operation comprises a two-dimensional convolutional operation.

6. The processor of claim 1, wherein the set of logic units is configured to concurrently execute the set of convolution operations at the first size range on the set of the image data and the corresponding stencil data, the set of convolution operations:
  operating on a larger subset of image data at a first time;
  operating on a smaller subset of image data at a second time succeeding the first time;
  repetitively operating on smaller subsets of image data subsequently; and
  outputting convoluted layers with high-frequency, mid-frequency, and low-frequency information from the image data.

7. The processor of claim 1, wherein the stencil operation comprises a two-dimensional stencil operation.

8. A processor comprising:
  a shift register unit:
    configured to store image data; and
    representing a multi-dimensional register abstraction;
  a mapping unit in communication with the shift register unit:
    configured to concurrently access multiple subsets of the image data from the shift register unit based on a multi-dimensional stencil pattern within the multi-dimensional register abstraction;
    configured to concurrently access corresponding stencil data for each subset of the image data in the multiple subsets of the image data; and
    comprising a set of logic units configured to concurrently execute a set of operations on each subset of the image data and the corresponding stencil data, the set of operations representing a stencil operation characterized by the multi-dimensional stencil pattern.

9. The processor of claim 8, wherein the mapping unit is configured to concurrently access the multiple subsets of the image data, each subset of the image data defining a smaller stencil pattern in a set of smaller stencil patterns, the set of smaller stencil patterns together defining the multi-dimensional stencil pattern.

10. The processor of claim 8:
  wherein the set of logic units is further configured to generate a set of outputs resulting from the set of operations; and
  further comprising a reduction unit, configured to combine the set of outputs to generate a reduced output of the stencil operation.

11. The processor of claim 10:
  wherein the set of logic units is configured to concurrently execute a set of multiplication operations to generate the set of outputs; and
  wherein the reduction unit is configured to execute a summation operation on the set of outputs to generate the reduced output.

12. The processor of claim 10, wherein the set of logic units is configured to concurrently execute a set of subtraction operations to generate the set of outputs.

13. The processor of claim 10:
  wherein the set of logic units are configured to concurrently execute a set of absolute difference operations to generate the set of outputs; and
  wherein the reduction unit is configured to execute a summation operation on the set of outputs to generate the reduced output.

14. The processor of claim 10, wherein the set of logic units are configured to concurrently execute a set of averaging operations to generate the set of outputs.

15. The processor of claim 10, further comprising a set of accumulator registers configured to accumulate a set of reduced outputs comprising the reduced output to execute the stencil operation.

16. The processor of claim 8, further comprising an output register implemented as a shift register and configured to access the set of outputs from the mapping unit.

17. A processor core comprising:
  a register unit:
    comprising a set of register banks;
    configured to store a set of image data within the set of register banks;
    representing a multi-dimensional register abstraction; and
    configured to provide access to multiple subsets of the image data in the set of register banks, the multiple subsets of the set of image data defining a multi-dimensional stencil pattern within the multi-dimensional register abstraction.

18. The processor core of claim 17, wherein the register unit comprises a two-dimensional register abstraction.

19. The processor core of claim 17, further comprising:
  an interconnect unit configured to:
    access the set of image data from the register unit; and
    access a set of stencil data for the set of image data; and
  a set of logic units:
    in communication with the interconnect unit;
    configured to execute a set of stencil operations on the set of image data and the set of stencil data, the set of stencil operations spanning a first size range and characterized by at least two-dimensions; and
    configured to execute a set of convolution operations on the set of the image data and the stencil data, the set of convolution operations spanning a second size range different from than the first size range.

* * * * *